United States Patent
Shrestha et al.

(10) Patent No.: US 11,736,975 B2
(45) Date of Patent: Aug. 22, 2023

(54) BUFFER STATUS REPORT TRANSMISSIONS IN NON-TERRESTRIAL NETWORKS

(71) Applicant: QUALCOMM Incorporated, San Diego, CA (US)

(72) Inventors: Bharat Shrestha, San Diego, CA (US); Umesh Phuyal, San Diego, CA (US); Alberto Rico Alvarino, San Diego, CA (US); Xiao Feng Wang, San Diego, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 17/245,762

(22) Filed: Apr. 30, 2021

(65) Prior Publication Data
US 2021/0360469 A1 Nov. 18, 2021

Related U.S. Application Data

(60) Provisional application No. 63/025,879, filed on May 15, 2020.

(51) Int. Cl.
*H04W 28/02* (2009.01)
*H04W 74/08* (2009.01)
*H04W 72/23* (2023.01)

(52) U.S. Cl.
CPC ....... *H04W 28/0278* (2013.01); *H04W 72/23* (2023.01); *H04W 74/0833* (2013.01)

(58) Field of Classification Search
CPC ........... H04W 28/0278; H04W 72/042; H04W 74/0833; H04W 74/006; H04W 72/23
(Continued)

(56) References Cited

U.S. PATENT DOCUMENTS

2018/0167916 A1* 6/2018 Zhang .................. H04W 72/042
2018/0227880 A1* 8/2018 Su .......................... H04W 68/02
(Continued)

FOREIGN PATENT DOCUMENTS

CN       101873610 A  * 10/2010
CN       106686750 B    9/2019
(Continued)

OTHER PUBLICATIONS

Ericsson: "Further Details on Uplink Enhancements on NTN", 3GPP Draft, 3GPP TSG-RAN WG2#108, R2-1915565, 3rd Generation Partnership Project (3GPP), Mobile Competence Centre, 650, Route Des Lucioles, F-06921 Sophia-Antipolis Cedex, France, vol. RAN WG2, No. Reno, Nevada, US, Nov. 18, 2019-Nov. 22, 2019, Nov. 7, 2019 (Nov. 7, 2019), XP051815976, 12 Pages, Retrieved from the Internet: URL: https://ftp.3gpp.org/tsg_ran/WG2_RL2/TSGR2_108/Docs/R2-1915565.zip. R2-1915565, Further Details on Uplink Enhancements for NTN.docx [Retrieved on Nov. 7, 2019] section 2, pp. 2-4.

(Continued)

*Primary Examiner* — Rownak Islam
(74) *Attorney, Agent, or Firm* — Holland & Hart LLP

(57) ABSTRACT

Methods, systems, and devices for wireless communications are described. A user equipment (UE) may transmit buffer status information using configured periodic uplink resources. For example, a base station may configure dedicated periodic uplink resources, periodic random access resources, or periodic uplink grants to enable the UE to transmit the buffer status information. In some cases, the periodic random access resources may enable the UE to transmit a first message of a four-step or two-step random access procedure to indicate the buffer status information. Additionally or alternatively, the base station may configure a type of scheduling request for the UE to transmit that can (Continued)

indicate whether a buffer size falls within a range, where the base station then can more accurately allocate uplink resources in an uplink grant for the UE to transmit the uplink data based on receiving this type of scheduling request.

28 Claims, 25 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2020/0235965 A1* | 7/2020 | Stern-Berkowitz | ........................... H04L 27/0006 |
| 2020/0260468 A1* | 8/2020 | Cao | ....................... H04W 24/10 |
| 2020/0351912 A1* | 11/2020 | Jeon | .................... H04W 72/044 |

FOREIGN PATENT DOCUMENTS

| WO | WO-2016171767 A1 | 10/2016 |
|---|---|---|
| WO | WO-2021064150 A1 | 4/2021 |

OTHER PUBLICATIONS

International Search Report and Written Opinion—PCT/US2021/030440—ISA/EPO—dated Aug. 30, 2021 (204317WO).

Motorola Mobility, et al., "2-step RACH Procedure", 3GPP Draft, 3GPP TSG RAN WG1 #96bis, R1-1904928, 2-step RACH Procedure, 3rd Generation Partnership Project (3GPP), Mobile Competence Centre, 650, Route Des Lucioles, F-06921 Sophia-Antipolis Cedex, France, vol. RAN WG1, No. Xian, China, Apr. 3, 2019-Apr. 12, 2019, Mar. 30, 2019 (Mar. 30, 2019), XP051691868, 3 Pages, Retrieved from the Internet: URL: http://www.3gpp.org/ftp/tsg%5Fran/WG1%5FRL1/TSGR1%5F96b/Docs/R1%2D1904928%2Ezip. [Retrieved on Mar. 30, 2019] The Whole Document.

NTT Docomo, et al.,"WF on SPS for NB-IoT in Rel-15", 3GPP Draft, 3GPP TSG RAN WG1 Meeting #92bis, R1-1805324, WF on SPS for NB-IOT in REL-15 V2, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 18, 2018 (Apr. 18, 2018), XP051427641, 3 Pages, Retrieved from the Internet: URL: http://www.3gpp.org/ftp/Meetings%5F3GPP%5FSYNC/RAN1/Docs/. [retrieved on Apr. 18, 2018] the whole document.

ZTE Corporation, et al., "Consideration on SR and DRX in NTN", 3GPP Draft, 3GPP TSG RAN WG2 Meeting #108, R2-1915422, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 8, 2019 (Nov. 8, 2019), XP051817218, 9 Pages, Retrieved from the Internet: URL: https://ftp.3gpp.org/tsg_ran/WG2_RL2/TSGR2_108/Docs/R2-1915422.zip. R2-1915422, Consideration on SR and DRX in NTN.doc [Retrieved on Nov. 8, 2019] section 2.1, pp. 1-3.

* cited by examiner

Random Access Response Subheader 605

BUFFER STATUS REPORT TRANSMISSIONS IN NON-TERRESTRIAL NETWORKS

CROSS REFERENCE

The present Application for Patent claims the benefit of U.S. Provisional Patent Application No. 63/025,879 by SHRESTHA et al., entitled "BUFFER STATUS REPORT TRANSMISSIONS IN NON-TERRESTRIAL NETWORKS," filed May 15, 2020, assigned to the assignee hereof, and expressly incorporated by reference herein.

FIELD OF TECHNOLOGY

The following relates generally to wireless communications and more specifically to buffer status report (BSR) transmissions in non-terrestrial networks (NTNs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, there may be a large distance between a UE and a serving node of the UE, such as when a gateway or base station and the UE are a part of a non-terrestrial network (NTN). Because of the distance between UEs and gateways in such cases, there may be a relatively long round-trip delay or propagation delay in message transmissions between a UE and gateway (e.g., relative to terrestrial networks). Efficient techniques for managing communications with such relatively long round-trip or propagation delays may thus be desirable for such systems.

SUMMARY

The described techniques relate to improved methods, systems, devices, and apparatuses that support buffer status report (BSR) transmissions in non-terrestrial networks (NTNs). Generally, the described techniques provide for a user equipment (UE) to receive configuration information from a base station indicating a set of periodic uplink resources dedicated for the UE to transmit buffer status information to the base station. Accordingly, when the UE determines uplink data is available to transmit to the base station, the UE may transmit a BSR using uplink resources from the set of periodic uplink resources indicating the uplink data is available to be transmitted. For example, the base station may configure the set of periodic uplink resources for the UE to transmit one or more BSRs (e.g., dedicated uplink resources configured to the UE for transmitting BSRs). Additionally or alternatively, the base station may configure one or more periodic random access resources (e.g., periodic random access channel (RACH) occasions) for the UE to transmit a random access preamble (e.g., a first message of a four-step RACH procedure) indicative of an approximate buffer size for the uplink data to be transmitted, containing the BSR, or a combination thereof (e.g., UE specific/buffer size specific preambles), where the periodic random access resources are dedicated to the UE or common to a set of UEs including the UE.

In some cases, the UE may transmit a first message of a two-step RACH procedure to the base station using the one or more periodic random access resources to indicate the BSR using a combination of a dedicated configuration and a common configuration for the first message of the two-step RACH procedure. Additionally or alternatively, the base station may transmit multiple periodic uplink grants for the set of periodic uplink resources. As such, when the UE determines the uplink data is available to be transmitted, the UE may monitor for an uplink grant of the multiple uplink grants to identify corresponding uplink resource(s) for transmitting the BSR (e.g., and the uplink data). Additionally or alternatively, the base station may configure a scheduling request format for the UE to transmit to indicate an approximate buffer size for the uplink data. Accordingly, if the base station receives this scheduling request format from the UE, the base station may transmit an uplink grant to the UE that enables the UE to transmit the uplink data to the base station based on the approximate size of the uplink data.

A method of wireless communications at a UE is described. The method may include receiving, from a base station, configuration information indicating a set of periodic uplink resources dedicated to transmitting buffer status information to the base station, determining uplink data is available to transmit to the base station, and transmitting, to the base station, a BSR using uplink resources from the set of periodic uplink resources according to the configuration information based on the available uplink data to transmit to the base station.

An apparatus for wireless communications at a UE is described. The apparatus may include a processor, memory coupled with the processor, and instructions stored in the memory. The instructions may be executable by the processor to cause the apparatus to receive, from a base station, configuration information indicating a set of periodic uplink resources dedicated to transmitting buffer status information to the base station, determine uplink data is available to transmit to the base station, and transmit, to the base station, a BSR using uplink resources from the set of periodic uplink resources according to the configuration information based on the available uplink data to transmit to the base station.

Another apparatus for wireless communications at a UE is described. The apparatus may include means for receiving, from a base station, configuration information indicating a set of periodic uplink resources dedicated to transmitting buffer status information to the base station, determining uplink data is available to transmit to the base station, and transmitting, to the base station, a BSR using uplink resources from the set of periodic uplink resources according to the configuration information based on the available uplink data to transmit to the base station.

A non-transitory computer-readable medium storing code for wireless communications at a UE is described. The code may include instructions executable by a processor to receive, from a base station, configuration information indicating a set of periodic uplink resources dedicated to transmitting buffer status information to the base station, determine uplink data is available to transmit to the base station, and transmit, to the base station, a BSR using uplink resources from the set of periodic uplink resources according to the configuration information based on the available uplink data to transmit to the base station.

In some examples of the method, apparatuses, and non-transitory computer-readable medium described herein, receiving the configuration information may include operations, features, means, or instructions for receiving, from the base station, an indication of the set of periodic uplink resources for transmitting one or more BSRs, the buffer status information including the one or more BSRs.

Some examples of the method, apparatuses, and non-transitory computer-readable medium described herein may further include operations, features, means, or instructions for transmitting, to the base station, the BSR during a first periodic uplink resource of the set of periodic uplink resources.

Some examples of the method, apparatuses, and non-transitory computer-readable medium described herein may further include operations, features, means, or instructions for transmitting, to the base station, an additional BSR during a second periodic uplink resource of the set of periodic uplink resources, where the additional BSR or a scheduling request may be transmitted before receiving an uplink grant from the base station for the BSR.

In some examples of the method, apparatuses, and non-transitory computer-readable medium described herein, the BSR may be transmitted for a first logical channel group (LCG) of a set of LCGs, and the additional BSR may be transmitted for an additional LCG of the set of LCGs.

In some examples of the method, apparatuses, and non-transitory computer-readable medium described herein, the BSR and the additional BSR may be a same BSR.

In some examples of the method, apparatuses, and non-transitory computer-readable medium described herein, the BSR may be transmitted with an uplink control information (UCI) format configured for the set of periodic uplink resources.

In some examples of the method, apparatuses, and non-transitory computer-readable medium described herein, the BSR may be transmitted at a physical (PHY) layer of the UE, a medium access control (MAC) layer of the UE, or a combination thereof.

In some examples of the method, apparatuses, and non-transitory computer-readable medium described herein, receiving the indication of the set of periodic uplink resources may include operations, features, means, or instructions for receiving, from the base station, the indication of the set of periodic uplink resources via radio resource control (RRC) signaling.

In some examples of the method, apparatuses, and non-transitory computer-readable medium described herein, receiving the indication of the set of periodic uplink resources may include operations, features, means, or instructions for receiving, from the base station, the indication of the set of periodic uplink resources via layer one (L1) signaling, where the set of periodic uplink resources may be activated for transmission of the one or more BSRs based on the L1 signaling.

Some examples of the method, apparatuses, and non-transitory computer-readable medium described herein may further include operations, features, means, or instructions for transmitting, to the base station, an uplink MAC control element (CE) to deactivate the set of periodic uplink resources.

Some examples of the method, apparatuses, and non-transitory computer-readable medium described herein may further include operations, features, means, or instructions for determining that the set of periodic uplink resources may be deactivated based on receiving an uplink grant from the base station, transmitting a scheduling request to the base station, transmitting a set of BSRs to the base station that exceeds a threshold value, transmitting the uplink data to the base station, or a combination thereof.

In some examples of the method, apparatuses, and non-transitory computer-readable medium described herein, the set of periodic uplink resources includes an on period where the set of periodic uplink resources may be active and an off period where the set of periodic uplink resources may be deactivated.

In some examples of the method, apparatuses, and non-transitory computer-readable medium described herein, receiving the configuration information may include operations, features, means, or instructions for receiving, from the base station, an indication of one or more random access resources for transmitting one or more random access preambles that correspond to an approximate size of the BSR, the set of periodic uplink resources including the one or more random access resources and the buffer status information including the one or more random access preambles that correspond to the approximate size of the BSR.

Some examples of the method, apparatuses, and non-transitory computer-readable medium described herein may further include operations, features, means, or instructions for determining a random access preamble from the one or more random access preambles based on a size of the BSR, transmitting, to the base station, the random access preamble in a first random access message of a random access procedure in a random access resource of the one or more random access resources, and receiving, from the base station, an uplink grant in a second random access message of the random access procedure based on transmitting the random access preamble, where the BSR and the uplink data may be transmitted to the base station according to the uplink grant in a third random access message of the random access procedure.

In some examples of the method, apparatuses, and non-transitory computer-readable medium described herein, the uplink grant includes a cell radio network temporary identifier (C-RNTI) corresponding to the UE.

In some examples of the method, apparatuses, and non-transitory computer-readable medium described herein, the uplink grant includes a set of transport block sizes (TBSs), and the BSR and the uplink data may be transmitted according to a TBS of the set of TBSs.

In some examples of the method, apparatuses, and non-transitory computer-readable medium described herein, the one or more random access resources include one or more random access occasions configured for the UE to transmit the one or more random access preambles that correspond to the approximate size of the BSR.

Some examples of the method, apparatuses, and non-transitory computer-readable medium described herein may further include operations, features, means, or instructions for determining one or more common random access resources configured for transmitting the buffer status information, the set of periodic uplink resources including the one or more common random access resources, where the common random access resources may be common to a set of UEs including the UE.

Some examples of the method, apparatuses, and non-transitory computer-readable medium described herein may further include operations, features, means, or instructions for transmitting, to the base station, the BSR as part of a first random access message for a four-step random access procedure using the one or more common random access resources, receiving, from the base station, a second random access message for the four-step random access procedure, the second random access message including an uplink grant for the uplink data, and transmitting, to the base station, the uplink data and a C-RNTI MAC CE corresponding to the UE in a third random access message for the four-step random access procedure.

In some examples of the method, apparatuses, and non-transitory computer-readable medium described herein, determining the one or more common random access resources may include operations, features, means, or instructions for receiving, from the base station, an indication of the one or more common random access resources via RRC signaling, broadcast signaling, one or more system information blocks (SIBs), remaining minimum system information (RMSI), or a combination thereof.

In some examples of the method, apparatuses, and non-transitory computer-readable medium described herein, receiving the configuration information may include operations, features, means, or instructions for receiving, from the base station, a dedicated configuration for transmitting a random access preamble for a first random access message of a two-step random access procedure using the uplink resources of the set of periodic uplink resources, where the BSR may be transmitted in the first random access message of the two-step random access procedure according to the dedicated configuration.

Some examples of the method, apparatuses, and non-transitory computer-readable medium described herein may further include operations, features, means, or instructions for receiving, from the base station, a second random access message of the two-step random access procedure based on transmitting the BSR in the first random access message, where the second random access message includes an uplink grant for the uplink data, a timing advance (TA), or a combination thereof.

In some examples of the method, apparatuses, and non-transitory computer-readable medium described herein, the second random access message includes a fallback random access response message addressed to a C-RNTI corresponding to the UE and the uplink grant for the uplink data, a TA command MAC CE and MAC service data unit (SDU) containing the uplink grant for the uplink data, a success random access response format that includes the TA and the uplink grant, or a combination thereof.

Some examples of the method, apparatuses, and non-transitory computer-readable medium described herein may further include operations, features, means, or instructions for receiving, from the base station, an indication to receive the success random access response format.

In some examples of the method, apparatuses, and non-transitory computer-readable medium described herein, receiving the dedicated configuration for the random access preamble may include operations, features, means, or instructions for receiving, from the base station, the dedicated configuration for the random access preamble via RRC signaling.

Some examples of the method, apparatuses, and non-transitory computer-readable medium described herein may further include operations, features, means, or instructions for determining a common configuration for transmitting a data portion of the first random access message of the two-step random access procedure, where the BSR may be transmitted in the data portion of the first random access message of the two-step random access procedure according to the common configuration and the dedicated configuration.

In some examples of the method, apparatuses, and non-transitory computer-readable medium described herein, determining the common configuration for transmitting the first random access message may include operations, features, means, or instructions for receiving, from the base station, an indication of the common configuration via RRC signaling, broadcast signaling, one or more SIBs, RMSI, or a combination thereof.

In some examples of the method, apparatuses, and non-transitory computer-readable medium described herein, receiving the configuration information may include operations, features, means, or instructions for receiving, from the base station, one or more uplink grants for transmitting the buffer status information, the one or more uplink grants transmitted by the base station according to a periodic configuration, where the BSR may be transmitted based on receiving an uplink grant of the one or more uplink grants.

Some examples of the method, apparatuses, and non-transitory computer-readable medium described herein may further include operations, features, means, or instructions for receiving, from the base station, an indication that the one or more uplink grants for transmitting the one or more BSRs may be activated, where the BSR may be transmitted according to a received uplink grant from the one or more uplink grants based on the indication.

Some examples of the method, apparatuses, and non-transitory computer-readable medium described herein may further include operations, features, means, or instructions for receiving, from the base station, an additional indication that the one or more uplink grants for transmitting the one or more BSRs may be deactivated.

Some examples of the method, apparatuses, and non-transitory computer-readable medium described herein may further include operations, features, means, or instructions for determining to maintain a discontinuous reception (DRX) state when an uplink grant of the one or more uplink grants may be received.

In some examples of the method, apparatuses, and non-transitory computer-readable medium described herein, the DRX state includes an active state, a sleep state, or a combination thereof.

A method of wireless communications at a UE is described. The method may include receiving, from a base station, a scheduling request configuration for indicating a buffer size of buffer status information that is greater than a lower threshold value, less than an upper threshold value, or a combination thereof, determining uplink data is available to transmit to the base station, and transmitting, to the base station, a scheduling request according to the scheduling request configuration based on a buffer size for the uplink data being greater than the lower threshold value, less than the upper threshold value, or a combination thereof.

An apparatus for wireless communications at a UE is described. The apparatus may include a processor, memory coupled with the processor, and instructions stored in the memory. The instructions may be executable by the processor to cause the apparatus to receive, from a base station, a scheduling request configuration for indicating a buffer size of buffer status information that is greater than a lower threshold value, less than an upper threshold value, or a combination thereof, determine uplink data is available to transmit to the base station, and transmit, to the base station, a scheduling request according to the scheduling request configuration based on a buffer size for the uplink data being greater than the lower threshold value, less than the upper threshold value, or a combination thereof.

Another apparatus for wireless communications at a UE is described. The apparatus may include means for receiving, from a base station, a scheduling request configuration for indicating a buffer size of buffer status information that is greater than a lower threshold value, less than an upper threshold value, or a combination thereof, determining uplink data is available to transmit to the base station, and transmitting, to the base station, a scheduling request according to the scheduling request configuration based on a buffer size for the uplink data being greater than the lower threshold value, less than the upper threshold value, or a combination thereof.

A non-transitory computer-readable medium storing code for wireless communications at a UE is described. The code may include instructions executable by a processor to receive, from a base station, a scheduling request configuration for indicating a buffer size of buffer status information that is greater than a lower threshold value, less than an upper threshold value, or a combination thereof, determine uplink data is available to transmit to the base station, and transmit, to the base station, a scheduling request according to the scheduling request configuration based on a buffer size for the uplink data being greater than the lower threshold value, less than the upper threshold value, or a combination thereof.

Some examples of the method, apparatuses, and non-transitory computer-readable medium described herein may further include operations, features, means, or instructions for transmitting, to the base station, an indication of a preference for the scheduling request configuration.

In some examples of the method, apparatuses, and non-transitory computer-readable medium described herein, the lower threshold value, the upper threshold value, or both may be negotiated by the UE and the base station.

In some examples of the method, apparatuses, and non-transitory computer-readable medium described herein, the scheduling request configuration may be specific to a group of logical channels, a LCG, an enhanced mobile broadband (eMBB) usage, an ultra reliable low latency communications (URLLC) usage, a numerology, a subcarrier spacing, a transmission time interval (TTI) duration, or a combination thereof.

A method of wireless communications at a base station is described. The method may include transmitting, to a UE, configuration information indicating a set of periodic uplink resources dedicated to the UE transmitting buffer status information to the base station, receiving, from the UE, a BSR using uplink resources from the set of periodic uplink resources according to the configuration information, determining uplink data is available for the UE to transmit to the base station based on the BSR, and transmitting, to the UE, an uplink grant for the UE to transmit the uplink data based on the determining the uplink data is available.

An apparatus for wireless communications at a base station is described. The apparatus may include a processor, memory coupled with the processor, and instructions stored in the memory. The instructions may be executable by the processor to cause the apparatus to transmit, to a UE, configuration information indicating a set of periodic uplink resources dedicated to the UE transmitting buffer status information to the base station, receive, from the UE, a BSR using uplink resources from the set of periodic uplink resources according to the configuration information, determine uplink data is available for the UE to transmit to the base station based on the BSR, and transmit, to the UE, an uplink grant for the UE to transmit the uplink data based on the determining the uplink data is available.

Another apparatus for wireless communications at a base station is described. The apparatus may include means for transmitting, to a UE, configuration information indicating a set of periodic uplink resources dedicated to the UE transmitting buffer status information to the base station, receiving, from the UE, a BSR using uplink resources from the set of periodic uplink resources according to the configuration information, determining uplink data is available for the UE to transmit to the base station based on the BSR, and transmitting, to the UE, an uplink grant for the UE to transmit the uplink data based on the determining the uplink data is available.

A non-transitory computer-readable medium storing code for wireless communications at a base station is described. The code may include instructions executable by a processor to transmit, to a UE, configuration information indicating a set of periodic uplink resources dedicated to the UE transmitting buffer status information to the base station, receive, from the UE, a BSR using uplink resources from the set of periodic uplink resources according to the configuration information, determine uplink data is available for the UE to transmit to the base station based on the BSR, and transmit, to the UE, an uplink grant for the UE to transmit the uplink data based on the determining the uplink data is available.

In some examples of the method, apparatuses, and non-transitory computer-readable medium described herein, transmitting the configuration information may include operations, features, means, or instructions for transmitting, to the UE, an indication of the set of periodic uplink resources for the UE to transmit one or more BSRs, the buffer status information including the one or more BSRs.

Some examples of the method, apparatuses, and non-transitory computer-readable medium described herein may further include operations, features, means, or instructions for receiving, from the UE, the BSR during a first periodic uplink resource of the set of periodic uplink resources.

Some examples of the method, apparatuses, and non-transitory computer-readable medium described herein may further include operations, features, means, or instructions for receiving, from the UE, an additional BSR during a second periodic uplink resource of the set of periodic uplink resources, where the additional BSR or a scheduling request may be received before transmitting the uplink grant to the UE for the BSR.

In some examples of the method, apparatuses, and non-transitory computer-readable medium described herein, the BSR may be received for a first LCG of a set of LCGs, and the additional BSR may be received for an additional LCG of the set of LCGs.

In some examples of the method, apparatuses, and non-transitory computer-readable medium described herein, the BSR and the additional BSR may be a same BSR.

In some examples of the method, apparatuses, and non-transitory computer-readable medium described herein, the BSR may be received with a UCI format configured for the set of periodic uplink resources.

In some examples of the method, apparatuses, and non-transitory computer-readable medium described herein, the BSR may be received from a PHY layer of the UE, a MAC layer of the UE, or a combination thereof.

In some examples of the method, apparatuses, and non-transitory computer-readable medium described herein, transmitting the indication of the set of periodic uplink resources may include operations, features, means, or instructions for transmitting, to the UE, the indication of the set of periodic uplink resources via RRC signaling.

In some examples of the method, apparatuses, and non-transitory computer-readable medium described herein, transmitting the indication of the set of periodic uplink resources may include operations, features, means, or instructions for transmitting, to the UE, the indication of the set of periodic uplink resources via L1 signaling, where the set of periodic uplink resources may be activated for transmission of the one or more BSRs based on the L1 signaling.

Some examples of the method, apparatuses, and non-transitory computer-readable medium described herein may further include operations, features, means, or instructions for receiving, from the UE, an uplink MAC CE to deactivate the set of periodic uplink resources.

Some examples of the method, apparatuses, and non-transitory computer-readable medium described herein may further include operations, features, means, or instructions for determining that the set of periodic uplink resources may be deactivated based on transmitting the uplink grant to the UE, receiving a scheduling request from the UE, receiving a set of BSRs from the UE that exceeds a threshold value, receiving the uplink data from the UE, or a combination thereof.

In some examples of the method, apparatuses, and non-transitory computer-readable medium described herein, the set of periodic uplink resources includes an on period where the set of periodic uplink resources may be active and an off period where the set of periodic uplink resources may be deactivated.

In some examples of the method, apparatuses, and non-transitory computer-readable medium described herein, transmitting the configuration information may include operations, features, means, or instructions for transmitting, to the UE, an indication of one or more random access resources for transmitting one or more random access preambles that correspond to an approximate size of the BSR, the set of periodic uplink resources including the one or more random access resources and the buffer status information including the one or more random access preambles that correspond to the approximate size of the BSR.

Some examples of the method, apparatuses, and non-transitory computer-readable medium described herein may further include operations, features, means, or instructions for receiving, from the UE, a random access preamble in a first random access message of a random access procedure in a random access resource of the one or more random access resources, the random access preamble indicating a size of the BSR, and transmitting, to the UE, the uplink grant in a second random access message of the random access procedure based on receiving the random access preamble, where the BSR and the uplink data may be received from the UE according to the uplink grant in a third random access message of the random access procedure.

In some examples of the method, apparatuses, and non-transitory computer-readable medium described herein, the uplink grant includes a C-RNTI corresponding to the UE.

In some examples of the method, apparatuses, and non-transitory computer-readable medium described herein, the uplink grant includes a set of TBSs, and the BSR and the uplink data may be transmitted according to a TBS of the set of TBSs.

In some examples of the method, apparatuses, and non-transitory computer-readable medium described herein, the one or more random access resources include one or more random access occasions configured for the UE to transmit the one or more random access preambles that correspond to the approximate size of the BSR.

Some examples of the method, apparatuses, and non-transitory computer-readable medium described herein may further include operations, features, means, or instructions for determining one or more common random access resources configured for the UE to transmit the buffer status information, the set of periodic uplink resources including the one or more common random access resources, where the common random access resources may be common to a set of UEs including the UE.

Some examples of the method, apparatuses, and non-transitory computer-readable medium described herein may further include operations, features, means, or instructions for receiving, from the UE, the BSR as part of a first random access message for a four-step random access procedure using the one or more common random access resources, transmitting, to the UE, a second random access message for the four-step random access procedure, the second random access message including the uplink grant for the uplink data, and receiving, from the UE, the uplink data and a C-RNTI MAC CE corresponding to the UE in a third random access message for the four-step random access procedure.

Some examples of the method, apparatuses, and non-transitory computer-readable medium described herein may further include operations, features, means, or instructions for transmitting, to the UE, an indication of the one or more common random access resources via RRC signaling, broadcast signaling, one or more SIBs, RMSI, or a combination thereof.

In some examples of the method, apparatuses, and non-transitory computer-readable medium described herein, transmitting the configuration information may include operations, features, means, or instructions for transmitting, to the UE, a dedicated configuration for the UE to transmit a random access preamble for a first random access message of a two-step random access procedure using the uplink resources of the set of periodic uplink resources, where the BSR may be received in the first random access message of the two-step random access procedure according to the dedicated configuration.

Some examples of the method, apparatuses, and non-transitory computer-readable medium described herein may further include operations, features, means, or instructions for transmitting, to the UE, a second random access message of the two-step random access procedure based on receiving the BSR in the first random access message, where the second random access message includes an uplink grant for the uplink data, a TA, or a combination thereof.

In some examples of the method, apparatuses, and non-transitory computer-readable medium described herein, the second random access message includes a fallback random access response message addressed to a C-RNTI corresponding to the UE and the uplink grant for the uplink data, a TA command MAC CE and MAC SDU containing the uplink grant for the uplink data, a success random access response format that includes the TA and the uplink grant, or a combination thereof.

Some examples of the method, apparatuses, and non-transitory computer-readable medium described herein may further include operations, features, means, or instructions for transmitting, to the UE, an indication to receive the success random access response format.

In some examples of the method, apparatuses, and non-transitory computer-readable medium described herein, transmitting the dedicated configuration for the random access preamble may include operations, features, means, or instructions for transmitting, to the UE, the dedicated configuration for the random access preamble via RRC signaling.

Some examples of the method, apparatuses, and non-transitory computer-readable medium described herein may further include operations, features, means, or instructions for determining a common configuration for transmitting a data portion of the first random access message of the two-step random access procedure, where the BSR may be received in the data portion of the first random access message of the two-step random access procedure according to the common configuration and the dedicated configuration.

Some examples of the method, apparatuses, and non-transitory computer-readable medium described herein may further include operations, features, means, or instructions for transmitting, to the UE, an indication of the common configuration via RRC signaling.

In some examples of the method, apparatuses, and non-transitory computer-readable medium described herein, transmitting the configuration information may include operations, features, means, or instructions for transmitting, to the UE, one or more uplink grants for the UE to transmit the buffer status information, the one or more uplink grants transmitted by the base station according to a periodic configuration, where the BSR may be received based on transmitting an uplink grant of the one or more uplink grants.

Some examples of the method, apparatuses, and non-transitory computer-readable medium described herein may further include operations, features, means, or instructions for transmitting, to the UE, an indication that the one or more uplink grants for the UE to transmit the one or more BSRs may be activated, where the BSR may be received according to a transmitted uplink grant from the one or more uplink grants based on the indication.

Some examples of the method, apparatuses, and non-transitory computer-readable medium described herein may further include operations, features, means, or instructions for transmitting, to the UE, an additional indication that the one or more uplink grants for the UE to transmit the one or more BSRs may be deactivated.

A method of wireless communications at a base station is described. The method may include transmitting, to a UE, a scheduling request configuration for the UE to indicate a buffer size of buffer status information that is greater than a lower threshold value, less than upper threshold value, or a combination thereof, receiving, from the UE, a scheduling request according to the scheduling request configuration, determining uplink data is available for the UE to transmit to the base station based on the scheduling request, the scheduling request indicating an approximate size of the uplink data according to the scheduling request configuration, and transmitting, to the UE, an uplink grant for the UE to transmit the uplink data based on the approximate size of the uplink data.

An apparatus for wireless communications at a base station is described. The apparatus may include a processor, memory coupled with the processor, and instructions stored in the memory. The instructions may be executable by the processor to cause the apparatus to transmit, to a UE, a scheduling request configuration for the UE to indicate a buffer size of buffer status information that is greater than a lower threshold value, less than upper threshold value, or a combination thereof, receive, from the UE, a scheduling request according to the scheduling request configuration, determine uplink data is available for the UE to transmit to the base station based on the scheduling request, the scheduling request indicating an approximate size of the uplink data according to the scheduling request configuration, and transmit, to the UE, an uplink grant for the UE to transmit the uplink data based on the approximate size of the uplink data.

Another apparatus for wireless communications at a base station is described. The apparatus may include means for transmitting, to a UE, a scheduling request configuration for the UE to indicate a buffer size of buffer status information that is greater than a lower threshold value, less than upper threshold value, or a combination thereof, receiving, from the UE, a scheduling request according to the scheduling request configuration, determining uplink data is available for the UE to transmit to the base station based on the scheduling request, the scheduling request indicating an approximate size of the uplink data according to the scheduling request configuration, and transmitting, to the UE, an uplink grant for the UE to transmit the uplink data based on the approximate size of the uplink data.

A non-transitory computer-readable medium storing code for wireless communications at a base station is described. The code may include instructions executable by a processor to transmit, to a UE, a scheduling request configuration for the UE to indicate a buffer size of buffer status information that is greater than a lower threshold value, less than upper threshold value, or a combination thereof, receive, from the UE, a scheduling request according to the scheduling request configuration, determine uplink data is available for the UE to transmit to the base station based on the scheduling request, the scheduling request indicating an approximate size of the uplink data according to the scheduling request configuration, and transmit, to the UE, an uplink grant for the UE to transmit the uplink data based on the approximate size of the uplink data.

Some examples of the method, apparatuses, and non-transitory computer-readable medium described herein may further include operations, features, means, or instructions for receiving, from the UE, an indication of a preference for the scheduling request configuration.

In some examples of the method, apparatuses, and non-transitory computer-readable medium described herein, the lower threshold value, the upper threshold value, or both may be negotiated by the UE and the base station.

In some examples of the method, apparatuses, and non-transitory computer-readable medium described herein, the scheduling request configuration may be specific to a group of logical channels, a LCG, an eMBB usage, a URLLC usage, a numerology, a subcarrier spacing, a TTI duration, or a combination thereof.

DETAILED DESCRIPTION

Figure 1:
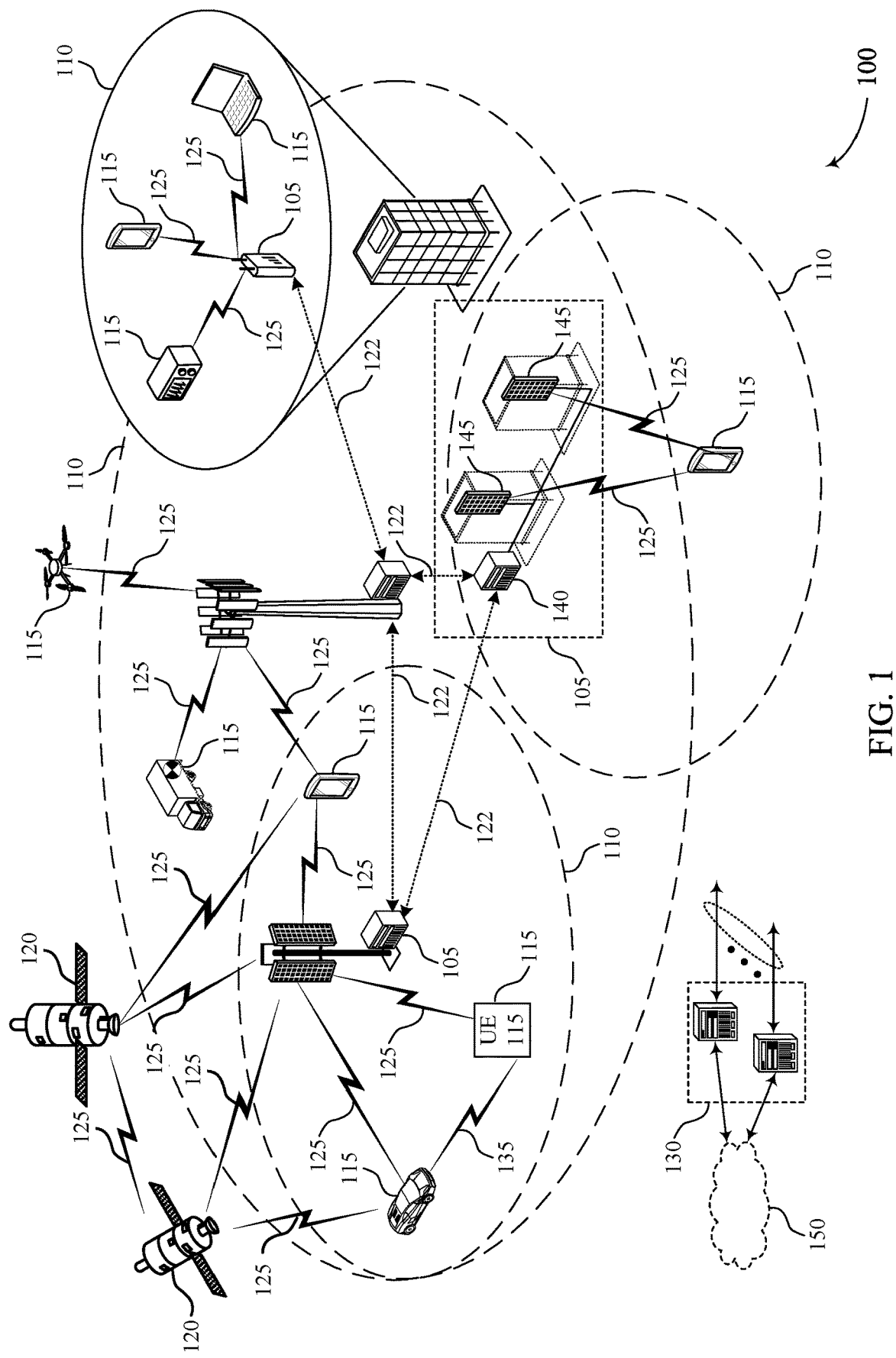
FIG. 1 illustrates an example of a system for wireless communications that supports buffer status report (BSR) transmissions in a non-terrestrial network (NTN) in accordance with aspects of the present disclosure.

Non-terrestrial networks (NTNs) may provide coverage by using high-altitude vehicles between user terminals and gateways or base stations (e.g., next-generation NodeBs or giga-NodeBs, which may be referred to as a gNB, and also referred to as access stations or access gateways). A gateway may, for example, transmit data to a satellite, which may then relay the data to a user terminal or vice-versa. A high-altitude vehicle itself may be a base station, in some examples. A user terminal may be any device capable of transmitting signals to a satellite. Examples of a user terminal may include a user equipment (UE), a relay equipment configured to relay a signal between a satellite and a user terminal, or a combination thereof. NTNs may involve the use of high altitude platform stations (HAPSs) (sometimes referred to as satellites) to provide coverage for terrestrial base stations and UEs. The terms HAPS and satellite may be used interchangeably herein to refer to a remote NTN device that may provide coverage to one or more other high altitude or terrestrial devices. Likewise, the terms gateway and base station may be used interchangeably herein to refer to a network node that serves a UE and provides network access to the UE. In some cases, the base station (e.g., gNB) may be itself on the satellite, or the functionality of the base station may be split between the satellite and the gateway (e.g. the satellite may be a distributed unit (DU) and the gateway a central unit (CU), or other architectures). One or more aspects of the techniques described herein may be applicable in scenarios where the gNB is on the gateway, the satellite, or split among gateway and satellite.

The gateway and the satellite may be thousands of kilometers apart and it may take some time for electromagnetic waves to propagate over the distance between the gateway and the satellite and between the satellite and the user terminal. Thus, the propagation delay for NTNs may be many orders of magnitude larger than the propagation delay for terrestrial networks. As such, the round trip delay (RTD), which may sometimes referred to as a round trip time (RTT), associated with a signal may also be orders of magnitude larger for NTNs than for terrestrial networks. Further, due to the high mobility of high-altitude vehicles such as non-geostationary satellites, communications with the non-geostationary satellites may promote large and time-varying round trip delays. These variation in round trip delay may affect user terminals to experience variation in uplink timing and frequency synchronization with satellites.

When a UE has data to transmit to a base station (e.g., a satellite, ground station, gNB, etc.), the UE and the base station may transmit multiple messages back and forth prior to the UE transmitting the data to the base station. For example, if the UE has uplink data to transmit and no scheduled uplink resource is available, the UE may trigger a scheduling request to the base station to request an uplink grant for allocating scheduled uplink resources for transmitting the uplink data. In some cases, the base station may transmit a first uplink grant enabling the UE to transmit a buffer status report (BSR) that indicates a size of the uplink data to be transmitted. Subsequently, upon receiving the BSR, the base station may then transmit a second uplink grant to the UE allocating uplink resources for the UE to transmit the uplink data. By transmitting a scheduling request and BSR as well as the base station transmitting multiple uplink grants for a single amount of uplink data, latency and delays may be high. Efficient techniques are desired for reducing latency associated with the UE transmitting data.

As described herein, a UE may transmit a BSR such that a scheduling request is preempted, where the UE does not transmit the scheduling request in order to be able to transmit the BSR. In some cases, the base station may allocate dedicated periodic uplink resources for the UE to transmit the BSR. Additionally or alternatively, the UE may transmit a random access channel (RACH) preamble for a four-step RACH during periodic RACH occasions (ROs), where the RACH preamble is indicative of a buffer size (e.g., a UE specific/buffer size specific preamble), or may transmit a RACH preamble that includes the BSR, etc. The UE may then transmit the uplink data in the third RACH message of the four-step RACH. In some cases, the UE may transmit a first message of a two-step RACH procedure (e.g., in a periodic RO) that includes the BSR, may receive an uplink grant in a second message of the two-step RACH, and then may transmit the uplink data based on the uplink grant. Additionally or alternatively, the base station may periodically transmit an uplink grant indicating periodic uplink resources. Subsequently, when the UE identifies uplink data to transmit, the UE may monitor for and receive one of the periodic uplink grants to transmit the BSR on the periodic uplink resources. Additionally or alternatively, the base station may configure a type of scheduling request for the UE to transmit that can indicate whether a buffer size falls within a range (e.g., greater than X bytes and less than Y bytes), where the base station then can more accurately allocate uplink resources in an uplink grant for the UE to transmit the uplink data based on receiving this type of scheduling request.

Aspects of the disclosure are initially described in the context of wireless communications systems. Additionally, aspects of the disclosure are illustrated through an uplink transmission scheme, examples of BSR resource allocations, a random access occasion configuration, a random access response, a periodic uplink grant configuration, and process flow examples. Aspects of the disclosure are further illustrated by and described with reference to apparatus diagrams, system diagrams, and flowcharts that relate to BSR transmissions in NTNs.

FIG. 1 illustrates an example of a wireless communications system 100 that supports BSR transmissions in NTNs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 122 (e.g., via an S1, N2, N3, or other interface). The base stations 105 may communicate with one another over the backhaul links 122 (e.g., via an X2, Xn, or other interface) either directly (e.g., directly between base stations 105), or indirectly (e.g., via core network 130), or both. In some examples, the backhaul links 122 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may also include one or more satellites 120. Satellite 120 may communicate with base stations 105 (also referred to as gateways in NTNs) and UEs 115 (or other high altitude or terrestrial communications devices). Satellite 120 may be any suitable type of communication satellite configured to relay communications between different end nodes in a wireless communication system. Satellite 120 may be an example of a space satellite, a balloon, a dirigible, an airplane, a drone, an unmanned aerial vehicle, and/or the like. In some examples, the satellite 120 may be in a geosynchronous or geostationary earth orbit, a low earth orbit or a medium earth orbit. A satellite 120 may be a multi-beam satellite configured to provide service for multiple service beam coverage areas in a predefined geographical service area. The satellite 120 may be any distance away from the surface of the earth.

In some cases, a cell may be provided or established by a satellite 120 as part of a NTN. A satellite 120 may, in some cases, perform the functions of a base station 105, act as a bent-pipe satellite, or may act as a regenerative satellite, or a combination thereof. In other cases, satellite 120 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 120) may receive a signal from a base station 105 and may relay the signal to a UE 115 or base station 105, or vice-versa.

UEs 115 may communicate with satellites 120 and/or base stations or gateways 105 using communication links 125. For example, when a UE 115 has data to transmit to a base station 105 (e.g., a satellite 120, ground station, gNB, etc.), the UE 115 and the base station 105 may transmit multiple messages back and forth prior to the UE transmitting the data to the base station. If the UE 115 has uplink data to transmit and no scheduled uplink resource is available, the UE 115 may trigger a scheduling request to the base station 105 to request an uplink grant for allocating scheduled uplink resources for transmitting the uplink data. In some cases, the base station 105 may transmit a first uplink grant enabling the UE 115 to transmit a BSR that indicates a size of the uplink data to be transmitted. Subsequently, upon receiving the BSR, the base station 105 may then transmit a second uplink grant to the UE 115 allocating uplink resources for the UE 115 to transmit the uplink data. By transmitting a scheduling request and BSR as well as the base station 105 transmitting multiple uplink grants for a single amount of uplink data, latency and delays may be high. For example, in NTN, the distance between the UE 115 and the base station 105 may be large, such that transmitting the multiple messages back and forth may result in a long delay. Efficient techniques are desired for reducing latency associated with the UE transmitting data.

Wireless communications system 100 may support efficient techniques for a UE 115 to transmit a BSR such that a scheduling request is preempted, where the UE 115 does not transmit the scheduling request in order to be able to transmit the BSR. In some cases, a base station 105 may allocate dedicated periodic uplink resources for the UE 115 to transmit the BSR. Additionally or alternatively, the UE 115 may transmit RACH preamble for a four-step RACH during periodic ROs, where the RACH preamble is indicative of a buffer size (e.g., a UE specific/buffer size specific preamble), or may transmit a RACH preamble that includes the BSR, etc. In some cases, the UE 115 may transmit a first message of a two-step RACH procedure (e.g., in a periodic RO) that includes the BSR using a dedicated configuration and a common configuration for the first message of the two-step RACH procedure to include the BSR. Additionally or alternatively, the base station 105 may periodically transmit an uplink grant indicating periodic uplink resources. Subsequently, when the UE 115 identifies uplink data to transmit, the UE 115 may monitor for and receive one of the periodic uplink grants to transmit the BSR on the periodic uplink resources. Additionally or alternatively, the base station 105 may configure a type of scheduling request for the UE 115 to transmit that can indicate whether a buffer size falls within a range (e.g., greater than X bytes and less than Y bytes), where the base station 105 then can more accurately allocate uplink resources in an uplink grant for the UE 115 to transmit the uplink data based on receiving this type of scheduling request.

Figure 2:
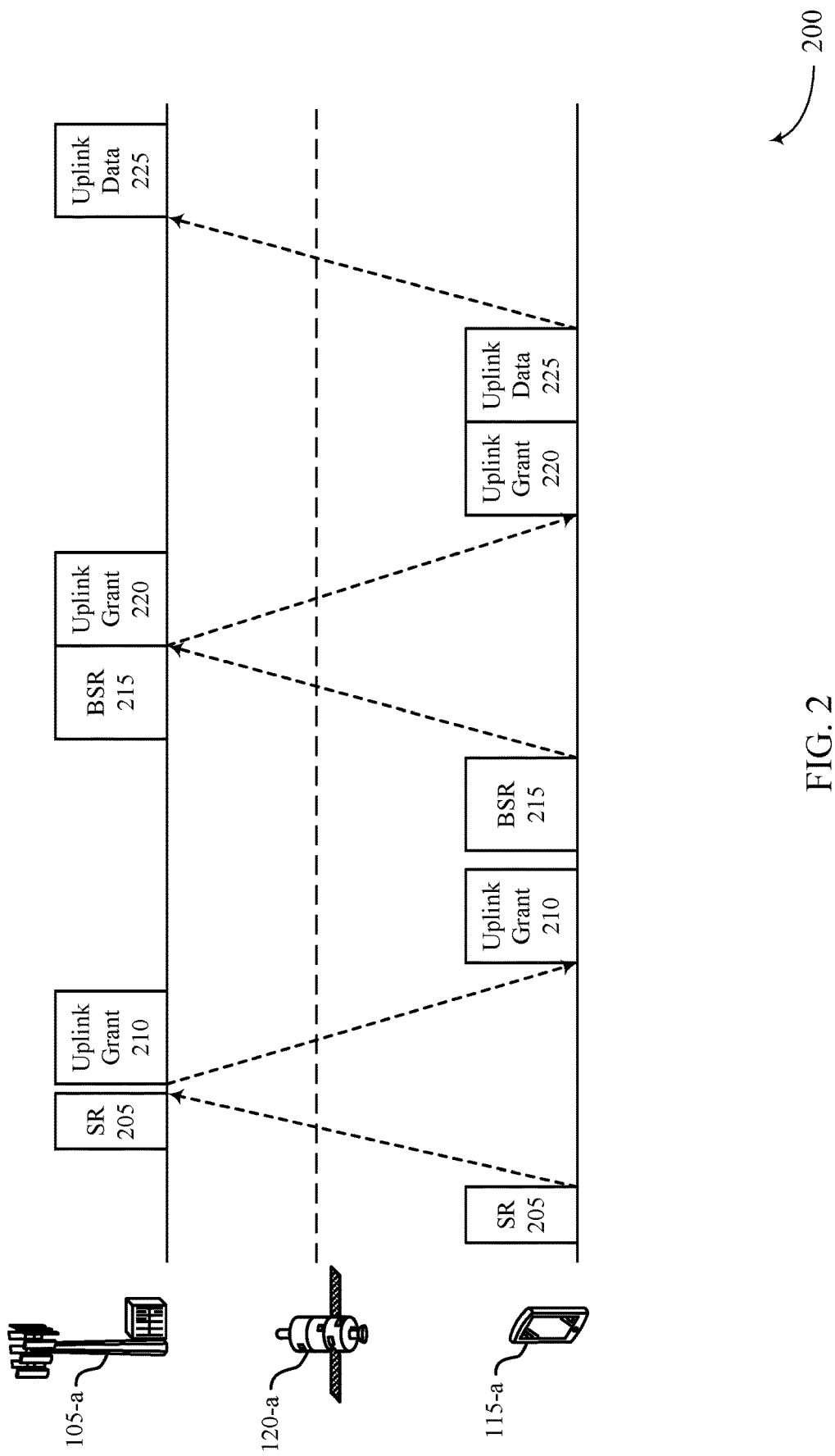
FIG. 2 illustrates an example of an uplink transmission scheme that supports BSR transmissions in NTNs in accordance with aspects of the present disclosure.

FIG. 2 illustrates an example of an uplink transmission scheme 200 that supports BSR transmissions in NTNs in accordance with aspects of the present disclosure. In some examples, uplink transmission scheme 200 may implement aspects of wireless communications system 100. For example, uplink transmission scheme 200 may include a base station 105-*a*, a UE 115-*a*, and a satellite 120-*a*, which may be examples of base stations 105, UEs 115, and satellites 120, respectively, as described above with reference to FIG. 1. In some cases, base station 105-*a*, UE 115-*a*, and satellite 120-*a* may be part of an NTN, where the distances between UE 115-*a* and base station 105-*a*/satellite 120-*a* are large.

When UE 115-*a* has uplink data to transmit and no scheduled uplink resource is available, UE 115-*a* may trigger a scheduling request (SR) 205 to request an uplink grant 210 from base station 105-*a*. Subsequently, UE 115-*a* may receive the uplink grant 210 indicating a limited amount of uplink resources that enables UE 115-*a* to transmit a BSR 215. The BSR 215 (e.g., a MAC control element (CE) that carries the BSR 215) may be of variable size (e.g., a transport block size (TBS) of two (2) bytes to 10 bytes). For example, a short BSR MAC CE may include two (2) bytes and report a BSR of one logical channel group (LCG). Upon receiving the BSR 215, base station 105-*a* may determine the amount of uplink resources that UE 115-*a* needs for transmitting the uplink data. Accordingly, base station 105-*a* may transmit a second uplink grant 220 to UE 115-*a* that indicates uplink resources for UE 115-*a* to transmit uplink data 225. After receiving the second uplink grant 220, UE 115-*a* may transmit the uplink data to base station 105-*a*.

When operating in the NTN, the messages transmitted between UE 115-*a* and base station 105-*a* (e.g., the scheduling request 205, the uplink grant 210, the BSR 215, the second uplink grant 220, and the uplink data 225) may be routed through satellite 120-*a* (e.g., a transparent satellite) and may travel farther distances than in terrestrial networks, thereby increasing delays between UE 115-*a* identifying the uplink data 225 to be transmitted and transmitting the uplink data 225. For example, to transmit the uplink data 225 (e.g., physical uplink shared channel (PUSCH) transmissions) using uplink transmission scheme 200 (e.g., using the scheduling request 205 and the BSR 215), for a geostationary Earth orbit (GEO) regenerative scenario (e.g., with an RTT greater than 270 ms), there may be a delay of over 540 ms. Additionally or alternatively, in a first low-Earth orbit (LEO) transparent scenario (e.g., at 1200 km and an RTT of about 40 ms), there may be a delay of over 80 ms. In a second LEO transparent scenario (e.g., at 600 km and an RTT of about 25 ms), there may be a delay of over 50 ms.

As described herein, UE 115-*a* and base station 105-*a* may employ techniques for transmitting the BSR 215 quickly. That is, the techniques described herein may enable UE 115-*a* to transmit the BSR 215 without the need to transmit the scheduling request 205 for receiving the uplink grant 210 that allocates uplink resources for only transmitting the BSR 215. For example, UE 115-*a* may use dedicated uplink resources for transmitting the BSR 215 (e.g., described in further detail in FIGS. 3 and 4), may transmit the BSR 215 over one or more physical RACH (PRACH) resources (e.g., described in further detail in FIG. 5), may transmit the BSR 215 in a first message of a two-step RACH procedure (e.g., described in further detail in FIG. 6), may receive periodic dynamic uplink grants from base station 105-*a* indicating uplink resources (e.g., dynamically granted uplink resources) for transmitting the BSR 215 (e.g., described in further detail in FIG. 7), or a combination thereof.

Additionally or alternatively, UE 115-*a* and base station 105-*a* may use multiple scheduling request configurations to pseudo-indicate the BSR 215. For example, a number of scheduling request configurations supported by UE 115-*a* may be extended (e.g., from eight (8) to 16). In some cases, UE 115-*a* may include eight (8) LCGs, where each LCG includes a scheduling request configuration. As described herein, UE 115-*a* may be configured with an additional scheduling request per LCG to indicate whether a buffer size is greater than 'X' bytes and less than 'Y' bytes. For example, the additional scheduling request may indicate whether a size of the BSR 215 is greater than or less than 'X' byte for the LCG. In some cases, the value of 'X' may be negotiated between UE 115-*a* and the network (e.g., base station 105-*a*). As such, by transmitting this additional scheduling request, base station 105-*a* may determine an approximate size of the BSR 215 such that base station 105-*a* can transmit an uplink grant to UE 115-*a* for an uplink data transmission bypassing the need for multiple uplink grant transmissions, and UE 115-*a* may transmit the BSR 215 and the uplink data 225 to base station 105-*a* without the extra signaling.

In some cases, this scheduling request configuration to report the BSR 215 may be in addition to existing possible scheduling request configurations and associated with multiple LCGs (e.g., to report a total BSR among all associated LCGs). Additionally, this scheduling request configuration to report the BSR 215 may be configured to be specific for a group of logical channels or LCGs configured either for URLLC or eMBB use cases. In some cases, this scheduling request configuration to report the BSR 215 may be configured to be specific for the logical channels or LCGs configured for a particular numerology (e.g., subcarrier spacing, TTI, etc.). Additionally, UE 115-a may indicate a preference on the scheduling request configuration.

Figure 3:
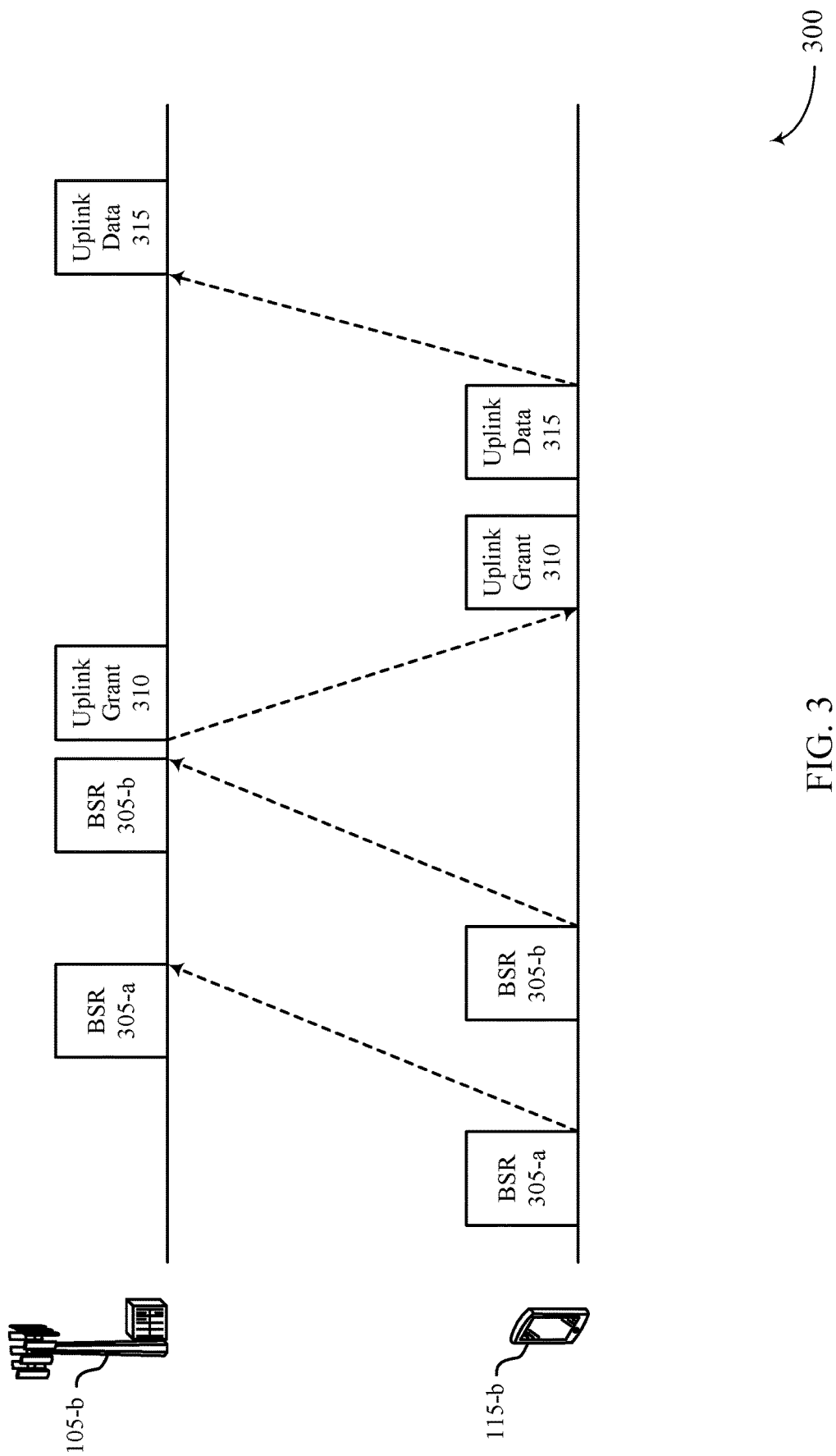
FIGS. 3 and 4 illustrate examples of BSR resource allocations that support BSR transmissions in NTNs in accordance with aspects of the present disclosure.

FIG. 3 illustrates an example of a BSR resource allocation 300 that supports BSR transmissions in NTNs in accordance with aspects of the present disclosure. In some examples, BSR resource allocation 300 may implement aspects of wireless communications system 100 and uplink transmission scheme 200. For example, BSR resource allocation 300 may include a base station 105-b and a UE 115-b, which may be examples of corresponding base stations 105 and UEs 115, respectively, as described with reference to FIGS. 1 and 2. Additionally, BSR resource allocation 300 may enable UE 115-b to transmit a BSR 305 without transmitting a scheduling request and receiving an uplink grant for transmitting the BSR 305.

Base station 105-b may configure dedicated uplink grants for UE 115-b to transmit the BSR 305. For example, base station 105-b may configure periodic dedicated uplink resources (e.g., PUSCH or physical uplink control channel (PUCCH) resources) to UE 115-b for UE 115-b to transmit one or more BSRs 305. As shown, using these periodic dedicated uplink resources, UE 115-b may transmit a first BSR 305-a, a second BSR 305-b, etc., without receiving a configured uplink grant for transmitting the BSRs 305. In some cases, UE 115-b and the network (e.g., base station 105-b) may negotiate on the periodicity of the periodic uplink resources and a TBS of the uplink resources for the BSRs 305. The configuration for the periodic dedicated uplink resources may include a reduced resource overhead (e.g., compared to configured grants to allocate resources for the BSRs 305), no HARQ feedback/retransmission, and no configured scheduling (CS)-radio network temporary identifier (RNTI).

Subsequently, after receiving the one or more BSRs 305 from UE 115-b on the configured dedicated uplink resources, base station 105-b may transmit an uplink grant 310 to UE 115-b. The uplink grant 310 may include an additional uplink resource allocation for UE 115-b to transmit uplink data 315 to base station 105-b. Accordingly, UE 115-b may then transmit the uplink data 315 to base station 105-b.

In some cases, UE 115-b may use the physical (PHY) layer to send the BSR(s) 305 using an uplink control information (UCI) format over the periodic uplink resources configured for transmitting the BSR(s) 305 using the periodic uplink resources. A size of the BSR(s) 305 may be one (1) byte (e.g., a short BSR without a MAC subheader). Additionally or alternatively, UE 115-b may use the MAC layer to send a BSR protocol data unit (PDU) for the BSR(s) 305. Accordingly, UE 115-b may not transmit user uplink data in this resource with the BSR PDU. In some cases, HARQ retransmission may not be used, and any HARQ process may be used. Additionally or alternatively, a first HARQ process (e.g., HARQ process=0) may be used, or HARQ process may be disabled. In some cases, a TBS allocated for the scheduled uplink resource may be configured to be at least two (2) bytes. Additionally, the periodicity of the periodic uplink resources for the BSRs 305 may be configured to be smaller than an RTT for base station 105-b (e.g., the cell).

UE 115-b may transmit multiple BSRs 305 (e.g., truncated short BSRs, short BSRs, etc.) for different LCGs within an RTT at different occasions. That is, UE 115-b may transmit the multiple BSRs 305 until the uplink grant 310 is received from base station 105-b (e.g., from the first BSR 305-a transmission). In some cases, UE 115-b may transmit a same BSR 305 for each BSR transmission on the periodic uplink resources (e.g., BSR repetitions). If base station 105-b receives multiple BSRs 305 for a same LCG, a latest BSR 305 may override a previous BSR 305 for the given LCG. Additionally, if the uplink resources for the uplink data 315 has been already scheduled, base station 105-b may ignore a BSR 305 for the same LCG. In some cases, a HARQ process may not be repeated within an RTT after scheduling an uplink grant 310 for the uplink data 315. Additionally, in some cases, before receiving an uplink grant, base station 105-b may configure a scheduling request opportunity for UE 115-b to use, where UE 115-b then uses the scheduling request opportunity to transmit a scheduling request to receive an indication of uplink resources for transmitting the uplink data 315.

Figure 4:
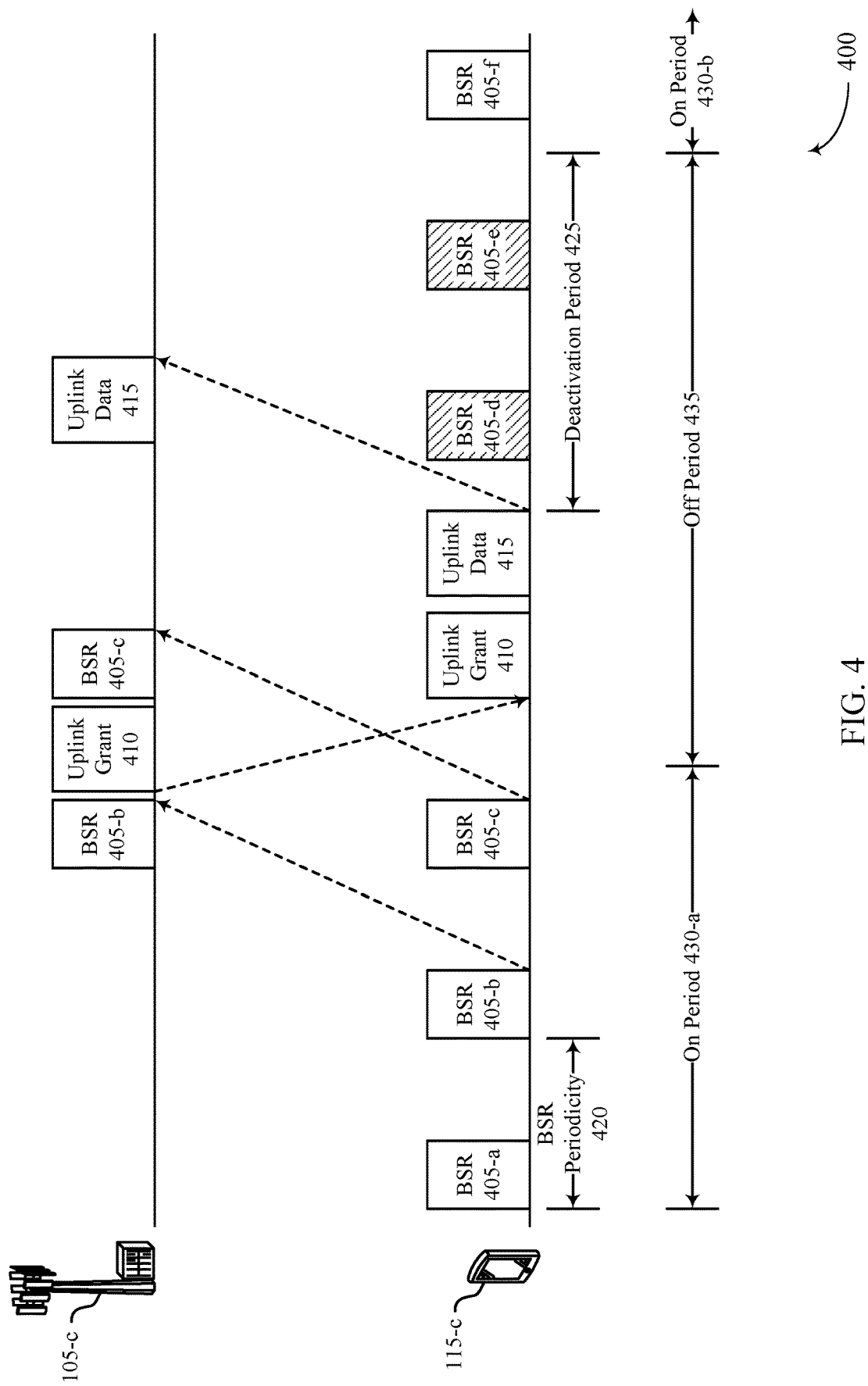

FIG. 4 illustrates an example of a BSR resource allocation 400 that supports BSR transmissions in NTNs in accordance with aspects of the present disclosure. In some examples, BSR resource allocation 400 may implement aspects of wireless communications system 100, uplink transmission scheme 200, and BSR resource allocation 300. For example, BSR resource allocation 400 may include a base station 105-c and a UE 115-c, which may be examples of corresponding base stations 105 and UEs 115, respectively, as described with reference to FIGS. 1-3. Additionally, BSR resource allocation 400 may include periodic uplink resources to enable UE 115-c to transmit one or more BSRs 405 without transmitting a scheduling request and receiving an uplink grant for transmitting the BSR 405. For example, UE 115-c may transmit one or more BSRs 405 during the periodic uplink resources that are allocated according to a BSR periodicity 420, may receive an uplink grant 410 from base station 105-c indicating configured scheduled uplink resources, and may transmit uplink data 415 to base station 105-c using the configured scheduled uplink resources.

In some cases, the periodic uplink resources for UE 115-c to transmit the BSRs 405 may be activated and deactivated. For example, the dedicated periodic uplink resources for the BSR 405 transmissions may be type 1 (e.g., semi-static), and base station 105-c may configure the dedicated periodic uplink resources via RRC signaling. Accordingly, UE 115-c may not need a specific activation message to use the dedicated uplink resources to transmit a BSR 405. Additionally or alternatively, the dedicated periodic uplink resources for the BSR 405 transmissions may be type 2 (e.g., dynamic), such that an activation/deactivation mechanism can be used for UE 115-c to use the dedicated periodic uplink resources to transmit the BSRs 405. For example, base station 105-c may activate the dedicated periodic uplink resources activation by layer 1 (L1) signaling, and UE 115-c (e.g., or base station 105-c) may deactivate the dedicated periodic uplink resources by an uplink MAC CE.

Additionally or alternatively, UE 115-c may trigger a deactivation period 425 of the dedicated periodic uplink resources. For example, once UE 115-c receives the uplink grant 410 from base station 105-c, transmits a scheduling request, transmits multiple BSRs 405 that exceeds a threshold value (e.g., x>1 consecutive BSRs 405), transmits the uplink data 415 (e.g., PUSCH data), or a combination thereof, the dedicated periodic uplink resources (e.g., the dedicated configured uplink grant for BSRs 405) may enter the deactivation period 425 (e.g., be deactivated) or may not be used until activated by base station 105-c, until a configured off period elapses (e.g., a configured time OFF period expires), or a combination thereof. As shown, based on receiving the uplink grant 410 and transmitting the uplink data 415, UE 115-c may trigger the deactivation period 425, such that dedicated uplink resources for a BSR 405-d and a BSR 405-e are not activated or used by UE 115-c. Base station 105-c may also identify and determine the deactivation period 425 based on the described techniques (e.g., transmitting the uplink grant 410, receiving a scheduling request, receiving multiple consecutive BSRs 405, receiving the uplink data 415, etc.).

In some cases, the dedicated periodic uplink resources may include periodic activation and deactivation states. For example, base station 105-c may configure and indicate the dedicated periodic uplink resources to include defined on-off periods with an on period 430 and an off period 435. After using a dedicated uplink resource during the on period 430, the dedicated periodic uplink resources for BSR 405 transmissions may be deactivated until a start of a next on period 430. For example, the dedicated periodic uplink resources may be activated during the on periods 430. As shown, a first on period 430-a may be active such that the dedicated periodic uplink resources are active for a BSR 405-a, a BSR 405-b, and a BSR 405-c (e.g., UE 115-c may not transmit the BSR 405-a based on not identifying uplink data to be transmitted until after the uplink resources lapse for the BSR 405-a). Additionally, the off period 435 may indicate that the dedicated periodic uplink resources are deactivate for the BSR 405-d and the BSR 405-e, and a second on period 430-b may indicate that the dedicated periodic uplink resources for a BSR 405-f are active (e.g., if UE 115-c has uplink data to transmit, UE 115-c may transmit the BSR 405-f on the active dedicated periodic uplink resources).

Figure 5:
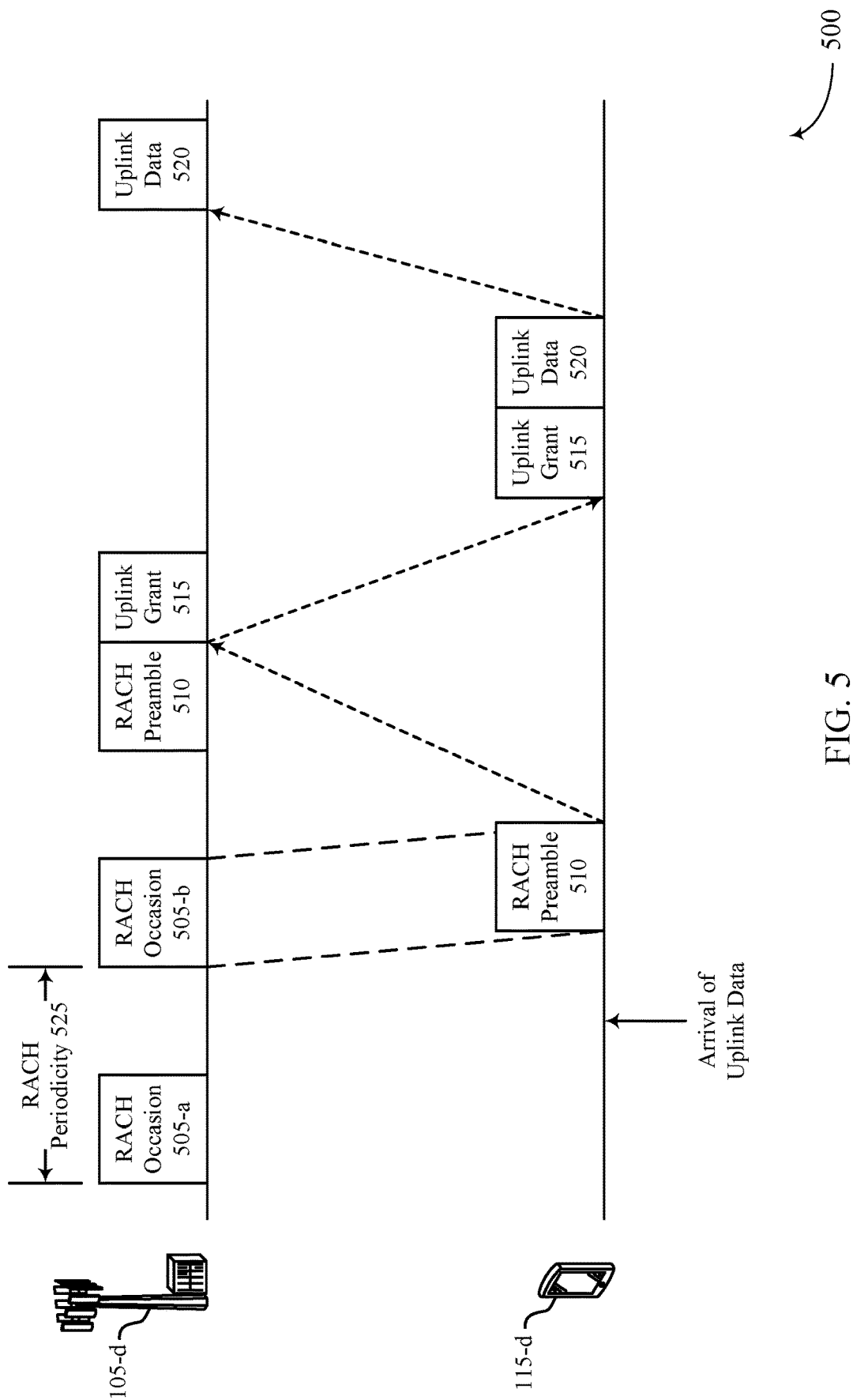
FIG. 5 illustrates an example of a random access occasion configuration that supports BSR transmissions in NTNs in accordance with aspects of the present disclosure.

FIG. 5 illustrates an example of a random access occasion configuration 500 that supports BSR transmissions in NTNs in accordance with aspects of the present disclosure. In some examples, random access occasion configuration 500 may implement aspects of wireless communications system 100 and uplink transmission scheme 200. For example, random access occasion configuration 500 may include a base station 105-d and a UE 115-d, which may be examples of corresponding base stations 105 and UEs 115, respectively, as described with reference to FIGS. 1-4. Additionally, random access occasion configuration 500 may enable UE 115-d to transmit a BSR without transmitting a scheduling request and receiving an uplink grant for transmitting the BSR. That is, UE 115-d may transmit one or more BSRs or associated buffer status information over PRACH resources. Base station 105-d may configure multiple periodic uplink resources in the form of multiple RACH occasions 505, where UE 115-d can transmit RACH messages of a RACH procedure (e.g., four-step RACH, two-step RACH, etc.). Accordingly, UE 115-d may use these RACH occasions 505 and corresponding periodic uplink resources to transmit a BSR or associated buffer status information.

In some cases, base station 105-d may configure a common PRACH resource dedicated for BSRs (e.g., common to multiple UEs 115 including UE 115-d). Subsequently, UE 115-d may use an early data transmission (EDT) concept in an RRC connected state with base station 105-d to transmit the BSRs or associated buffer status information during a first RACH message of a RACH procedure. For example, UE 115-d may transmit a RACH preamble 510 (e.g., Msg1) during a RACH occasion 505-b using the common PRACH resource after detecting an arrival of uplink data, where the RACH preamble includes associated buffer status information to indicate a buffer size of the uplink data to be transmitted. Base station 105-d may then transmit an uplink grant 515 in a second message of the RACH procedure (e.g., Msg2) upon reception of the RACH preamble 510, and UE 115-d may then transmit uplink data 520 and a cell RNTI (C-RNTI) MAC CE (e.g., corresponding to UE 115-d) in a third message of the RACH procedure (Msg3). In some cases, base station 105-d may configure and indicate the common PRACH resource to UE 115-d via dedicated RRC signaling or broadcast signaling (e.g., a first system information block (SIB1), a second system information block (SIB2), remaining minimum system information (RMSI), etc.).

Additionally or alternatively, base station 105-d may configure a dedicated (e.g., UE specific) PRACH resource for UE 115-d to transmit a BSR or associated buffer status information during a RACH occasion 505 (e.g., in a RACH preamble 510). For example, UE 115-d may transmit a UE specific or buffer size specific preamble in the RACH preamble 510 to indicate an approximate size of the uplink data 520 to be transmitted. In some cases, base station 105-d may configure multiple preambles (e.g., or PRACH resources) for different buffer size reporting, and UE 115-d may select a corresponding preamble to transmit for the RACH preamble 510 to indicate the approximate size of the uplink data 520 (e.g., buffer size) to be transmitted. Subsequently, after receiving the RACH preamble 510, base station 105-d may transmit the uplink grant 515 to UE 115-d using a C-RNTI corresponding to UE 115-d. In some cases, base station 105-d may provide multiple TBSs in the uplink grant 515, and UE 115-d may select a TBS from the multiple TBSs received in the uplink grant 515 to transmit the uplink data 520 according to the size of the uplink data 520. In some cases, base station 105-d may transmit downlink control information (DCI) in the uplink grant 515 to indicate a timing advance (TA) adjustment. Additionally, UE 115-d and base station 105-d may negotiate on the number of TBSs to be configured and TBSs.

Figure 6:
FIG. 6 illustrates an example of a random access response that supports BSR transmissions in NTNs in accordance with aspects of the present disclosure.
Figure 6:

FIG. 6 illustrates an example of a random access response 600 that supports BSR transmissions in NTNs in accordance with aspects of the present disclosure. In some examples, random access response 600 may implement aspects of wireless communications system 100, uplink transmission scheme 200, and random access occasion configuration 500. For example, random access response 600 may be transmitted by a base station 105 to a UE 115 as part of a RACH procedure, where the UE 115 transmits a first message of the RACH procedure to indicate a BSR or associated buffer status information during a periodic RACH occasion of periodic uplink resources. In some cases, random access response 600 may be a second message of a two-step RACH procedure, where the first message that the UE 115 transmits to indicate the BSR or associated buffer status information is a first message of the two-step RACH procedure.

In some cases, a contention-based random access (CBRA) two-step procedure and a contention-free random access (CFRA) two-step procedure may be used together. For example, the UE 115 may transmit a C-RNTI and a BSR MAC CE in a first message (e.g., MsgA) payload of the two-step RACH procedure. Additionally, the UE 115 may negotiate a TBS for a second message (e.g., MsgB) of the two-step RACH procedure to enable a possibility of sending uplink data.

The first message of the two-step RACH procedure may include a dedicated configuration (e.g., for a MsgA preamble) and a common configuration (e.g., for a MsgA PUSCH or payload portion). The dedicated configuration may include a periodic uplink resource (e.g., MsgA preamble resource) that is a UE specific configuration for the UE 115. The common configuration may include a common uplink resource (e.g., MsgA PUSCH resource) that can be shared with CBRA, or the common uplink resource may be a common configuration used by UEs 115 that are configured with a CFRA preamble for the first message of the two-step RACH procedure (e.g., MsgA Preamble) that is different from CBRA. In some cases, the payload portion of the first message with the common configuration may not include a C-RNTI MAC CE in case the UE 115 is identified by the dedicated configuration used for the preamble of the first message (e.g., MsgA PRACH resource).

The second message of the two-step RACH procedure (e.g., MsgB) may contain a TA and an uplink grant for the UE 115 to transmit the uplink data (e.g., even if an alignment timer associated with a primary timing advance group (PTAG) is running). In some cases, the random access response 600 may represent the second message of the two-step RACH procedure. For example, the base station 105 may transmit a fallback random access response for the second message of the two-step RACH procedure when a downlink message to the UE 115 (e.g., a physical downlink control channel (PDCCH)) is addressed to a C-RNTI corresponding to the UE 115 and contains an uplink grant that corresponds to uplink data that the UE 115 has to transmit to the base station 105 (e.g., a larger TBS than in a Msg3 transmission). Additionally or alternatively, the second message of the two-step RACH procedure (e.g., MsgB) may include a TA command MAC CE and a MAC service data unit (SDU) containing the uplink grant for the uplink data.

Additionally or alternatively, the base station 105 may transmit a success random access response format for the second message of the two-step RACH procedure that includes a TA and an uplink grant but without a contention resolution identifier or C-RNTI. This success random access response format may be similar to a random access response of a four-step RACH procedure (e.g., Msg2) but without a temporary C-RNTI. In some cases, the base station 105 may transmit an indication to the UE 115 if the UE 115 is expected to receive this success random access response in the second message of the two-step RACH procedure. For example, random access response 600 may include a random access response subheader 605 that includes an E field 610 (e.g., an extension field), a T1 field 615 (e.g., a first type field), a T2 field 620 (e.g., a second type field), an S field 625, and one or more R fields 630 (e.g., reserved fields). Accordingly, the base station 105 may use an R field 630 of the random access response subheader 605 to indicate the success random access response format is present (e.g., by setting the R field 630 to "1").

Figure 7:
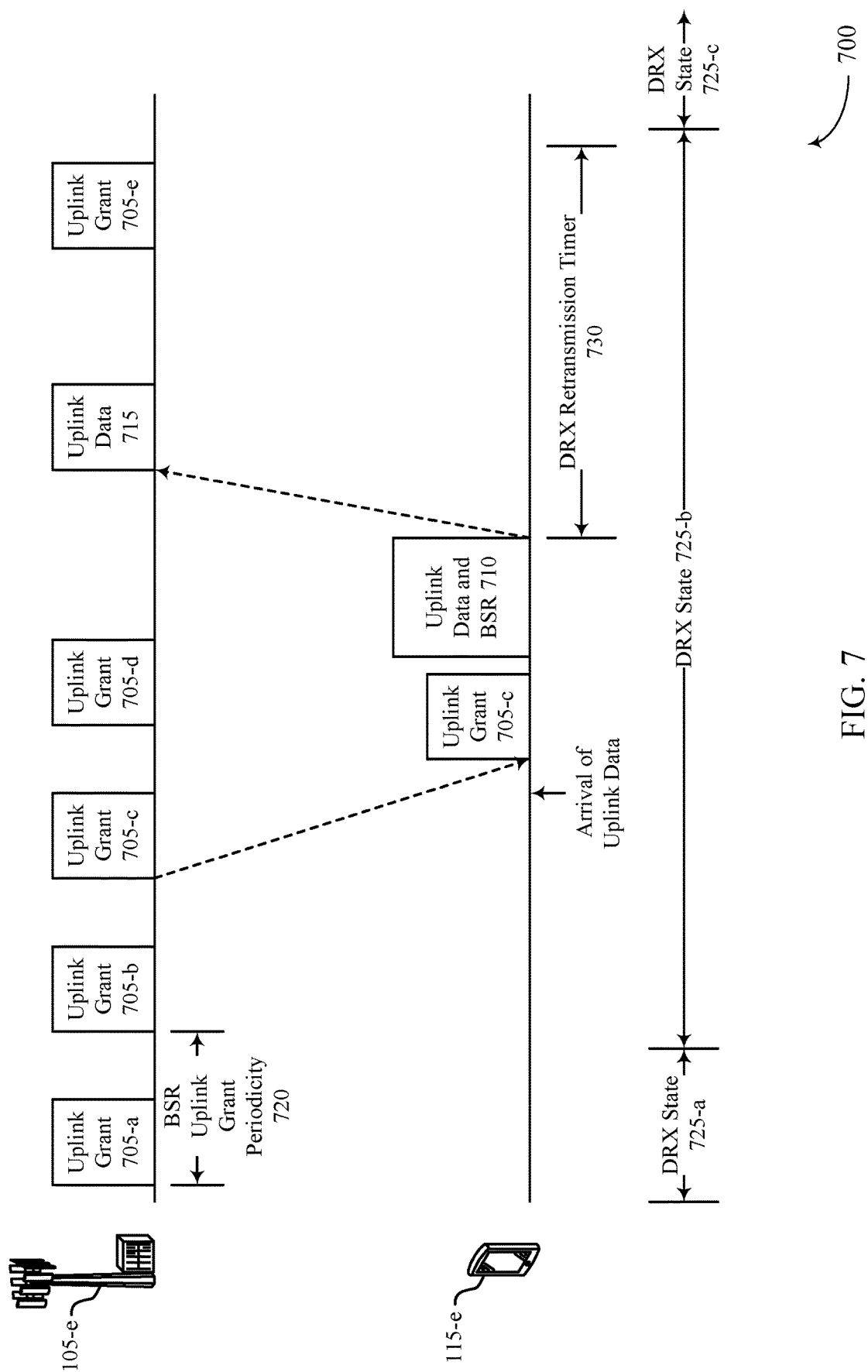
FIG. 7 illustrates an example of a periodic uplink grant configuration that supports BSR transmissions in NTNs in accordance with aspects of the present disclosure.

FIG. 7 illustrates an example of a periodic uplink grant configuration 700 that supports BSR transmissions in NTNs in accordance with aspects of the present disclosure. In some examples, periodic uplink grant configuration 700 may implement aspects of wireless communications system 100 and uplink transmission scheme 200. For example, periodic uplink grant configuration 700 may include a base station 105-e and a UE 115-e, which may be examples of corresponding base stations 105 and UEs 115, respectively, as described with reference to FIGS. 1-6. Additionally, periodic uplink grant configuration 700 may enable UE 115-e to transmit a BSR without transmitting a scheduling request and receiving an uplink grant for transmitting the BSR.

Instead of pre-configured dedicated periodic uplink resources as described with reference to FIGS. 3 and 4, base station 105-e may provide one or more uplink grants periodically to UE 115-e (e.g., periodic dynamic uplink grants). For example, base station 105-e may transmit periodic uplink grants 705 according to a BSR uplink grant periodicity 720. By transmitting the uplink grants 705 periodically, base station 105-e may not reserve the corresponding dedicated uplink resources in long term. For example, when there is already any uplink/downlink activity or a downlink channel (e.g., PDCCH) is overloaded, base station 105-e may not schedule a periodic uplink grant 705. In some cases, UE 115-e may transmit a scheduling request if a scheduling request opportunity occurs before the periodic uplink grants 705 (e.g., configured uplink grant). When UE 115-e identifies an arrival of uplink data, UE 115-e may monitor for and receive a next occurring uplink grant 705 (e.g., uplink grant 705-c) that indicates uplink resources (e.g., dynamically granted uplink resources that correspond to the periodic uplink grant). Accordingly, UE 115-e may then use these uplink resources to transmit uplink data and BSR 710, where base station 105-e may receive the uplink data 715.

Base station 105-e may provide the uplink grants 705 for BSR transmissions periodically regardless of a discontinuous reception (DRX) state 725 of UE 115-e (e.g., even during a DRX sleep time of UE 115-e). For example, UE 115-e have a first DRX state 725-a (e.g., a DRX on or awake period), a second DRX state 725-b (e.g., a DRX off or sleep period), and a third DRX state 725-c (e.g., a DRX on or awake period), where base station 105-e transmits the periodic uplink grants 705 no matter the DRX state 725. In some cases, base station 105-e may enable or disable the periodic uplink grants 705 using dedicated signaling. Additionally, HARQ feedback for the uplink transmissions (e.g., uplink data and BSR 710, PUSCH transmissions, etc.) may be disabled. If HARQ feedback is enabled, an RNTI may be used such that the HARQ feedback is differentiated from a regular dynamic grant (e.g., for retransmission). Upon reception of an uplink grant 705, a current DRX state 725 of UE 115-e may remain the same (e.g., no DRX inactivity timer is started). For example, UE 115-e may remain in a DRX sleep state (e.g., DRX state 725-b) and transmit the uplink data 715. Additionally or alternatively, UE 115-e may remain in an active time/state (e.g., starting a DRX retransmission timer 730) for a possible retransmission or for receiving an additional transmission of the periodic uplink grants 705.

Figure 8:
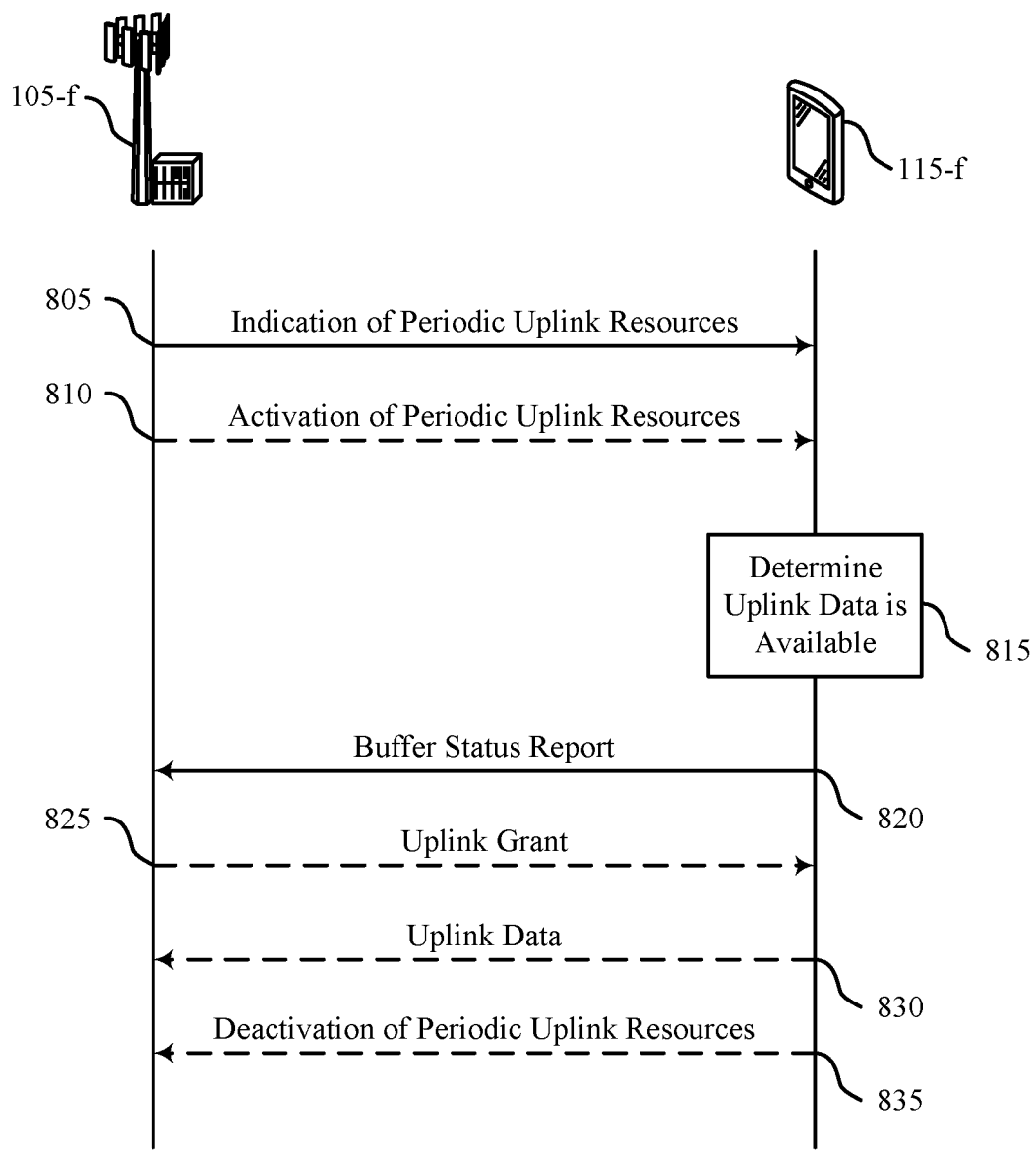
FIGS. 8 and 9 illustrate examples of process flows that support BSR transmissions in NTNs in accordance with aspects of the present disclosure.

FIG. 8 illustrates an example of a process flow 800 that supports BSR transmissions in NTNs in accordance with aspects of the present disclosure. In some examples, process flow 800 may implement aspects of wireless communications system 100, uplink transmission scheme 200, BSR resource allocations 300 and 400, random access occasion configuration 500, random access response 600, and periodic uplink grant configuration 700. For example, process flow 800 may include a base station 105-f and a UE 115-f, which may be examples of corresponding base stations 105 and UEs 115, respectively, as described with reference to FIGS. 1-7.

In the following description of the process flow 800, the operations between UE 115-f and base station 105-f may be transmitted in a different order than the exemplary order shown, or the operations performed by UE 115-f and base station 105-f may be performed in different orders or at different times. Certain operations may also be left out of the process flow 800, or other operations may be added to the process flow 800. It is to be understood that while UE 115-*f* and base station 105-*f* are shown performing a number of the operations of process flow 800, any wireless device may perform the operations shown.

At 805, UE 115-*f* may receive, from base station 105-*f*, configuration information indicating a set of periodic uplink resources dedicated to transmitting buffer status information to base station 105-*f*.

In some cases, UE 115-*f* may receive, from base station 105-*f*, an indication of the set of periodic uplink resources for transmitting one or more BSRs, the buffer status information comprising the one or more BSRs. For example, UE 115-*f* may receive, from base station 105-*f*, the indication of the set of periodic uplink resources via RRC signaling.

Additionally or alternatively, UE 115-*f* may receive, from base station 105-*f*, an indication of one or more random access resources for transmitting one or more random access preambles that correspond to an approximate size of a BSR, the set of periodic uplink resources including the one or more random access resources and the buffer status information including the one or more random access preambles that correspond to the approximate size of the BSR. In some cases, the one or more random access resources may include one or more random access occasions (e.g., RACH occasions) configured for UE 115-*f* to transmit the one or more random access preambles that correspond to the approximate size of the BSR.

In some cases, UE 115-*f* may determine one or more common random access resources configured for transmitting the buffer status information, the set of periodic uplink resources including the one or more common random access resources, where the common random access resources are common to a set of UEs including UE 115-*f*.

Additionally or alternatively, UE 115-*f* may receive, from base station 105-*f*, a dedicated configuration for transmitting a random access preamble for a first random access message of a two-step random access procedure using the uplink resources of the set of periodic uplink resources. In some cases, UE 115-*f* may receive, from base station 105-*f*, the dedicated configuration for the random access preamble via RRC signaling. Additionally, UE 115-*f* may determine a common configuration for transmitting a data portion of the first random access message of the two-step random access procedure. For example, UE 115-*f* may receive, from base station 105-*f*, an indication of the common configuration via RRC signaling, broadcast signaling, one or more SIBs, RMSI, or a combination thereof.

At 810, UE 115-*f* may receive, from base station 105-*f*, an indication activating the set of periodic uplink resources. For example, UE 115-*f* may receive, from base station 105-*f*, the indication of the set of periodic uplink resources via L1 signaling, where the set of periodic uplink resources are activated for transmission of the one or more BSRs based on the L1 signaling.

At 815, UE 115-*f* may determine uplink data is available to transmit to base station 105-*f*.

At 820, UE 115-*f* may transmit, to base station 105-*f*, a BSR using uplink resources from the set of periodic uplink resources according to the configuration information based on the available uplink data to transmit to base station 105-*f*. For example, UE 115-*f* may transmit, to base station 105-*f*, the BSR during a first periodic uplink resource of the set of periodic uplink resources. In some cases, UE 115-*f* may transmit, to base station 105-*f*, an additional BSR during a second periodic uplink resource of the set of periodic uplink resources, where the additional BSR or a scheduling request is transmitted before receiving an uplink grant from base station 105-*f* for the BSR. The BSR may be transmitted for a first LCG of a set of LCGs, and the additional BSR may be transmitted for an additional LCG of the set of LCGs. Additionally or alternatively, the BSR and the additional BSR may be a same BSR. In some cases, the BSR may be transmitted with a UCI format configured for the set of periodic uplink resources. Additionally, the BSR may be transmitted at a PHY layer of UE 115-*f*, a MAC layer of UE 115-*f*, or a combination thereof.

Additionally or alternatively, UE 115-*f* may determine a random access preamble from the one or more random access preambles based on a size of the buffer status report and may transmit, to base station 105-*f*, the random access preamble in a first random access message of a random access procedure in a random access resource of the one or more random access resources. In some cases, UE 115-*f* may receive, from base station 105-*f*, an indication of the one or more common random access resources via RRC signaling, broadcast signaling, one or more SIBs, RMSI, or a combination thereof. Subsequently, UE 115-*f* may transmit, to base station 105-*f*, the BSR as part of a first random access message for a four-step random access procedure using the one or more common random access resources.

In some cases, UE 115-*f* may transmit the BSR in the first random access message of the two-step random access procedure according to the dedicated configuration for transmitting a random access preamble for a first random access message of a two-step random access procedure using the uplink resources of the set of periodic uplink resources. Additionally, UE 115-*f* may transmit, to base station 105-*f*, the BSR in the data portion of the first random access message of the two-step random access procedure according to the common configuration and the dedicated configuration.

At 825, UE 115-*f* may receive, from base station 105-*f*, an uplink grant to transmit the available uplink data. In some cases, base station 105-*f* may determine uplink data is available for UE 115-*f* to transmit to base station 105-*f* based on the BSR, and base station 105-*f* may transmit, to UE 115-*f*, the uplink grant for UE 115-*f* to transmit the uplink data based on the determining the uplink data is available. For example, UE 115-*f* may receive, from base station 105-*f*, the uplink grant in a second random access message of the random access procedure based on transmitting the random access preamble, where the BSR and the uplink data are transmitted to base station 105-*f* according to the uplink grant in a third random access message of the random access procedure. In some cases, the uplink grant may include a C-RNTI corresponding to UE 115-*f*. Additionally or alternatively, the uplink grant may include a set of TBSs, and the BSR and the uplink data may be transmitted according to a TBS of the set of TBSs.

In some cases, UE 115-*f* may receive, from base station 105-*f*, a second random access message for the four-step random access procedure, the second random access message including the uplink grant for the uplink data. Additionally or alternatively, UE 115-*f* may receive, from base station 105-*f*, a second random access message of the two-step random access procedure based on transmitting the BSR in the first random access message, where the second random access message includes the uplink grant for the uplink data, a TA, or a combination thereof. In some cases, the second random access message may include a fallback random access response message addressed to a C-RNTI corresponding to UE 115-*f* and the uplink grant for the uplink data, a TA command MAC CE and MAC SDU containing the uplink grant for the uplink data, a success random access response format that includes the TA and the uplink grant, or a combination thereof. For example, UE 115-f may receive, from base station 105-f, an indication to receive the success random access response format.

Additionally or alternatively, UE 115-f may receive, from base station 105-f, one or more uplink grants for transmitting the buffer status information, the one or more uplink grants transmitted by base station 105-f according to a periodic configuration, where the BSR is transmitted based on receiving an uplink grant of the one or more uplink grants. In some cases, UE 115-f may receive, from base station 105-f, an indication that the one or more uplink grants for transmitting the one or more BSRs are activated, where the BSR is transmitted according to a received uplink grant from the one or more uplink grants based on the indication. Additionally, UE 115-f may determine to maintain a DRX state when an uplink grant of the one or more uplink grants is received. For example, the DRX state may include an active state, a sleep state, or a combination thereof.

At 830, UE 115-f may transmit, to base station 105-f, the available uplink data based on the uplink grant received from base station 105-f (e.g., in the third random access message of the four-step random access procedure, after receiving the second random access message of the two-step random access procedure, etc.). In some cases, UE 115-f may transmit, to base station 105-f, the uplink data and a C-RNTI MAC CE corresponding to UE 115-f in a third random access message for the four-step random access procedure.

At 835, UE 115-f may transmit, to base station 105-f, an uplink MAC CE to deactivate the set of periodic uplink resources (e.g., or base station 105-f transmits the MAC CE to deactivate the periodic uplink resources). In some cases, UE 115-f and base station 105-f may determine that the set of periodic uplink resources is deactivated based on UE 115-f receiving an uplink grant from base station 105-f, UE 115-f transmitting a scheduling request to base station 105-f, UE 115-f transmitting multiple BSRs to base station 105-f that exceeds a threshold value, UE 115-f transmitting the uplink data to base station 105-f, or a combination thereof. Additionally or alternatively, the set of periodic uplink resources may include an on period where the set of periodic uplink resources are active and an off period where the set of periodic uplink resources are deactivated. In some cases, UE 115-f may receive, from base station 105-f, an additional indication that the one or more uplink grants for transmitting the one or more BSRs are deactivated.

Figure 9:
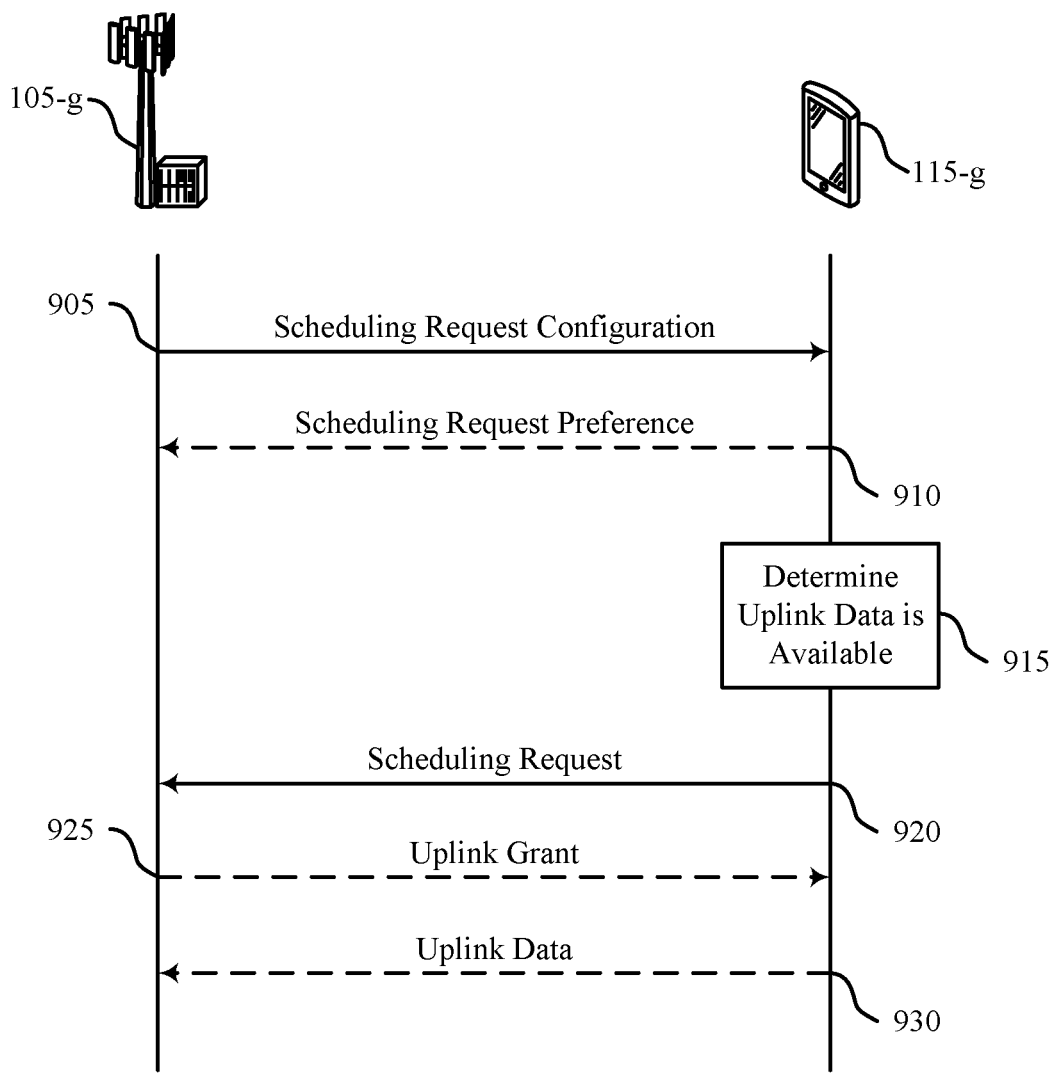

FIG. 9 illustrates an example of a process flow 900 that supports BSR transmissions in NTNs in accordance with aspects of the present disclosure. In some examples, process flow 900 may implement aspects of wireless communications system 100 and uplink transmission scheme 200. For example, process flow 900 may include a base station 105-g and a UE 115-g, which may be examples of corresponding base stations 105 and UEs 115, respectively, as described with reference to FIGS. 1-8.

In the following description of the process flow 900, the operations between UE 115-g and base station 105-g may be transmitted in a different order than the exemplary order shown, or the operations performed by UE 115-g and base station 105-g may be performed in different orders or at different times. Certain operations may also be left out of the process flow 900, or other operations may be added to the process flow 900. It is to be understood that while UE 115-g and base station 105-g are shown performing a number of the operations of process flow 900, any wireless device may perform the operations shown.

At 905, UE 115-g may receive, from base station 105-g, a scheduling request configuration for indicating a buffer size of buffer status information that is greater than a lower threshold value, less than upper threshold value, or a combination thereof. In some cases, the lower threshold value, the upper threshold value, or both may be negotiated by UE 115-g and base station 105-g. Additionally, the scheduling request configuration may be specific to a group of logical channels, an LCG, an eMBB usage, a URLLC usage, a numerology, a subcarrier spacing, a TTI duration, or a combination thereof.

At 910, UE 115-g may transmit, to base station 105-g, an indication of a preference for the scheduling request configuration.

At 915, UE 115-g may determine uplink data is available to transmit to base station 105-g.

At 920, UE 115-g may transmit, to base station 105-g, a scheduling request according to the scheduling request configuration based on a buffer size for the uplink data being greater than the lower threshold value, less than the upper threshold value, or a combination thereof.

At 925, based on receiving the scheduling request according to the scheduling request configuration, base station 105-g may transmit, to UE 115-g, an uplink grant for UE 115-g to transmit the available uplink data. For example, base station 105-g may determine uplink data is available for UE 115-g to transmit to base station 105-g based on the scheduling request, where the scheduling request indicates an approximate size of the uplink data according to the scheduling request configuration, and may transmit to UE 115-g, the uplink grant for UE 115-g to transmit the uplink data based on the approximate size of the uplink data. In some cases, the scheduling request may allocate an amount of uplink resources sufficient to carry the available uplink data based on the scheduling request configuration indicating an approximate size (e.g., approximate buffer size) of the available uplink data (e.g., greater than the lower threshold value, less than the upper threshold value, or a combination thereof).

At 930, using the allocated uplink resources from the uplink grant, UE 115-g may transmit, to base station 105-g, the available uplink data.

Figure 10:
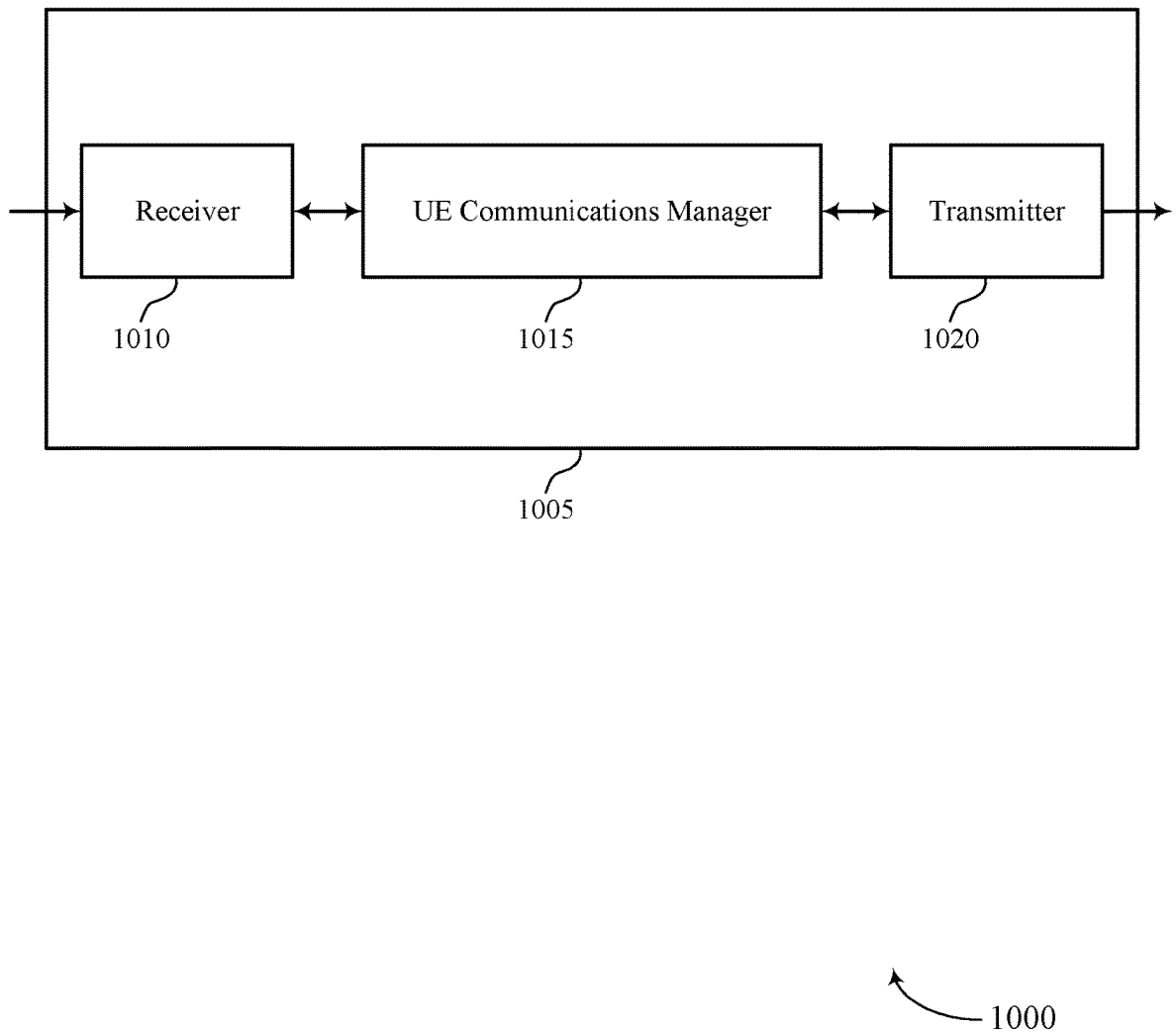
FIGS. 10 and 11 show block diagrams of devices that support BSR transmissions in NTNs in accordance with aspects of the present disclosure.

FIG. 10 shows a block diagram 1000 of a device 1005 that supports BSR transmissions in NTNs in accordance with aspects of the present disclosure. The device 1005 may be an example of aspects of a UE 115 as described herein. The device 1005 may include a receiver 1010, a UE communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to BSR transmissions in NTNs, etc.). Information may be passed on to other components of the device 1005. The receiver 1010 may be an example of aspects of the transceiver 1320 described with reference to FIG. 13. The receiver 1010 may utilize a single antenna or a set of antennas.

The UE communications manager 1015 may receive, from a base station, configuration information indicating a set of periodic uplink resources dedicated to transmitting buffer status information to the base station. In some cases, the UE communications manager 1015 may determine uplink data is available to transmit to the base station. Subsequently, the UE communications manager 1015 may transmit, to the base station, a BSR using uplink resources from the set of periodic uplink resources according to the configuration information based on the available uplink data to transmit to the base station.

Additionally or alternatively, the UE communications manager 1015 may receive, from a base station, a scheduling request configuration for indicating a buffer size of buffer status information that is greater than a lower threshold value, less than an upper threshold value, or a combination thereof. In some cases, the UE communications manager 1015 may determine uplink data is available to transmit to the base station. Subsequently, the UE communications manager 1015 may transmit, to the base station, a scheduling request according to the scheduling request configuration based on a buffer size for the uplink data being greater than the lower threshold value, less than the upper threshold value, or a combination thereof. The UE communications manager 1015 may be an example of aspects of the UE communications manager 1310 described herein.

The actions performed by the UE communications manager 1015 as described herein may support improvements in communications. In one or more aspects, the UE communications manager 1015 may enable a UE to transmit a BSR or buffer status information without requesting uplink resources for transmitting the BSR or buffer status information. For example, the UE communications manager 1015 may use configured periodic uplink resources or a scheduling request configuration to transmit the BSR or buffer status information. As such, by not requesting the uplink resources, the UE communications manager 1015 may enable the UE to reduce signaling overhead by preempting one or more signals with a base station, improve latency, and reduce delay.

The UE communications manager 1015, or its sub-components, may be implemented in hardware, code (e.g., software or firmware) executed by a processor, or any combination thereof. If implemented in code executed by a processor, the functions of the UE communications manager 1015, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 1015, or its sub-components, may be physically located at various positions, including being distributed such that portions of functions are implemented at different physical locations by one or more physical components. In some examples, the UE communications manager 1015, or its sub-components, may be a separate and distinct component in accordance with various aspects of the present disclosure. In some examples, the UE communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
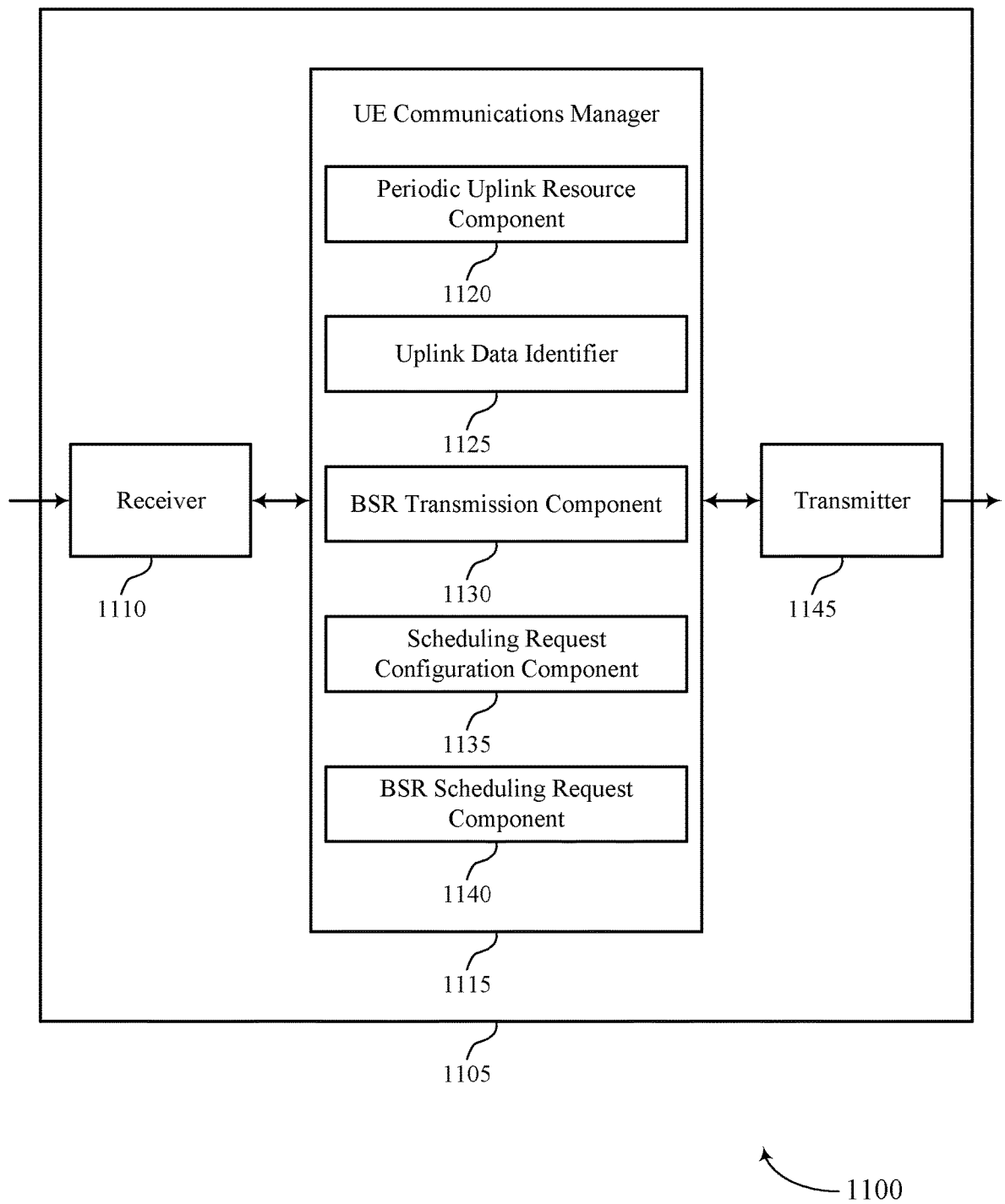

FIG. 11 shows a block diagram 1100 of a device 1105 that supports BSR transmissions in NTNs in accordance with aspects of the present disclosure. The device 1105 may be an example of aspects of a device 1005, or a UE 115 as described herein. The device 1105 may include a receiver 1110, a UE communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to BSR transmissions in NTNs, etc.). Information may be passed on to other components of the device 1105. The receiver 1110 may be an example of aspects of the transceiver 1320 described with reference to FIG. 13. The receiver 1110 may utilize a single antenna or a set of antennas.

The UE communications manager 1115 may be an example of aspects of the UE communications manager 1015 as described herein. The UE communications manager 1115 may include a periodic uplink resource component 1120, an uplink data identifier 1125, a BSR transmission component 1130, a scheduling request configuration component 1135, and a BSR scheduling request component 1140. The UE communications manager 1115 may be an example of aspects of the UE communications manager 1310 described herein.

The periodic uplink resource component 1120 may receive, from a base station, configuration information indicating a set of periodic uplink resources dedicated to transmitting buffer status information to the base station.

The uplink data identifier 1125 may determine uplink data is available to transmit to the base station.

The BSR transmission component 1130 may transmit, to the base station, a BSR using uplink resources from the set of periodic uplink resources according to the configuration information based on the available uplink data to transmit to the base station.

The scheduling request configuration component 1135 may receive, from a base station, a scheduling request configuration for indicating a buffer size of buffer status information that is greater than a lower threshold value, less than an upper threshold value, or a combination thereof.

The BSR scheduling request component 1140 may transmit, to the base station, a scheduling request according to the scheduling request configuration based on a buffer size for the uplink data being greater than the lower threshold value, less than the upper threshold value, or a combination thereof.

Based on using the periodic uplink resources and/or scheduling request configuration, a processor of a UE (e.g., a processor controlling the receiver 1110, the UE communications manager 1115, the transmitter 1145, a transceiver 1320 described with reference to FIG. 13, or a combination thereof) may reduce latency with preparing and transmitting an additional scheduling request to acquire uplink resources for transmitting a BSR or buffer status information. Accordingly, the processor of the UE may enable more efficient communications that would improve battery life of the UE.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
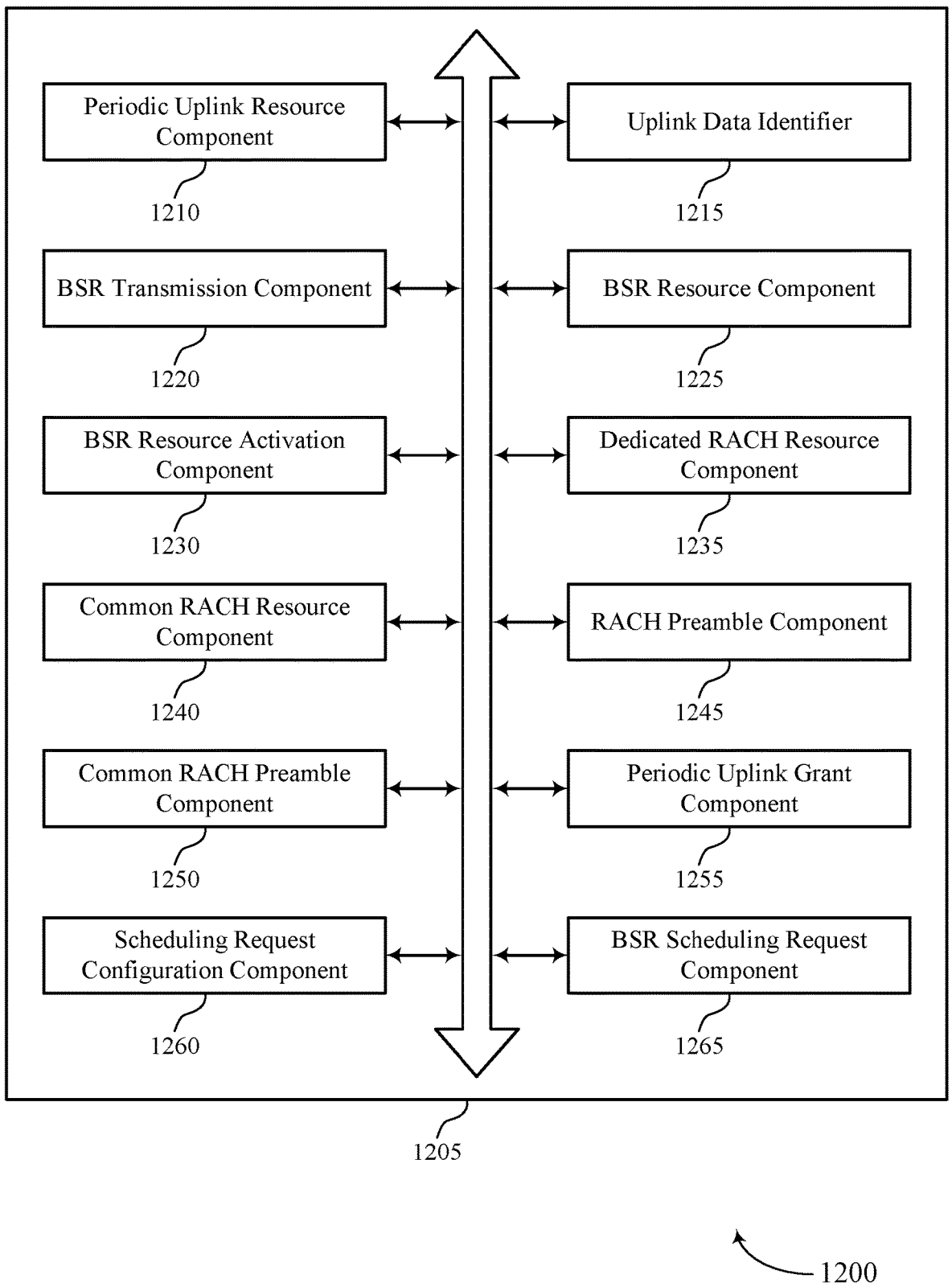
FIG. 12 shows a block diagram of a user equipment (UE) communications manager that supports BSR transmissions in NTNs in accordance with aspects of the present disclosure.

FIG. 12 shows a block diagram 1200 of a UE communications manager 1205 that supports BSR transmissions in NTNs in accordance with aspects of the present disclosure. The UE communications manager 1205 may be an example of aspects of a UE communications manager 1015, a UE communications manager 1115, or a UE communications manager 1310 described herein. The UE communications manager 1205 may include a periodic uplink resource component 1210, an uplink data identifier 1215, a BSR transmission component 1220, a BSR resource component 1225, a BSR resource activation component 1230, a dedicated RACH resource component 1235, a common RACH resource component 1240, a RACH preamble component 1245, a common RACH preamble component 1250, a periodic uplink grant component 1255, a scheduling request configuration component 1260, and a BSR scheduling request component 1265. Each of these modules may communicate, directly or indirectly, with one another (e.g., via one or more buses).

The periodic uplink resource component 1210 may receive, from a base station, configuration information indicating a set of periodic uplink resources dedicated to transmitting buffer status information to the base station.

The uplink data identifier 1215 may determine uplink data is available to transmit to the base station.

The BSR transmission component 1220 may transmit, to the base station, a BSR using uplink resources from the set of periodic uplink resources according to the configuration information based on the available uplink data to transmit to the base station.

The scheduling request configuration component 1260 may receive, from a base station, a scheduling request configuration for indicating a buffer size of buffer status information that is greater than a lower threshold value, less than an upper threshold value, or a combination thereof. In some examples, the scheduling request configuration component 1260 may transmit, to the base station, an indication of a preference for the scheduling request configuration. In some cases, the lower threshold value, the upper threshold value, or both may be negotiated by the UE and the base station. Additionally, the scheduling request configuration is specific to a group of logical channels, an LCG, an eMBB usage, a URLLC usage, a numerology, a subcarrier spacing, a TTI duration, or a combination thereof.

The BSR scheduling request component 1265 may transmit, to the base station, a scheduling request according to the scheduling request configuration based on a buffer size for the uplink data being greater than the lower threshold value, less than the upper threshold value, or a combination thereof.

The BSR resource component 1225 may receive, from the base station, an indication of the set of periodic uplink resources for transmitting one or more BSRs, the buffer status information including the one or more BSRs. For example, the BSR resource component 1225 may receive, from the base station, the indication of the set of periodic uplink resources via RRC signaling. In some examples, the BSR resource component 1225 may transmit, to the base station, the BSR during a first periodic uplink resource of the set of periodic uplink resources. Additionally, the BSR resource component 1225 may transmit, to the base station, an additional BSR during a second periodic uplink resource of the set of periodic uplink resources, where the additional BSR or a scheduling request is transmitted before receiving an uplink grant from the base station for the BSR. In some cases, the BSR may be transmitted for a first logical channel group of a set of logical channel groups, and the additional BSR may be transmitted for an additional logical channel group of the set of logical channel groups. Additionally or alternatively, the BSR and the additional BSR may be a same BSR. In some cases, the BSR may be transmitted with a UCI format configured for the set of periodic uplink resources. In some cases, the BSR may be transmitted at a PHY layer of the UE, a MAC layer of the UE, or a combination thereof.

The BSR resource activation component 1230 may receive, from the base station, the indication of the set of periodic uplink resources via L1 signaling, where the set of periodic uplink resources are activated for transmission of the one or more BSRs based on the L1 signaling. In some examples, the BSR resource activation component 1230 may transmit, to the base station, an uplink MAC CE to deactivate the set of periodic uplink resources. Additionally or alternatively, the BSR resource activation component 1230 may determine that the set of periodic uplink resources is deactivated based on receiving an uplink grant from the base station, transmitting a scheduling request to the base station, transmitting a set of BSRs to the base station that exceeds a threshold value, transmitting the uplink data to the base station, or a combination thereof. In some cases, the set of periodic uplink resources may include an on period where the set of periodic uplink resources are active and an off period where the set of periodic uplink resources are deactivated.

The dedicated RACH resource component 1235 may receive, from the base station, an indication of one or more random access resources for transmitting one or more random access preambles that correspond to an approximate size of the BSR, the set of periodic uplink resources including the one or more random access resources and the buffer status information including the one or more random access preambles that correspond to the approximate size of the BSR. In some examples, the dedicated RACH resource component 1235 may determine a random access preamble from the one or more random access preambles based on a size of the BSR, may transmit, to the base station, the random access preamble in a first random access message of a random access procedure in a random access resource of the one or more random access resources, and may receive, from the base station, an uplink grant in a second random access message of the random access procedure based on transmitting the random access preamble, where the BSR and the uplink data are transmitted to the base station according to the uplink grant in a third random access message of the random access procedure. In some cases, the uplink grant may include a C-RNTI corresponding to the UE. Additionally, the uplink grant may include a set of TBSs, and the BSR and the uplink data are transmitted according to a TBS of the set of TBSs. In some cases, the one or more random access resources may include one or more random access occasions configured for the UE to transmit the one or more random access preambles that correspond to the approximate size of the BSR.

The common RACH resource component 1240 may determine one or more common random access resources configured for transmitting the buffer status information, the set of periodic uplink resources including the one or more common random access resources, where the common random access resources are common to a set of UEs including the UE. In some examples, the common RACH resource component 1240 may transmit, to the base station, the BSR as part of a first random access message for a four-step random access procedure using the one or more common random access resources and may receive, from the base station, a second random access message for the four-step random access procedure, the second random access message including an uplink grant for the uplink data. In some examples, the common RACH resource component 1240 may transmit, to the base station, the uplink data and a C-RNTI MAC CE corresponding to the UE in a third random access message for the four-step random access procedure. In some examples, the common RACH resource component 1240 may receive, from the base station, an indication of the one or more common random access resources via RRC signaling, broadcast signaling, one or more system information blocks, remaining minimum system information, or a combination thereof.

The RACH preamble component 1245 may receive, from the base station, a dedicated configuration for transmitting a random access preamble for a first random access message of a two-step random access procedure using the uplink resources of the set of periodic uplink resources, where the BSR is transmitted in the first random access message of the two-step random access procedure according to the dedicated configuration. In some examples, the RACH preamble component 1245 may receive, from the base station, the dedicated configuration for the random access preamble via RRC signaling.

Additionally, the RACH preamble component 1245 may receive, from the base station, a second random access message of the two-step random access procedure based on transmitting the BSR in the first random access message, where the second random access message includes an uplink grant for the uplink data, a timing advance, or a combination thereof. In some cases, the second random access message includes a fallback random access response message addressed to a C-RNTI corresponding to the UE and the uplink grant for the uplink data, a timing advance command MAC CE and MAC service data unit containing the uplink grant for the uplink data, a success random access response format that includes the timing advance and the uplink grant, or a combination thereof. In some examples, the RACH preamble component 1245 may receive, from the base station, an indication to receive the success random access response format.

The common RACH preamble component 1250 may determine a common configuration for transmitting a data portion of the first random access message of the two-step random access procedure, where the BSR is transmitted in the data portion of the first random access message of the two-step random access procedure according to the common configuration and the dedicated configuration. In some examples, the common RACH preamble component 1250 may receive, from the base station, an indication of the common configuration via RRC signaling, broadcast signaling, one or more SIBs, RMSI, or a combination thereof.

The periodic uplink grant component 1255 may receive, from the base station, one or more uplink grants for transmitting the buffer status information, the one or more uplink grants transmitted by the base station according to a periodic configuration, where the BSR is transmitted based on receiving an uplink grant of the one or more uplink grants. In some examples, the periodic uplink grant component 1255 may receive, from the base station, an indication that the one or more uplink grants for transmitting the one or more BSRs are activated, where the BSR is transmitted according to a received uplink grant from the one or more uplink grants based on the indication. In some examples, the periodic uplink grant component 1255 may receive, from the base station, an additional indication that the one or more uplink grants for transmitting the one or more BSRs are deactivated. In some examples, the periodic uplink grant component 1255 may determine to maintain a discontinuous reception state when an uplink grant of the one or more uplink grants is received. In some cases, the discontinuous reception state may include an active state, a sleep state, or a combination thereof.

Figure 13:
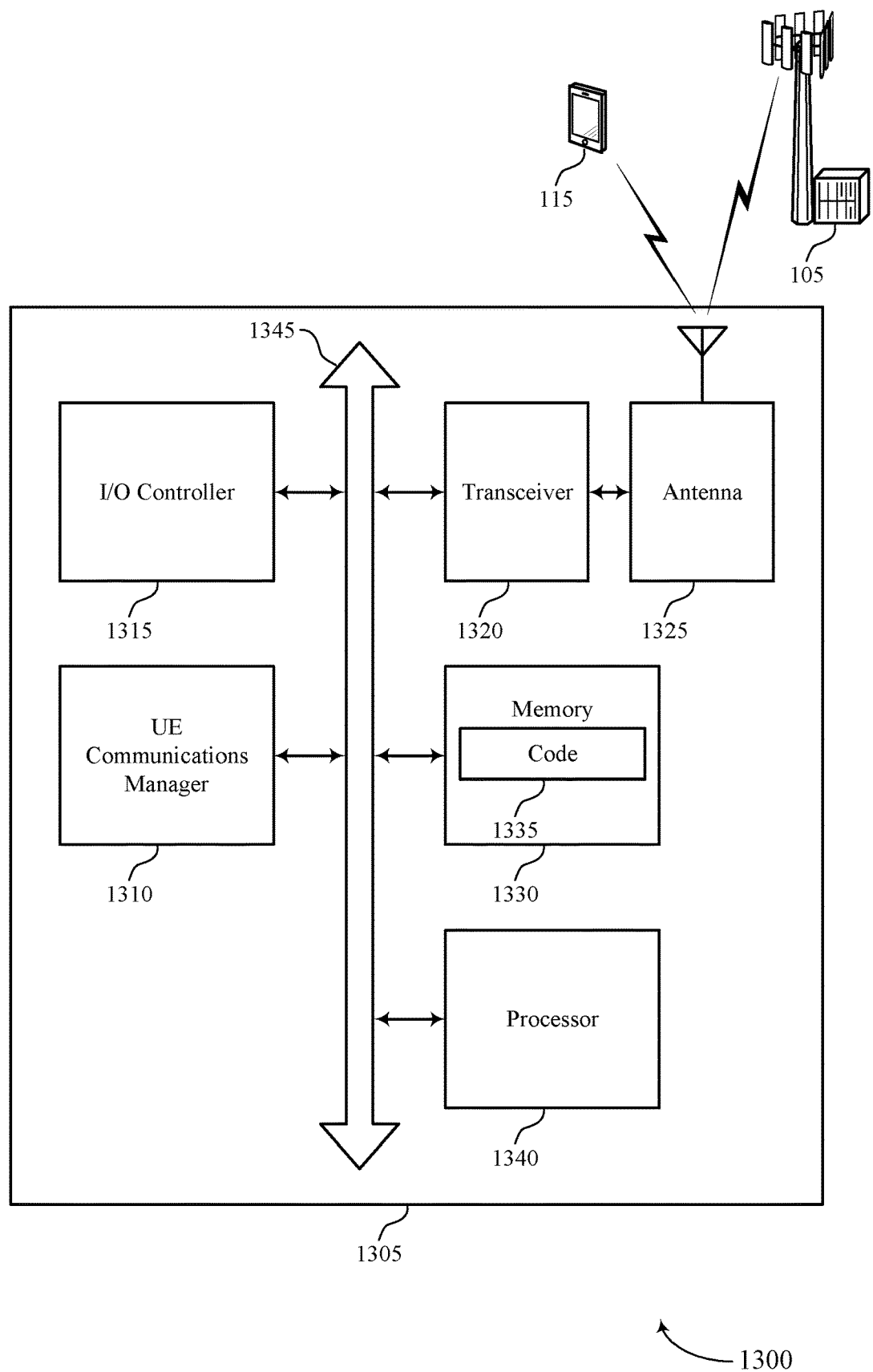
FIG. 13 shows a diagram of a system including a device that supports BSR transmissions in NTNs in accordance with aspects of the present disclosure.

FIG. 13 shows a diagram of a system 1300 including a device 1305 that supports BSR transmissions in NTNs in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a UE communications manager 1310, an I/O controller 1315, a transceiver 1320, an antenna 1325, memory 1330, and a processor 1340. These components may be in electronic communication via one or more buses (e.g., bus 1345).

The UE communications manager 1310 may receive, from a base station, configuration information indicating a set of periodic uplink resources dedicated to transmitting buffer status information to the base station. In some cases, the UE communications manager 1310 may determine uplink data is available to transmit to the base station. Subsequently, the UE communications manager 1310 may transmit, to the base station, a BSR using uplink resources from the set of periodic uplink resources according to the configuration information based on the available uplink data to transmit to the base station.

Additionally or alternatively, the UE communications manager 1310 may receive, from a base station, a scheduling request configuration for indicating a buffer size of buffer status information that is greater than a lower threshold value, less than an upper threshold value, or a combination thereof. In some cases, the UE communications manager 1310 may determine uplink data is available to transmit to the base station. Subsequently, the UE communications manager 1310 may transmit, to the base station, a scheduling request according to the scheduling request configuration based on a buffer size for the uplink data being greater than the lower threshold value, less than the upper threshold value, or a combination thereof.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include random-access memory (RAM) and read-only memory (ROM). The memory 1330 may store computer-readable, computer-executable code 1335 including instructions that, when executed, cause the processor to perform various functions described herein. In some cases, the memory 1330 may contain, among other things, a basic I/O system (BIOS) which may control basic hardware or software operation such as the interaction with peripheral components or devices.

The processor 1340 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting BSR transmissions in NTNs).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
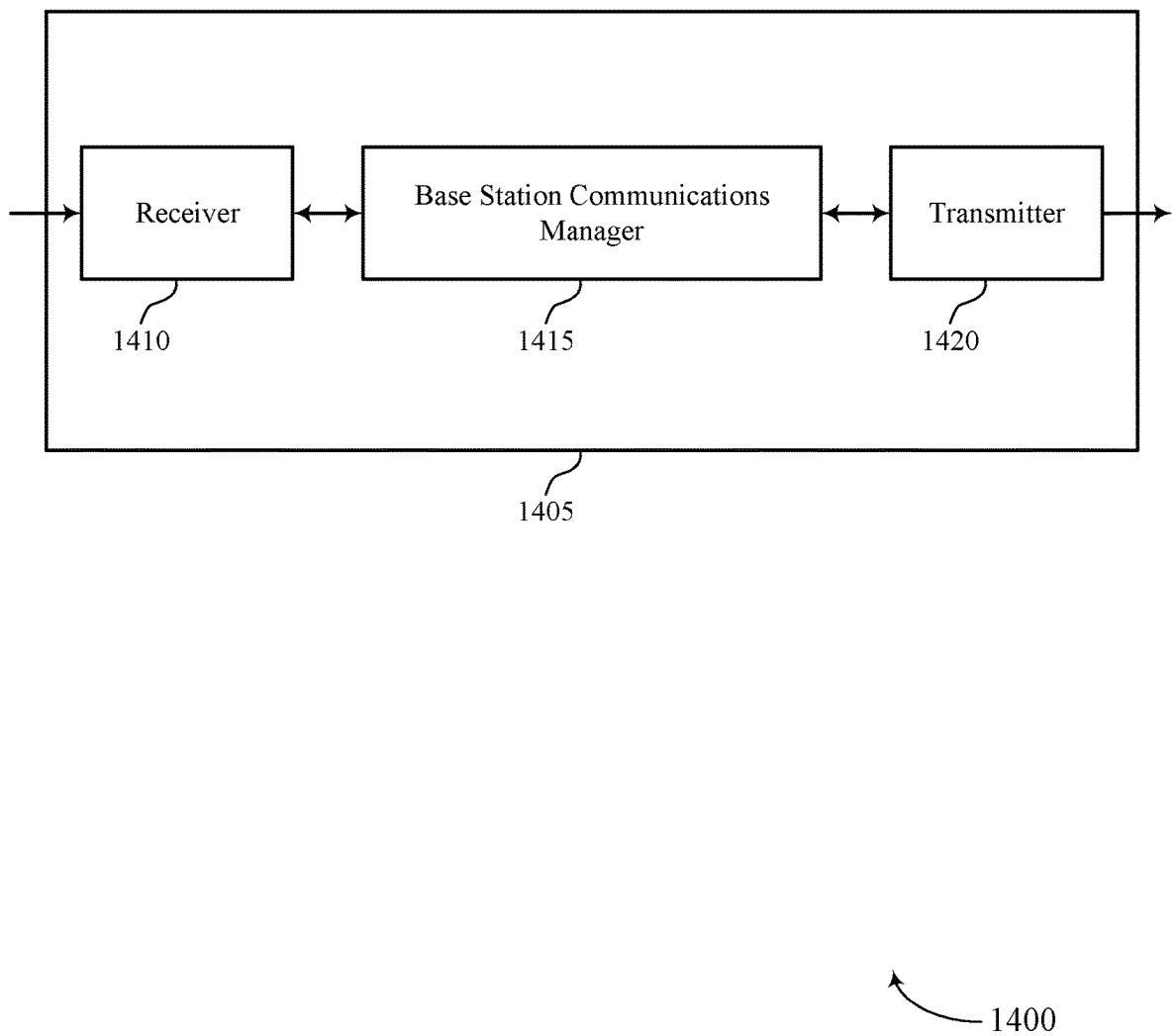
FIGS. 14 and 15 show block diagrams of devices that support BSR transmissions in NTNs in accordance with aspects of the present disclosure.

FIG. 14 shows a block diagram 1400 of a device 1405 that supports BSR transmissions in NTNs in accordance with aspects of the present disclosure. The device 1405 may be an example of aspects of a base station 105 as described herein. The device 1405 may include a receiver 1410, a base station communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to BSR transmissions in NTNs, etc.). Information may be passed on to other components of the device 1405. The receiver 1410 may be an example of aspects of the transceiver 1720 described with reference to FIG. 17. The receiver 1410 may utilize a single antenna or a set of antennas.

The base station communications manager 1415 may transmit, to a UE, configuration information indicating a set of periodic uplink resources dedicated to the UE transmitting buffer status information to the base station. In some cases, the base station communications manager 1415 may receive, from the UE, a BSR using uplink resources from the set of periodic uplink resources according to the configuration information. Additionally, the base station communications manager 1415 may determine uplink data is available for the UE to transmit to the base station based on the BSR. Subsequently, the base station communications manager 1415 may transmit, to the UE, an uplink grant for the UE to transmit the uplink data based on the determining the uplink data is available.

The base station communications manager 1415 may transmit, to a UE, a scheduling request configuration for the UE to indicate a buffer size of buffer status information that is greater than a lower threshold value, less than upper threshold value, or a combination thereof. In some cases, the base station communications manager 1415 may receive, from the UE, a scheduling request according to the scheduling request configuration. Additionally, the base station communications manager 1415 may determine uplink data is available for the UE to transmit to the base station based on the scheduling request, the scheduling request indicating an approximate size of the uplink data according to the scheduling request configuration. Subsequently, the base station communications manager 1415 may transmit, to the UE, an uplink grant for the UE to transmit the uplink data based on the approximate size of the uplink data. The base station communications manager 1415 may be an example of aspects of the base station communications manager 1710 described herein.

The base station communications manager 1415, or its sub-components, may be implemented in hardware, code (e.g., software or firmware) executed by a processor, or any combination thereof. If implemented in code executed by a processor, the functions of the base station communications manager 1415, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1415, or its sub-components, may be physically located at various positions, including being distributed such that portions of functions are implemented at different physical locations by one or more physical components. In some examples, the base station communications manager 1415, or its sub-components, may be a separate and distinct component in accordance with various aspects of the present disclosure. In some examples, the base station communications manager 1415, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
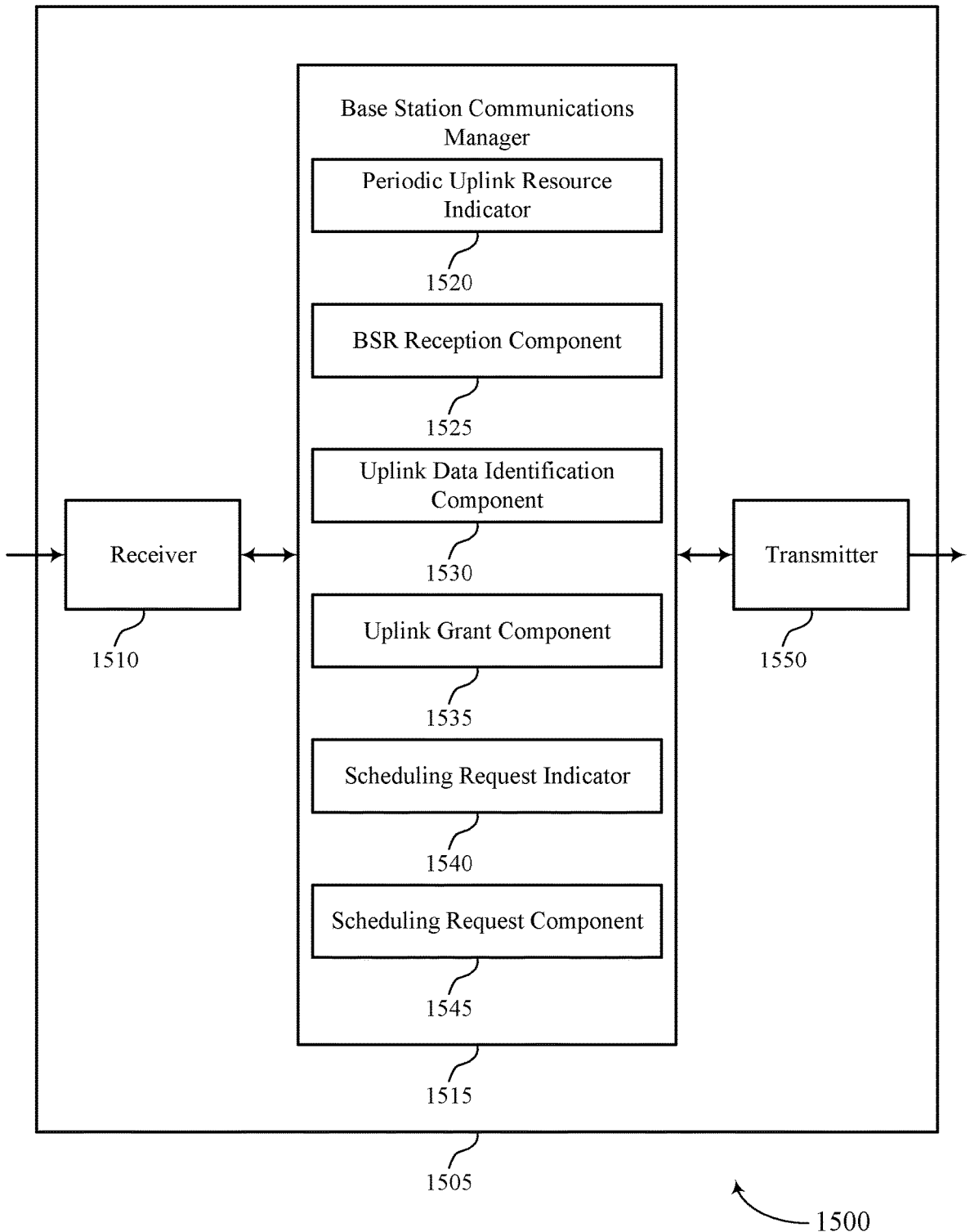

FIG. 15 shows a block diagram 1500 of a device 1505 that supports BSR transmissions in NTNs in accordance with aspects of the present disclosure. The device 1505 may be an example of aspects of a device 1405, or a base station 105 as described herein. The device 1505 may include a receiver 1510, a base station communications manager 1515, and a transmitter 1550. The device 1505 may also include a processor. Each of these components may be in communication with one another (e.g., via one or more buses).

The receiver 1510 may receive information such as packets, user data, or control information associated with various information channels (e.g., control channels, data channels, and information related to BSR transmissions in NTNs, etc.). Information may be passed on to other components of the device 1505. The receiver 1510 may be an example of aspects of the transceiver 1720 described with reference to FIG. 17. The receiver 1510 may utilize a single antenna or a set of antennas.

The base station communications manager 1515 may be an example of aspects of the base station communications manager 1415 as described herein. The base station communications manager 1515 may include a periodic uplink resource indicator 1520, a BSR reception component 1525, an uplink data identification component 1530, an uplink grant component 1535, a scheduling request indicator 1540, and a scheduling request component 1545. The base station communications manager 1515 may be an example of aspects of the base station communications manager 1710 described herein.

The periodic uplink resource indicator 1520 may transmit, to a UE, configuration information indicating a set of periodic uplink resources dedicated to the UE transmitting buffer status information to the base station.

The BSR reception component 1525 may receive, from the UE, a BSR using uplink resources from the set of periodic uplink resources according to the configuration information.

The uplink data identification component 1530 may determine uplink data is available for the UE to transmit to the base station based on the BSR.

The uplink grant component 1535 may transmit, to the UE, an uplink grant for the UE to transmit the uplink data based on the determining the uplink data is available.

The scheduling request indicator 1540 may transmit, to a UE, a scheduling request configuration for the UE to indicate a buffer size of buffer status information that is greater than a lower threshold value, less than upper threshold value, or a combination thereof.

The scheduling request component 1545 may receive, from the UE, a scheduling request according to the scheduling request configuration.

The uplink data identification component 1530 may determine uplink data is available for the UE to transmit to the base station based on the scheduling request, the scheduling request indicating an approximate size of the uplink data according to the scheduling request configuration.

The uplink grant component 1535 may transmit, to the UE, an uplink grant for the UE to transmit the uplink data based on the approximate size of the uplink data.

The transmitter 1550 may transmit signals generated by other components of the device 1505. In some examples, the transmitter 1550 may be collocated with a receiver 1510 in a transceiver module. For example, the transmitter 1550 may be an example of aspects of the transceiver 1720 described with reference to FIG. 17. The transmitter 1550 may utilize a single antenna or a set of antennas.

Figure 16:
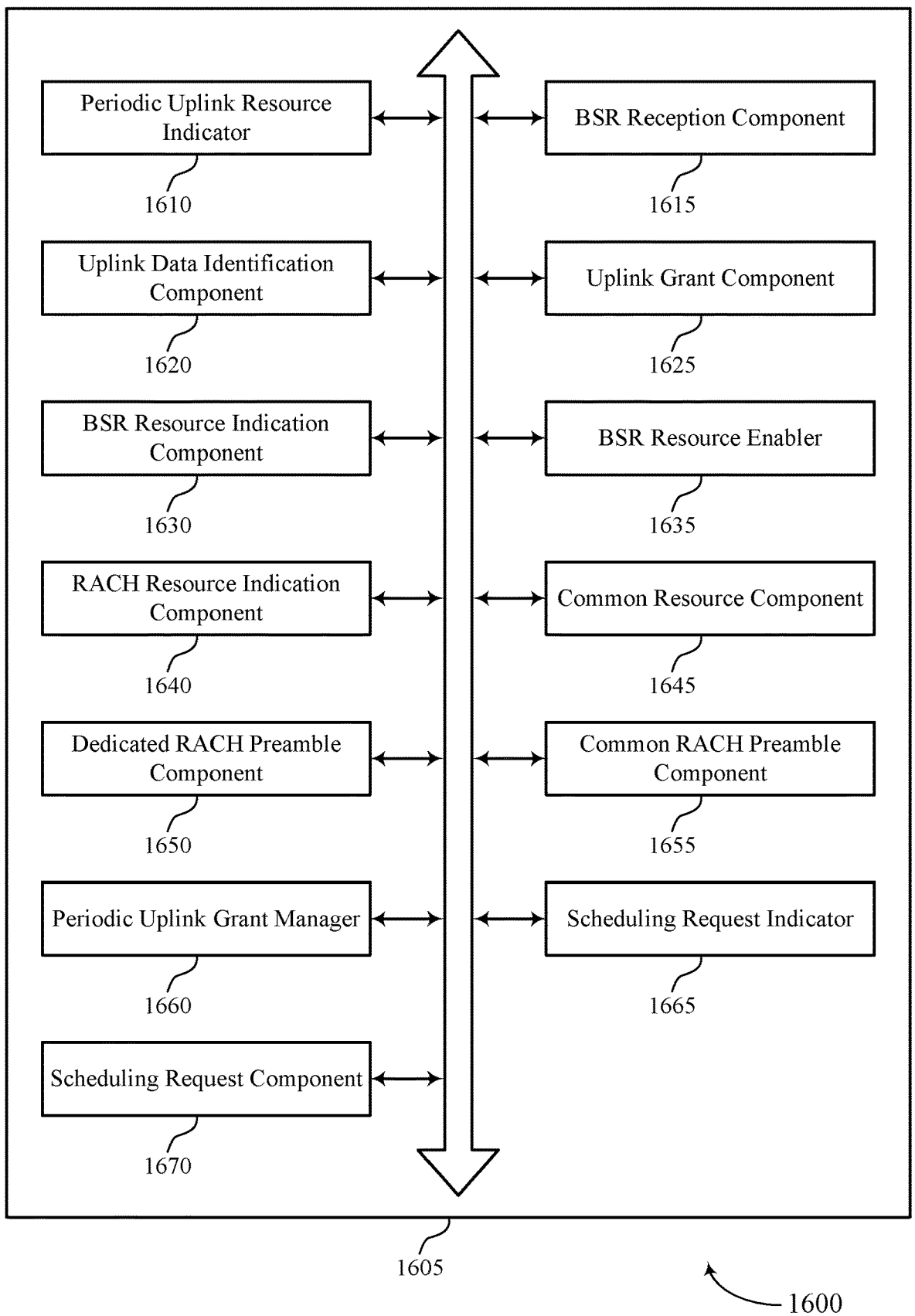
FIG. 16 shows a block diagram of a base station communications manager that supports BSR transmissions in NTNs in accordance with aspects of the present disclosure.

FIG. 16 shows a block diagram 1600 of a base station communications manager 1605 that supports BSR transmissions in NTNs in accordance with aspects of the present disclosure. The base station communications manager 1605 may be an example of aspects of a base station communications manager 1415, a base station communications manager 1515, or a base station communications manager 1710 described herein. The base station communications manager 1605 may include a periodic uplink resource indicator 1610, a BSR reception component 1615, an uplink data identification component 1620, an uplink grant component 1625, a BSR resource indication component 1630, a BSR resource enabler 1635, a RACH resource indication component 1640, a common resource component 1645, a dedicated RACH preamble component 1650, a common RACH preamble component 1655, a periodic uplink grant manager 1660, a scheduling request indicator 1665, and a scheduling request component 1670. Each of these modules may communicate, directly or indirectly, with one another (e.g., via one or more buses).

The periodic uplink resource indicator 1610 may transmit, to a UE, configuration information indicating a set of periodic uplink resources dedicated to the UE transmitting buffer status information to the base station.

The BSR reception component 1615 may receive, from the UE, a BSR using uplink resources from the set of periodic uplink resources according to the configuration information.

The uplink data identification component 1620 may determine uplink data is available for the UE to transmit to the base station based on the BSR.

The uplink grant component 1625 may transmit, to the UE, an uplink grant for the UE to transmit the uplink data based on the determining the uplink data is available.

The scheduling request indicator 1665 may transmit, to a UE, a scheduling request configuration for the UE to indicate a buffer size of buffer status information that is greater than a lower threshold value, less than upper threshold value, or a combination thereof. In some examples, the scheduling request indicator 1665 may receive, from the UE, an indication of a preference for the scheduling request configuration. In some cases, the lower threshold value, the upper threshold value, or both may be negotiated by the UE and the base station. Additionally, the scheduling request configuration may be specific to a group of logical channels, an LCG, an eMBB usage, a URLLC usage, a numerology, a subcarrier spacing, a TTI duration, or a combination thereof.

The scheduling request component 1670 may receive, from the UE, a scheduling request according to the scheduling request configuration. In some examples, the uplink data identification component 1620 may determine uplink data is available for the UE to transmit to the base station based on the scheduling request, the scheduling request indicating an approximate size of the uplink data according to the scheduling request configuration. Additionally, the uplink grant component 1625 may transmit, to the UE, an uplink grant for the UE to transmit the uplink data based on the approximate size of the uplink data.

The BSR resource indication component 1630 may transmit, to the UE, an indication of the set of periodic uplink resources for the UE to transmit one or more BSRs, the buffer status information including the one or more BSRs. In some examples, the BSR resource indication component 1630 may receive, from the UE, the BSR during a first periodic uplink resource of the set of periodic uplink resources. In some examples, the BSR resource indication component 1630 may receive, from the UE, an additional BSR during a second periodic uplink resource of the set of periodic uplink resources, where the additional BSR or a scheduling request is received before transmitting the uplink grant to the UE for the BSR. In some examples, the BSR resource indication component 1630 may transmit, to the UE, the indication of the set of periodic uplink resources via RRC signaling. In some cases, the BSR is received for a first logical channel group of a set of logical channel groups, and the additional BSR is received for an additional logical channel group of the set of logical channel groups. In some cases, the BSR and the additional BSR are a same BSR. In some cases, the BSR is received with an uplink control information format configured for the set of periodic uplink resources. In some cases, the BSR is received from a physical layer of the UE, a medium access control layer of the UE, or a combination thereof.

The BSR resource enabler 1635 may transmit, to the UE, the indication of the set of periodic uplink resources via layer one signaling, where the set of periodic uplink resources are activated for transmission of the one or more BSRs based on the layer one signaling. In some examples, the BSR resource enabler 1635 may receive, from the UE, an uplink MAC CE to deactivate the set of periodic uplink resources. In some examples, the BSR resource enabler 1635 may determine that the set of periodic uplink resources is deactivated based on transmitting the uplink grant to the UE, receiving a scheduling request from the UE, receiving a set of BSRs from the UE that exceeds a threshold value, receiving the uplink data from the UE, or a combination thereof. In some cases, the set of periodic uplink resources includes an on period where the set of periodic uplink resources are active and an off period where the set of periodic uplink resources are deactivated.

The RACH resource indication component 1640 may transmit, to the UE, an indication of one or more random access resources for transmitting one or more random access preambles that correspond to an approximate size of the BSR, the set of periodic uplink resources including the one or more random access resources and the buffer status information including the one or more random access preambles that correspond to the approximate size of the BSR. In some examples, the RACH resource indication component 1640 may receive, from the UE, a random access preamble in a first random access message of a random access procedure in a random access resource of the one or more random access resources, the random access preamble indicating a size of the BSR. In some examples, the RACH resource indication component 1640 may transmit, to the UE, the uplink grant in a second random access message of the random access procedure based on receiving the random access preamble, where the BSR and the uplink data are received from the UE according to the uplink grant in a third random access message of the random access procedure. In some cases, the uplink grant includes a C-RNTI corresponding to the UE. In some cases, the uplink grant includes a set of transport block sizes, and the BSR and the uplink data are transmitted according to a transport block size of the set of transport block sizes. In some cases, the one or more random access resources include one or more random access occasions configured for the UE to transmit the one or more random access preambles that correspond to the approximate size of the BSR.

The common resource component 1645 may determine one or more common random access resources configured for the UE to transmit the buffer status information, the set of periodic uplink resources including the one or more common random access resources, where the common random access resources are common to a set of UEs including the UE. In some examples, the common resource component 1645 may receive, from the UE, the BSR as part of a first random access message for a four-step random access procedure using the one or more common random access resources. In some examples, the common resource component 1645 may transmit, to the UE, a second random access message for the four-step random access procedure, the second random access message including the uplink grant for the uplink data. In some examples, the common resource component 1645 may receive, from the UE, the uplink data and a C-RNTI MAC CE corresponding to the UE in a third random access message for the four-step random access procedure. In some examples, the common resource component 1645 may transmit, to the UE, an indication of the one or more common random access resources via RRC signaling, broadcast signaling, one or more system information blocks, remaining minimum system information, or a combination thereof.

The dedicated RACH preamble component 1650 may transmit, to the UE, a dedicated configuration for the UE to transmit a random access preamble for a first random access message of a two-step random access procedure using the uplink resources of the set of periodic uplink resources, where the BSR is received in the first random access message of the two-step random access procedure according to the dedicated configuration. In some examples, the dedicated RACH preamble component 1650 may, to the UE, a second random access message of the two-step random access procedure based on receiving the BSR in the first random access message, where the second random access message includes an uplink grant for the uplink data, a timing advance, or a combination thereof. In some examples, the dedicated RACH preamble component 1650 may transmit, to the UE, an indication to receive the success random access response format. In some examples, the dedicated RACH preamble component 1650 may transmit, to the UE, the dedicated configuration for the random access preamble via RRC signaling. In some cases, the second random access message includes a fallback random access response message addressed to a C-RNTI corresponding to the UE and the uplink grant for the uplink data, a timing advance command MAC CE and MAC service data unit containing the uplink grant for the uplink data, a success random access response format that includes the timing advance and the uplink grant, or a combination thereof.

The common RACH preamble component 1655 may determine a common configuration for transmitting a data portion of the first random access message of the two-step random access procedure, where the BSR is received in the data portion of the first random access message of the two-step random access procedure according to the common configuration and the dedicated configuration. In some examples, the common RACH preamble component 1655 may transmit, to the UE, an indication of the common configuration via RRC signaling.

The periodic uplink grant manager 1660 may transmit, to the UE, one or more uplink grants for the UE to transmit the buffer status information, the one or more uplink grants transmitted by the base station according to a periodic configuration, where the BSR is received based on transmitting an uplink grant of the one or more uplink grants. In some examples, the periodic uplink grant manager 1660 may transmit, to the UE, an indication that the one or more uplink grants for the UE to transmit the one or more BSRs are activated, where the BSR is received according to a transmitted uplink grant from the one or more uplink grants based on the indication. In some examples, the periodic uplink grant manager 1660 may transmit, to the UE, an additional indication that the one or more uplink grants for the UE to transmit the one or more BSRs are deactivated.

Figure 17:
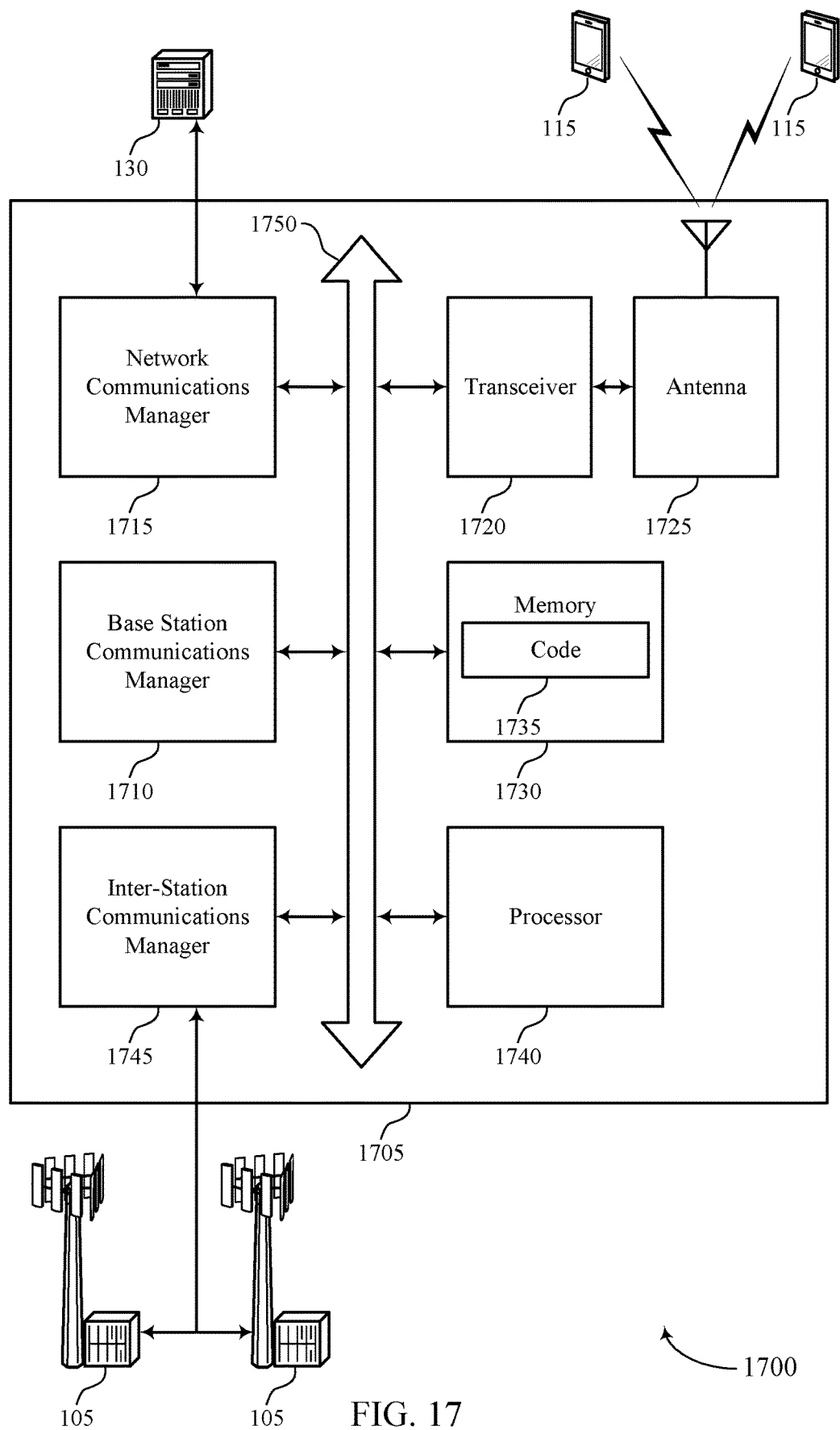
FIG. 17 shows a diagram of a system including a device that supports BSR transmissions in NTNs in accordance with aspects of the present disclosure.

FIG. 17 shows a diagram of a system 1700 including a device 1705 that supports BSR transmissions in NTNs in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a base station communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The base station communications manager 1710 may transmit, to a UE, configuration information indicating a set of periodic uplink resources dedicated to the UE transmitting buffer status information to the base station. In some cases, the base station communications manager 1710 may receive, from the UE, a BSR using uplink resources from the set of periodic uplink resources according to the configuration information. Additionally, the base station communications manager 1710 may determine uplink data is available for the UE to transmit to the base station based on the BSR. Subsequently, the base station communications manager 1710 may transmit, to the UE, an uplink grant for the UE to transmit the uplink data based on the determining the uplink data is available.

Additionally or alternatively, the base station communications manager 1710 may transmit, to a UE, a scheduling request configuration for the UE to indicate a buffer size of buffer status information that is greater than a lower threshold value, less than upper threshold value, or a combination thereof. In some cases, the base station communications manager 1710 may receive, from the UE, a scheduling request according to the scheduling request configuration. Additionally, the base station communications manager 1710 may determine uplink data is available for the UE to transmit to the base station based on the scheduling request, the scheduling request indicating an approximate size of the uplink data according to the scheduling request configuration. Subsequently, the base station communications manager 1710 may transmit, to the UE, an uplink grant for the UE to transmit the uplink data based on the approximate size of the uplink data.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting BSR transmissions in NTNs).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
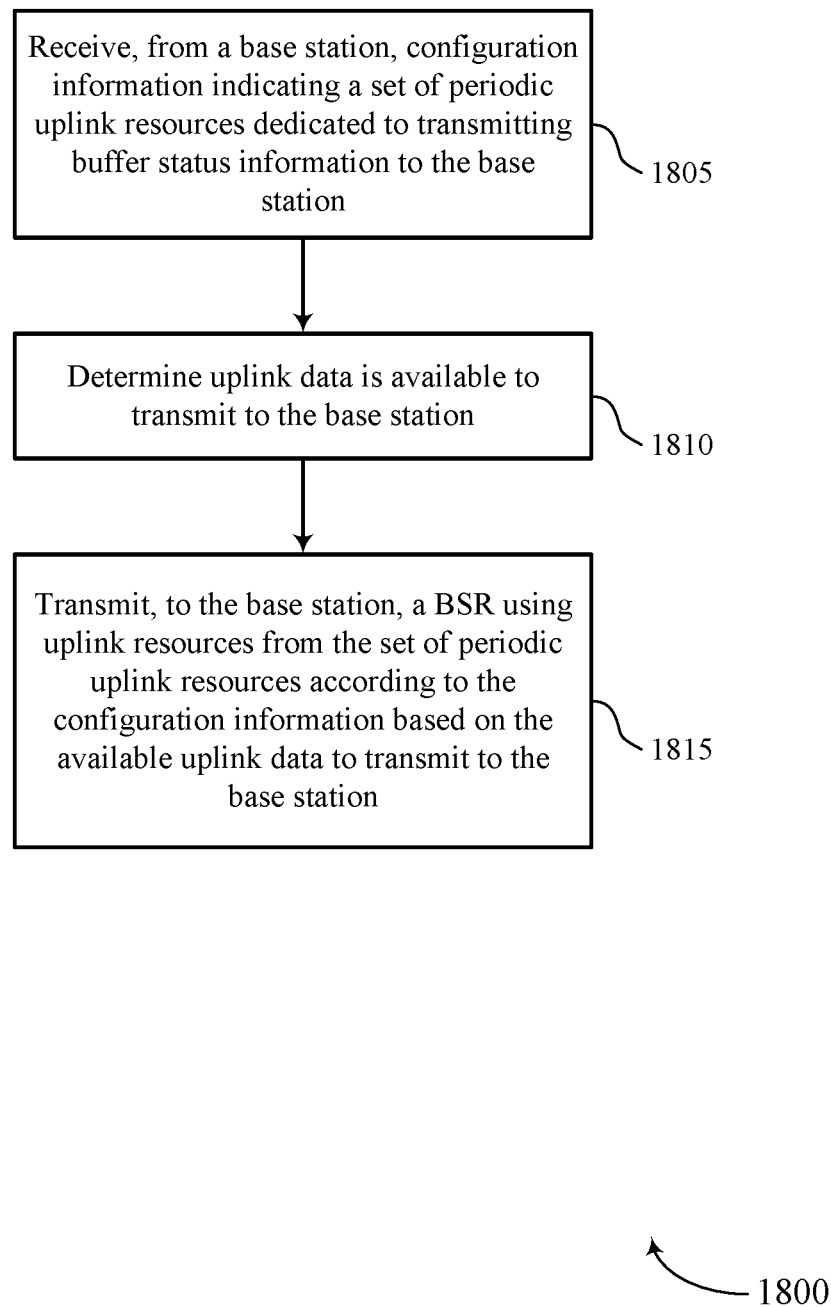
FIGS. 18 through 25 show flowcharts illustrating methods that support BSR transmissions in NTNs in accordance with aspects of the present disclosure.

FIG. 18 shows a flowchart illustrating a method 1800 that supports BSR transmissions in NTNs in accordance with aspects of the present disclosure. The operations of method 1800 may be implemented by a UE 115 or its components as described herein. For example, the operations of method 1800 may be performed by a UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, configuration information indicating a set of periodic uplink resources dedicated to transmitting buffer status information to the base station. The operations of 1805 may be performed according to the methods described herein. In some examples, aspects of the operations of 1805 may be performed by a periodic uplink resource component as described with reference to FIGS. 10 through 13.

At 1810, the UE may determine uplink data is available to transmit to the base station. The operations of 1810 may be performed according to the methods described herein. In some examples, aspects of the operations of 1810 may be performed by an uplink data identifier as described with reference to FIGS. 10 through 13.

At 1815, the UE may transmit, to the base station, a BSR using uplink resources from the set of periodic uplink resources according to the configuration information based on the available uplink data to transmit to the base station. The operations of 1815 may be performed according to the methods described herein. In some examples, aspects of the operations of 1815 may be performed by a BSR transmission component as described with reference to FIGS. 10 through 13.

Figure 19:
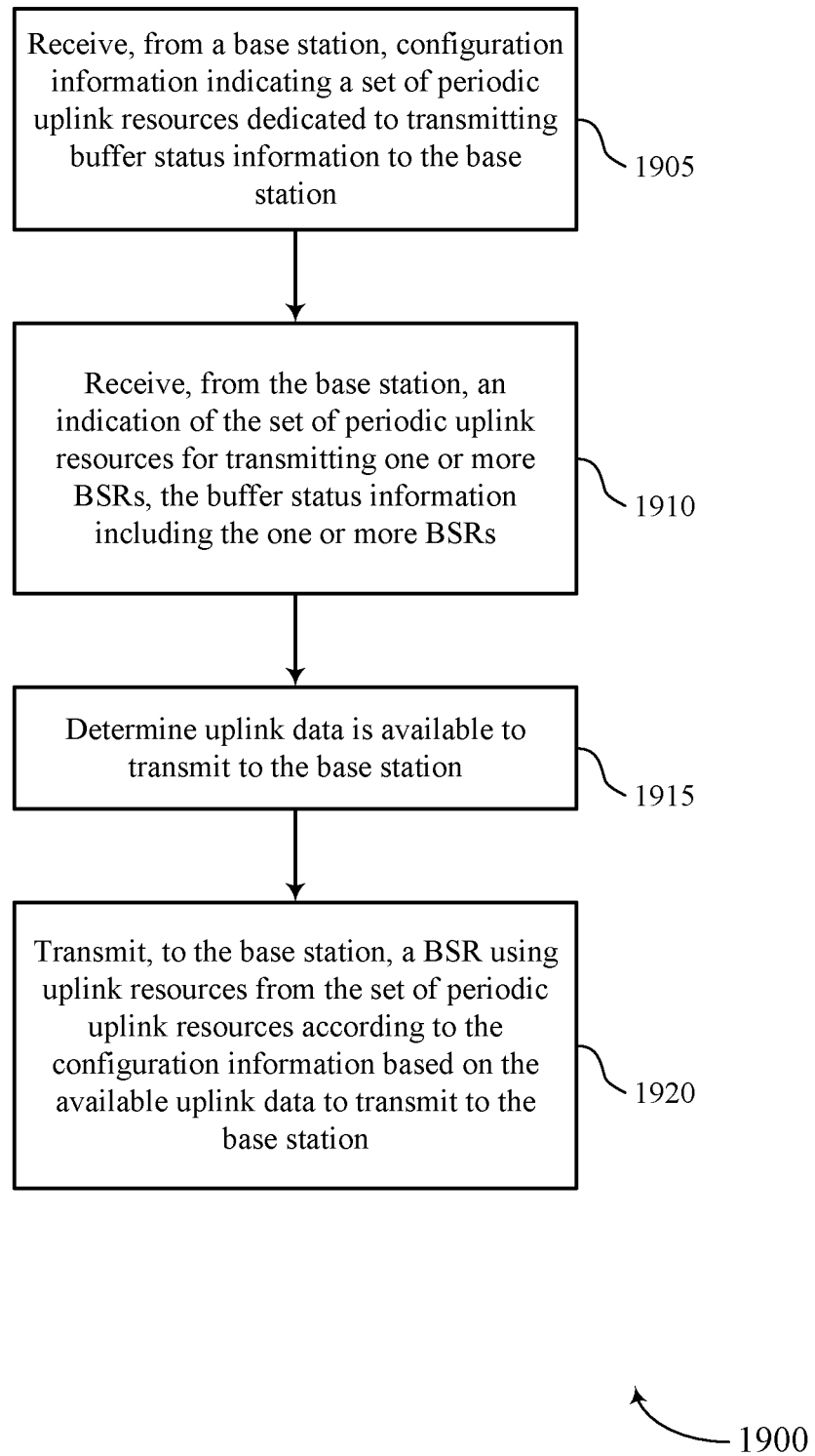

FIG. 19 shows a flowchart illustrating a method 1900 that supports BSR transmissions in NTNs in accordance with aspects of the present disclosure. The operations of method 1900 may be implemented by a UE 115 or its components as described herein. For example, the operations of method 1900 may be performed by a UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, configuration information indicating a set of periodic uplink resources dedicated to transmitting buffer status information to the base station. The operations of 1905 may be performed according to the methods described herein. In some examples, aspects of the operations of 1905 may be performed by a periodic uplink resource component as described with reference to FIGS. 10 through 13.

At 1910, the UE may receive, from the base station, an indication of the set of periodic uplink resources for transmitting one or more BSRs, the buffer status information including the one or more BSRs. The operations of 1910 may be performed according to the methods described herein. In some examples, aspects of the operations of 1910 may be performed by a BSR resource component as described with reference to FIGS. 10 through 13.

At 1915, the UE may determine uplink data is available to transmit to the base station. The operations of 1915 may be performed according to the methods described herein. In some examples, aspects of the operations of 1915 may be performed by an uplink data identifier as described with reference to FIGS. 10 through 13.

At 1920, the UE may transmit, to the base station, a BSR using uplink resources from the set of periodic uplink resources according to the configuration information based on the available uplink data to transmit to the base station. The operations of 1920 may be performed according to the methods described herein. In some examples, aspects of the operations of 1920 may be performed by a BSR transmission component as described with reference to FIGS. 10 through 13.

Figure 20:
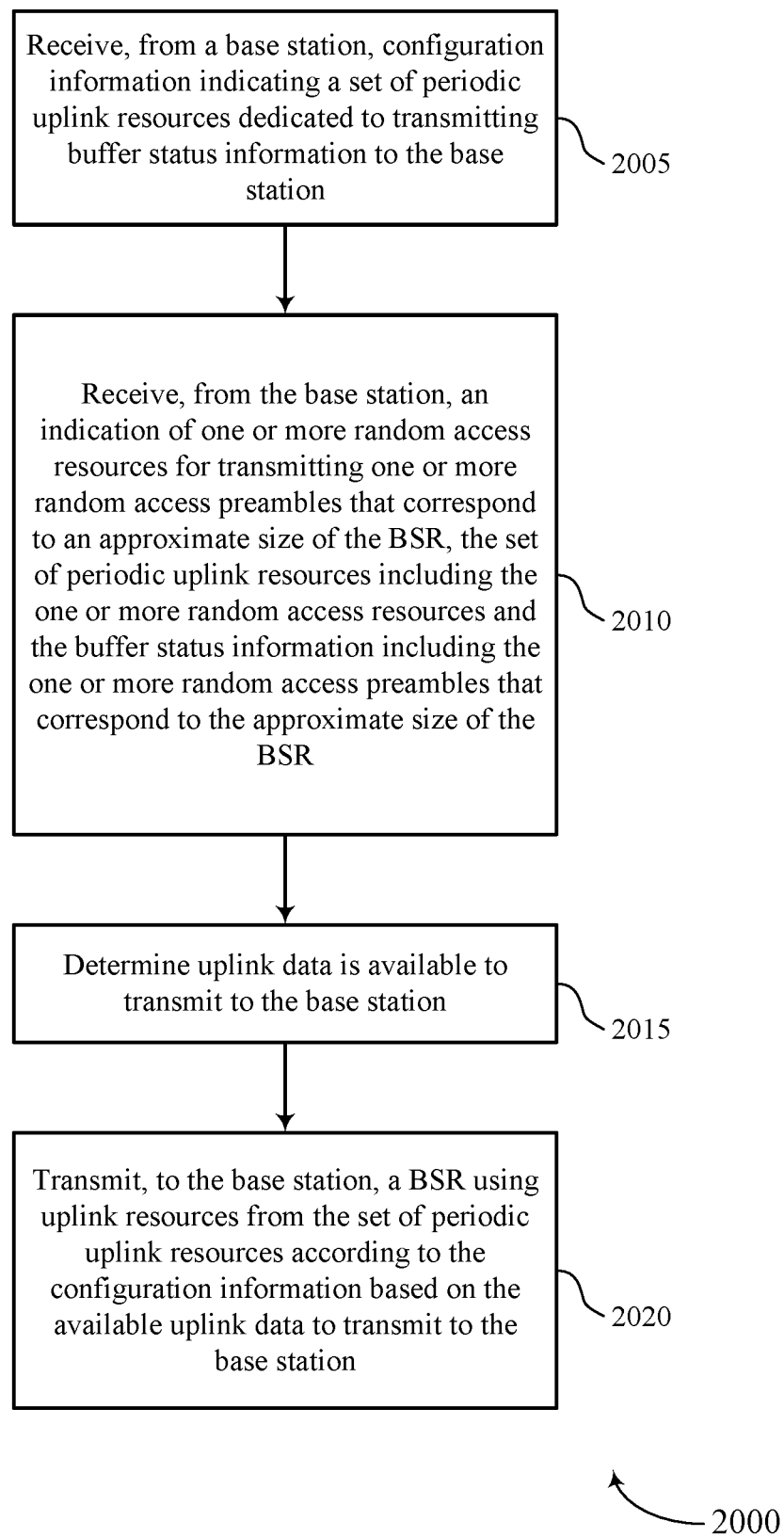

FIG. 20 shows a flowchart illustrating a method 2000 that supports BSR transmissions in NTNs in accordance with aspects of the present disclosure. The operations of method 2000 may be implemented by a UE 115 or its components as described herein. For example, the operations of method 2000 may be performed by a UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2005, the UE may receive, from a base station, configuration information indicating a set of periodic uplink resources dedicated to transmitting buffer status information to the base station. The operations of 2005 may be performed according to the methods described herein. In some examples, aspects of the operations of 2005 may be performed by a periodic uplink resource component as described with reference to FIGS. 10 through 13.

At 2010, the UE may receive, from the base station, an indication of one or more random access resources for transmitting one or more random access preambles that correspond to an approximate size of the BSR, the set of periodic uplink resources including the one or more random access resources and the buffer status information including the one or more random access preambles that correspond to the approximate size of the BSR. The operations of 2010 may be performed according to the methods described herein. In some examples, aspects of the operations of 2010 may be performed by a dedicated RACH resource component as described with reference to FIGS. 10 through 13.

At 2015, the UE may determine uplink data is available to transmit to the base station. The operations of 2015 may be performed according to the methods described herein. In some examples, aspects of the operations of 2015 may be performed by an uplink data identifier as described with reference to FIGS. 10 through 13.

At 2020, the UE may transmit, to the base station, a BSR using uplink resources from the set of periodic uplink resources according to the configuration information based on the available uplink data to transmit to the base station. The operations of 2020 may be performed according to the methods described herein. In some examples, aspects of the operations of 2020 may be performed by a BSR transmission component as described with reference to FIGS. 10 through 13.

Figure 21:
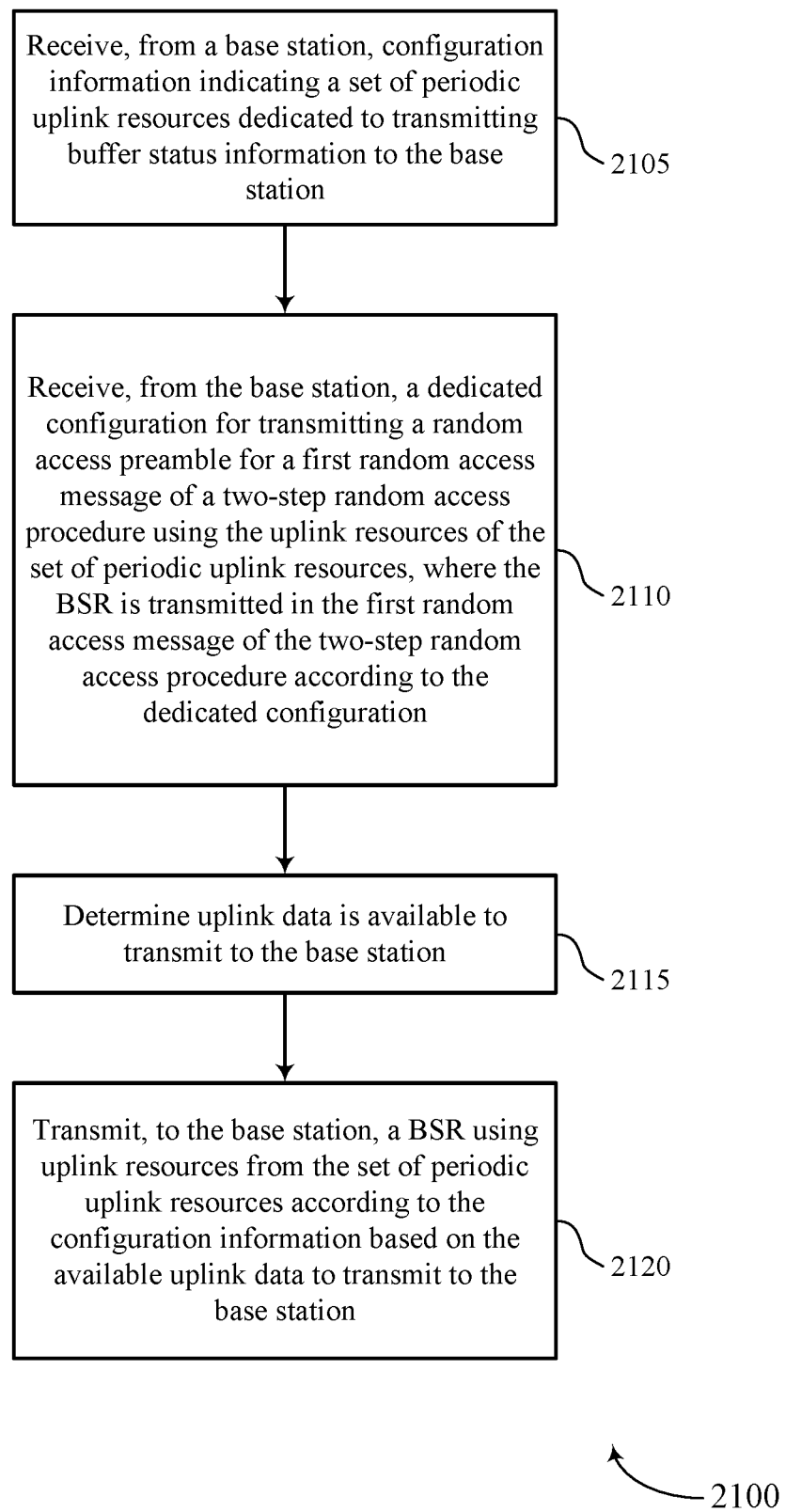

FIG. 21 shows a flowchart illustrating a method 2100 that supports BSR transmissions in NTNs in accordance with aspects of the present disclosure. The operations of method 2100 may be implemented by a UE 115 or its components as described herein. For example, the operations of method 2100 may be performed by a UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2105, the UE may receive, from a base station, configuration information indicating a set of periodic uplink resources dedicated to transmitting buffer status information to the base station. The operations of 2105 may be performed according to the methods described herein. In some examples, aspects of the operations of 2105 may be performed by a periodic uplink resource component as described with reference to FIGS. 10 through 13.

At 2110, the UE may receive, from the base station, a dedicated configuration for transmitting a random access preamble for a first random access message of a two-step random access procedure using the uplink resources of the set of periodic uplink resources, where the BSR is transmitted in the first random access message of the two-step random access procedure according to the dedicated configuration. The operations of 2110 may be performed according to the methods described herein. In some examples, aspects of the operations of 2110 may be performed by a RACH preamble component as described with reference to FIGS. 10 through 13.

At 2115, the UE may determine uplink data is available to transmit to the base station. The operations of 2115 may be performed according to the methods described herein. In some examples, aspects of the operations of 2115 may be performed by an uplink data identifier as described with reference to FIGS. 10 through 13.

At 2120, the UE may transmit, to the base station, a BSR using uplink resources from the set of periodic uplink resources according to the configuration information based on the available uplink data to transmit to the base station. The operations of 2120 may be performed according to the methods described herein. In some examples, aspects of the operations of 2120 may be performed by a BSR transmission component as described with reference to FIGS. 10 through 13.

Figure 22:
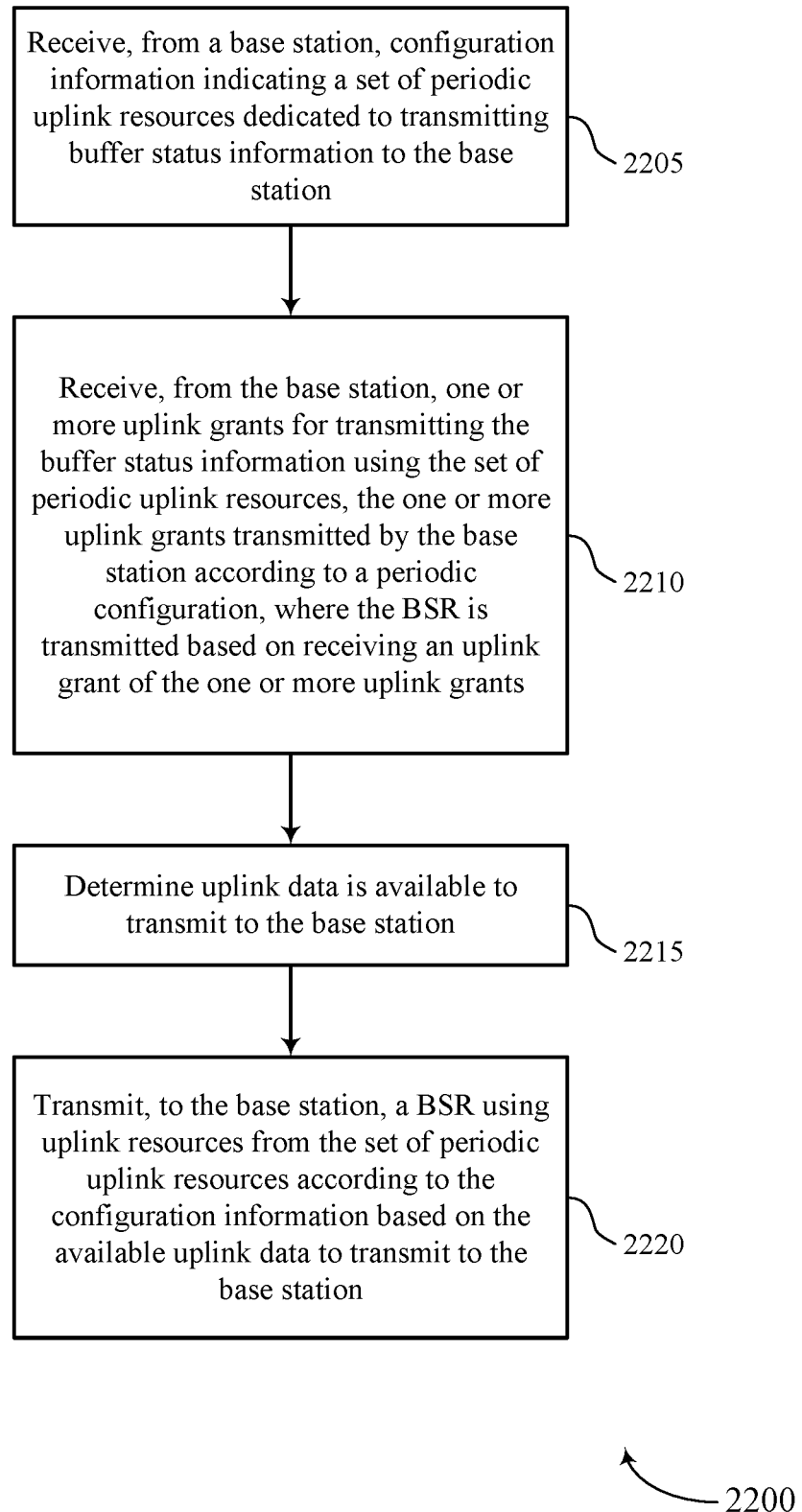

FIG. 22 shows a flowchart illustrating a method 2200 that supports BSR transmissions in NTNs in accordance with aspects of the present disclosure. The operations of method 2200 may be implemented by a UE 115 or its components as described herein. For example, the operations of method 2200 may be performed by a UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2205, the UE may receive, from a base station, configuration information indicating a set of periodic uplink resources dedicated to transmitting buffer status information to the base station. The operations of 2205 may be performed according to the methods described herein. In some examples, aspects of the operations of 2205 may be performed by a periodic uplink resource component as described with reference to FIGS. 10 through 13.

At 2210, the UE may receive, from the base station, one or more uplink grants for transmitting the buffer status information, the one or more uplink grants transmitted by the base station according to a periodic configuration, where the BSR is transmitted based on receiving an uplink grant of the one or more uplink grants. The operations of 2210 may be performed according to the methods described herein. In some examples, aspects of the operations of 2210 may be performed by a periodic uplink grant component as described with reference to FIGS. 10 through 13.

At 2215, the UE may determine uplink data is available to transmit to the base station. The operations of 2215 may be performed according to the methods described herein. In some examples, aspects of the operations of 2215 may be performed by an uplink data identifier as described with reference to FIGS. 10 through 13.

At 2220, the UE may transmit, to the base station, a BSR using uplink resources from the set of periodic uplink resources according to the configuration information based on the available uplink data to transmit to the base station. The operations of 2220 may be performed according to the methods described herein. In some examples, aspects of the operations of 2220 may be performed by a BSR transmission component as described with reference to FIGS. 10 through 13.

Figure 23:
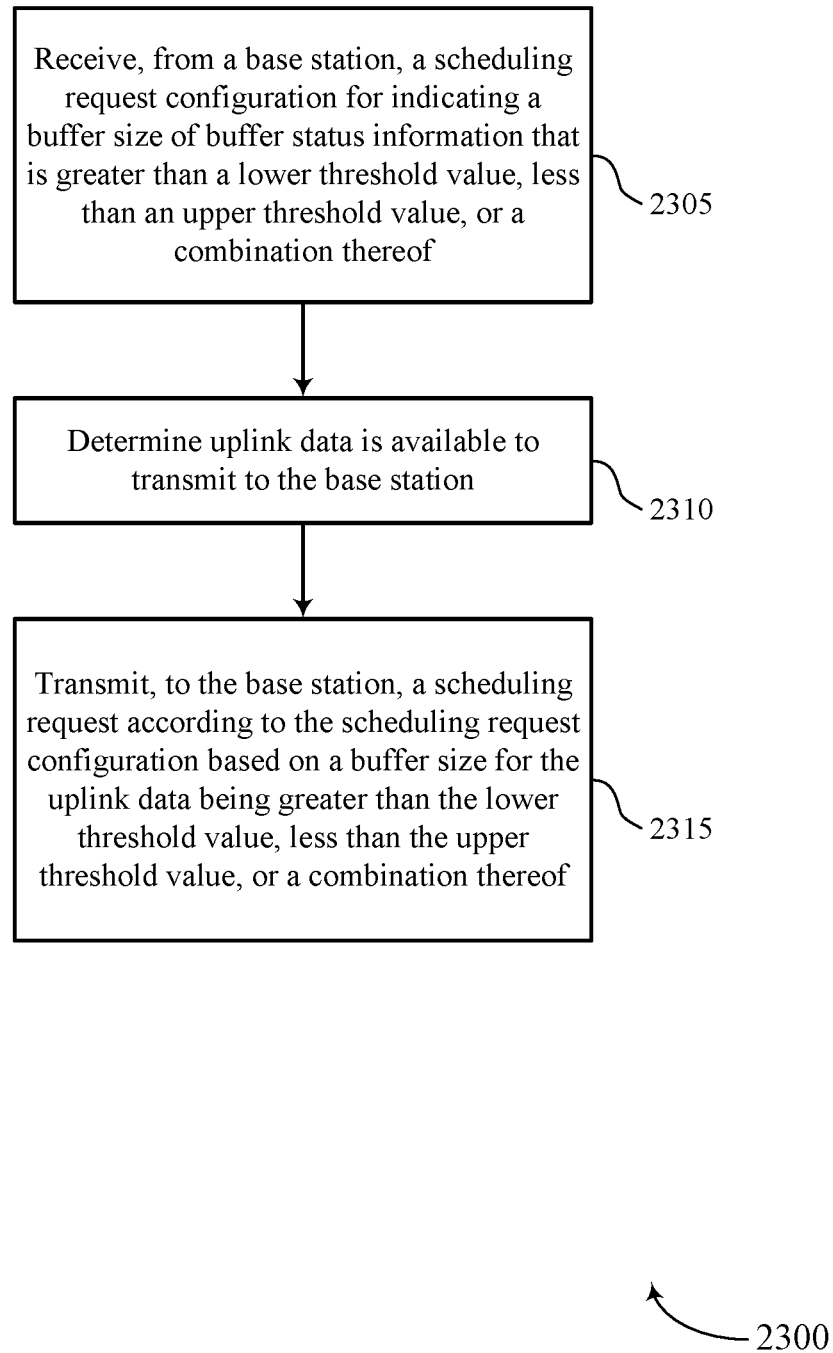

FIG. 23 shows a flowchart illustrating a method 2300 that supports BSR transmissions in NTNs in accordance with aspects of the present disclosure. The operations of method 2300 may be implemented by a UE 115 or its components as described herein. For example, the operations of method 2300 may be performed by a UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2305, the UE may receive, from a base station, a scheduling request configuration for indicating a buffer size of buffer status information that is greater than a lower threshold value, less than an upper threshold value, or a combination thereof. The operations of 2305 may be performed according to the methods described herein. In some examples, aspects of the operations of 2305 may be performed by a scheduling request configuration component as described with reference to FIGS. 10 through 13.

At 2310, the UE may determine uplink data is available to transmit to the base station. The operations of 2310 may be performed according to the methods described herein. In some examples, aspects of the operations of 2310 may be performed by an uplink data identifier as described with reference to FIGS. 10 through 13.

At 2315, the UE may transmit, to the base station, a scheduling request according to the scheduling request configuration based on a buffer size for the uplink data being greater than the lower threshold value, less than the upper threshold value, or a combination thereof. The operations of 2315 may be performed according to the methods described herein. In some examples, aspects of the operations of 2315 may be performed by a BSR scheduling request component as described with reference to FIGS. 10 through 13.

Figure 24:
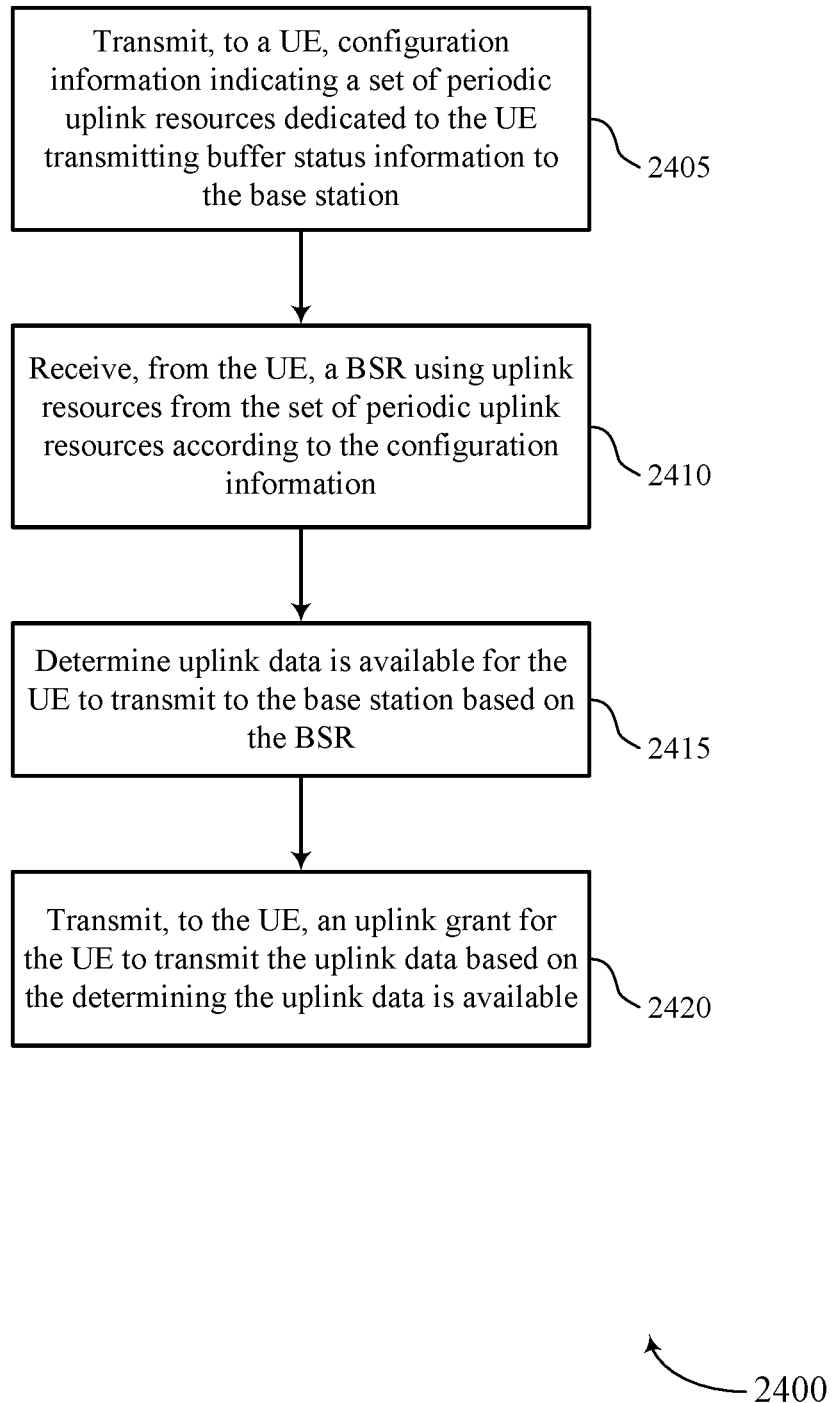

FIG. 24 shows a flowchart illustrating a method 2400 that supports BSR transmissions in NTNs in accordance with aspects of the present disclosure. The operations of method 2400 may be implemented by a base station 105 or its components as described herein. For example, the operations of method 2400 may be performed by a base station communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2405, the base station may transmit, to a UE, configuration information indicating a set of periodic uplink resources dedicated to the UE transmitting buffer status information to the base station. The operations of 2405 may be performed according to the methods described herein. In some examples, aspects of the operations of 2405 may be performed by a periodic uplink resource indicator as described with reference to FIGS. 14 through 17.

At 2410, the base station may receive, from the UE, a BSR using uplink resources from the set of periodic uplink resources according to the configuration information. The operations of 2410 may be performed according to the methods described herein. In some examples, aspects of the operations of 2410 may be performed by a BSR reception component as described with reference to FIGS. 14 through 17.

At 2415, the base station may determine uplink data is available for the UE to transmit to the base station based on the BSR. The operations of 2415 may be performed according to the methods described herein. In some examples, aspects of the operations of 2415 may be performed by an uplink data identification component as described with reference to FIGS. 14 through 17.

At 2420, the base station may transmit, to the UE, an uplink grant for the UE to transmit the uplink data based on the determining the uplink data is available. The operations of 2420 may be performed according to the methods described herein. In some examples, aspects of the operations of 2420 may be performed by an uplink grant component as described with reference to FIGS. 14 through 17.

Figure 25:
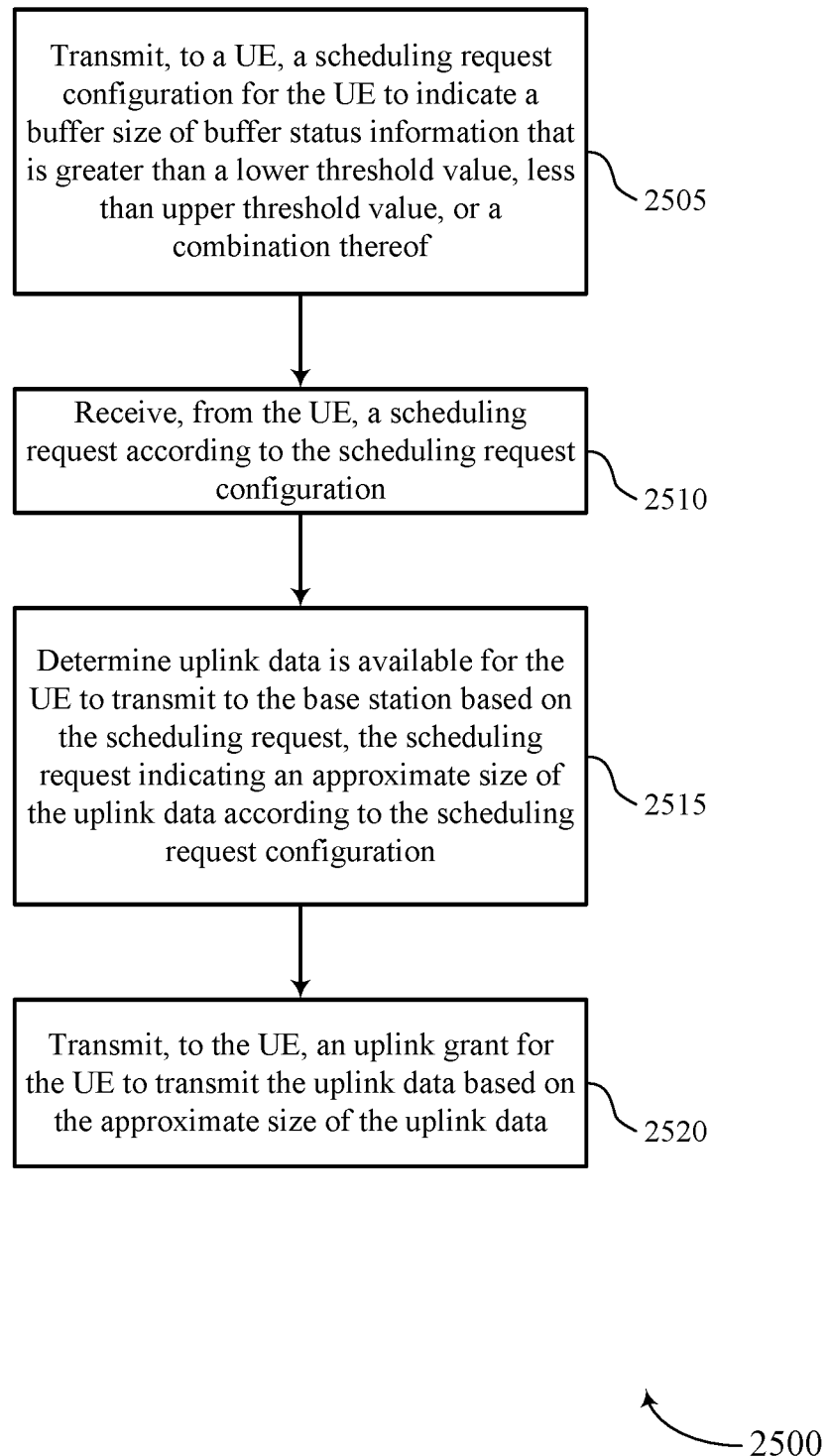

FIG. 25 shows a flowchart illustrating a method 2500 that supports BSR transmissions in NTNs in accordance with aspects of the present disclosure. The operations of method 2500 may be implemented by a base station 105 or its components as described herein. For example, the operations of method 2500 may be performed by a base station communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2505, the base station may transmit, to a UE, a scheduling request configuration for the UE to indicate a buffer size of buffer status information that is greater than a lower threshold value, less than upper threshold value, or a combination thereof. The operations of 2505 may be performed according to the methods described herein. In some examples, aspects of the operations of 2505 may be performed by a scheduling request indicator as described with reference to FIGS. 14 through 17.

At 2510, the base station may receive, from the UE, a scheduling request according to the scheduling request configuration. The operations of 2510 may be performed according to the methods described herein. In some examples, aspects of the operations of 2510 may be performed by a scheduling request component as described with reference to FIGS. 14 through 17.

At 2515, the base station may determine uplink data is available for the UE to transmit to the base station based on the scheduling request, the scheduling request indicating an approximate size of the uplink data according to the scheduling request configuration. The operations of 2515 may be performed according to the methods described herein. In some examples, aspects of the operations of 2515 may be performed by an uplink data identification component as described with reference to FIGS. 14 through 17.

At 2520, the base station may transmit, to the UE, an uplink grant for the UE to transmit the uplink data based on the approximate size of the uplink data. The operations of 2520 may be performed according to the methods described herein. In some examples, aspects of the operations of 2520 may be performed by an uplink grant component as described with reference to FIGS. 14 through 17.

The following provides an overview of aspects of the present disclosure:

Aspect 1: A method for wireless communications at a user equipment (UE) comprising: receiving, from a base station, configuration information indicating a set of periodic uplink resources dedicated to transmitting buffer status information to the base station; determining uplink data is available to transmit to the base station; and transmitting, to the base station, a buffer status report using uplink resources from the set of periodic uplink resources according to the configuration information based at least in part on the available uplink data to transmit to the base station.

Aspect 2: The method of aspect 1, wherein receiving the configuration information comprises: receiving, from the base station, an indication of the set of periodic uplink resources for transmitting one or more buffer status reports, the buffer status information comprising the one or more buffer status reports.

Aspect 3: The method of any of aspects 1 and 2, further comprising: transmitting, to the base station, the buffer status report during a first periodic uplink resource of the set of periodic uplink resources.

Aspect 4: The method of aspect 3, further comprising: transmitting, to the base station, an additional buffer status report during a second periodic uplink resource of the set of periodic uplink resources, wherein the additional buffer status report or a scheduling request is transmitted before receiving an uplink grant from the base station for the buffer status report.

Aspect 5: The method of aspect 4, wherein the buffer status report is transmitted for a first logical channel group of a plurality of logical channel groups, and the additional buffer status report is transmitted for an additional logical channel group of the plurality of logical channel groups.

Aspect 6: The method of aspect 4, wherein the buffer status report and the additional buffer status report are a same buffer status report.

Aspect 7: The method of any of aspects 1 to 6, wherein the buffer status report is transmitted with an uplink control information format configured for the set of periodic uplink resources.

Aspect 8: The method of any of aspects 1 to 7, wherein the buffer status report is transmitted at a physical layer of the UE, a medium access control layer of the UE, or a combination thereof.

Aspect 9: The method of any of aspects 2 to 8, wherein receiving the indication of the set of periodic uplink resources comprises: receiving, from the base station, the indication of the set of periodic uplink resources via radio resource control signaling.

Aspect 10: The method of any of aspects 2 to 8, wherein receiving the indication of the set of periodic uplink resources comprises: receiving, from the base station, the indication of the set of periodic uplink resources via layer one signaling, wherein the set of periodic uplink resources are activated for transmission of the one or more buffer status reports based at least in part on the layer one signaling.

Aspect 11: The method of any of aspects 1 to 10, further comprising: transmitting, to the base station, an uplink medium access control (MAC) control element to deactivate the set of periodic uplink resources.

Aspect 12: The method of any of aspects 1 to 11, further comprising: determining that the set of periodic uplink resources is deactivated based at least in part on receiving an uplink grant from the base station, transmitting a scheduling request to the base station, transmitting a plurality of buffer status reports to the base station that exceeds a threshold value, transmitting the uplink data to the base station, or a combination thereof.

Aspect 13: The method of any of aspects 1 to 12, wherein the set of periodic uplink resources comprises an on period where the set of periodic uplink resources are active and an off period where the set of periodic uplink resources are deactivated.

Aspect 14: The method of any of aspects 1 to 13, wherein receiving the configuration information comprises: receiving, from the base station, an indication of one or more random access resources for transmitting one or more random access preambles that correspond to an approximate size of the buffer status report, the set of periodic uplink resources comprising the one or more random access resources and the buffer status information comprising the one or more random access preambles that correspond to the approximate size of the buffer status report.

Aspect 15: The method of aspect 14, further comprising: determining a random access preamble from the one or more random access preambles based at least in part on a size of the buffer status report; transmitting, to the base station, the random access preamble in a first random access message of a random access procedure in a random access resource of the one or more random access resources; and receiving, from the base station, an uplink grant in a second random access message of the random access procedure based at least in part on transmitting the random access preamble, wherein the buffer status report and the uplink data are transmitted to the base station according to the uplink grant in a third random access message of the random access procedure.

Aspect 16: The method of aspect 15, wherein the uplink grant comprises a cell radio network temporary identifier corresponding to the UE.

Aspect 17: The method of any of aspects 14 and 15, wherein the uplink grant comprises a plurality of transport block sizes, and the buffer status report and the uplink data are transmitted according to a transport block size of the plurality of transport block sizes.

Aspect 18: The method of any of aspects 14 to 17, wherein the one or more random access resources comprise one or more random access occasions configured for the UE to transmit the one or more random access preambles that correspond to the approximate size of the buffer status report.

Aspect 19: The method of any of aspects 1 to 18, further comprising: determining one or more common random access resources configured for transmitting the buffer status information, the set of periodic uplink resources comprising the one or more common random access resources, wherein the common random access resources are common to a plurality of UEs comprising the UE.

Aspect 20: The method of aspect 19, further comprising: transmitting, to the base station, the buffer status report as part of a first random access message for a four-step random access procedure using the one or more common random access resources; receiving, from the base station, a second random access message for the four-step random access procedure, the second random access message comprising an uplink grant for the uplink data; and transmitting, to the base station, the uplink data and a cell radio network temporary identifier medium access control (MAC) control element corresponding to the UE in a third random access message for the four-step random access procedure.

Aspect 21: The method of any of aspects 19 and 20, wherein determining the one or more common random access resources comprises: receiving, from the base station, an indication of the one or more common random access resources via radio resource control signaling, broadcast signaling, one or more system information blocks, remaining minimum system information, or a combination thereof.

Aspect 22: The method of any of aspects 1 to 14, 18, 19, and 21, wherein receiving the configuration information comprises: receiving, from the base station, a dedicated configuration for transmitting a random access preamble for a first random access message of a two-step random access procedure using the uplink resources of the set of periodic uplink resources, wherein the buffer status report is transmitted in the first random access message of the two-step random access procedure according to the dedicated configuration.

Aspect 23: The method of aspect 22, further comprising: receiving, from the base station, a second random access message of the two-step random access procedure based at least in part on transmitting the buffer status report in the first random access message, wherein the second random access message comprises an uplink grant for the uplink data, a timing advance, or a combination thereof.

Aspect 24: The method of aspect 23, wherein the second random access message comprises a fallback random access response message addressed to a cell radio network temporary identifier corresponding to the UE and the uplink grant for the uplink data, a timing advance command medium access control (MAC) control element and MAC service data unit containing the uplink grant for the uplink data, a success random access response format that includes the timing advance and the uplink grant, or a combination thereof.

Aspect 25: The method of aspect 24, further comprising: receiving, from the base station, an indication to receive the success random access response format.

Aspect 26: The method of any of aspects 22 to 25, wherein receiving the dedicated configuration for the random access preamble comprises: receiving, from the base station, the dedicated configuration for the random access preamble via radio resource control signaling.

Aspect 27: The method of any of aspects 22 to 26, further comprising: determining a common configuration for transmitting a data portion of the first random access message of the two-step random access procedure, wherein the buffer status report is transmitted in the data portion of the first random access message of the two-step random access procedure according to the common configuration and the dedicated configuration.

Aspect 28: The method of aspect 27, wherein determining the common configuration for transmitting the first random access message comprises: receiving, from the base station, an indication of the common configuration via radio resource control signaling, broadcast signaling, one or more system information blocks, remaining minimum system information, or a combination thereof.

Aspect 29: The method of any of aspects 1 to 13, wherein receiving the configuration information comprises: receiving, from the base station, one or more uplink grants for transmitting the buffer status information, the one or more uplink grants transmitted by the base station according to a periodic configuration, wherein the buffer status report is transmitted based at least in part on receiving an uplink grant of the one or more uplink grants.

Aspect 30: The method of aspect 29, further comprising: receiving, from the base station, an indication that the one or more uplink grants for transmitting the one or more buffer status reports are activated, wherein the buffer status report is transmitted according to a received uplink grant from the one or more uplink grants based at least in part on the indication.

Aspect 31: The method of aspect 30, further comprising: receiving, from the base station, an additional indication that the one or more uplink grants for transmitting the one or more buffer status reports are deactivated.

Aspect 32: The method of any of aspects 29 to 31, further comprising: determining to maintain a discontinuous reception state when an uplink grant of the one or more uplink grants is received.

Aspect 33: The method of aspect 32, wherein the discontinuous reception state comprises an active state, a sleep state, or a combination thereof.

Aspect 34: A method for wireless communications at a user equipment (UE), comprising: receiving, from a base station, a scheduling request configuration for indicating a buffer size of buffer status information that is greater than a lower threshold value, less than an upper threshold value, or a combination thereof determining uplink data is available to transmit to the base station; and transmitting, to the base station, a scheduling request according to the scheduling request configuration based at least in part on a buffer size for the uplink data being greater than the lower threshold value, less than the upper threshold value, or a combination thereof.

Aspect 35: The method of aspect 34, further comprising: transmitting, to the base station, an indication of a preference for the scheduling request configuration.

Aspect 36: The method of any of aspects 34 and 35, wherein the lower threshold value, the upper threshold value, or both are negotiated by the UE and the base station.

Aspect 37: The method of any of aspects 34 to 36, wherein the scheduling request configuration is specific to a group of logical channels, a logical channel group, an enhanced mobile broadband usage, an ultra reliable low latency communications usage, a numerology, a subcarrier spacing, a transmission time interval duration, or a combination thereof.

Aspect 38: A method for wireless communications at a base station, comprising: transmitting, to a user equipment (UE), configuration information indicating a set of periodic uplink resources dedicated to the UE transmitting buffer status information to the base station; receiving, from the UE, a buffer status report using uplink resources from the set of periodic uplink resources according to the configuration information; determining uplink data is available for the UE to transmit to the base station based at least in part on the buffer status report; and transmitting, to the UE, an uplink grant for the UE to transmit the uplink data based at least in part on the determining the uplink data is available.

Aspect 39: The method of aspect 38, wherein transmitting the configuration information comprises: transmitting, to the UE, an indication of the set of periodic uplink resources for the UE to transmit one or more buffer status reports, the buffer status information comprising the one or more buffer status reports.

Aspect 40: The method of any of aspects 38 and 39, further comprising: receiving, from the UE, the buffer status report during a first periodic uplink resource of the set of periodic uplink resources.

Aspect 41: The method of aspect 40, further comprising: receiving, from the UE, an additional buffer status report during a second periodic uplink resource of the set of periodic uplink resources, wherein the additional buffer status report or a scheduling request is received before transmitting the uplink grant to the UE for the buffer status report.

Aspect 42: The method of aspect 41, wherein the buffer status report is received for a first logical channel group of a plurality of logical channel groups, and the additional buffer status report is received for an additional logical channel group of the plurality of logical channel groups.

Aspect 43: The method of aspect 41, wherein the buffer status report and the additional buffer status report are a same buffer status report.

Aspect 44: The method of any of aspects 38 to 43, wherein the buffer status report is received with an uplink control information format configured for the set of periodic uplink resources.

Aspect 45: The method of any of aspects 38 to 44, wherein the buffer status report is received from a physical layer of the UE, a medium access control layer of the UE, or a combination thereof.

Aspect 46: The method of any of aspects 39 to 45, wherein transmitting the indication of the set of periodic uplink resources comprises: transmitting, to the UE, the indication of the set of periodic uplink resources via radio resource control signaling.

Aspect 47: The method of any of aspects 39 to 45, wherein transmitting the indication of the set of periodic uplink resources comprises: transmitting, to the UE, the indication of the set of periodic uplink resources via layer one signaling, wherein the set of periodic uplink resources are activated for transmission of the one or more buffer status reports based at least in part on the layer one signaling.

Aspect 48: The method of any of aspects 38 to 47, further comprising: receiving, from the UE, an uplink medium access control (MAC) control element to deactivate the set of periodic uplink resources.

Aspect 49: The method of any of aspects 38 to 48, further comprising: determining that the set of periodic uplink resources is deactivated based at least in part on transmitting the uplink grant to the UE, receiving a scheduling request from the UE, receiving a plurality of buffer status reports from the UE that exceeds a threshold value, receiving the uplink data from the UE, or a combination thereof.

Aspect 50: The method of any of aspects 38 to 49, wherein the set of periodic uplink resources comprises an on period where the set of periodic uplink resources are active and an off period where the set of periodic uplink resources are deactivated.

Aspect 51: The method of aspects 38 to 50, wherein transmitting the configuration information comprises: transmitting, to the UE, an indication of one or more random access resources for transmitting one or more random access preambles that correspond to an approximate size of the buffer status report, the set of periodic uplink resources comprising the one or more random access resources and the buffer status information comprising the one or more random access preambles that correspond to the approximate size of the buffer status report.

Aspect 52: The method of aspect 51, further comprising: receiving, from the UE, a random access preamble in a first random access message of a random access procedure in a random access resource of the one or more random access resources, the random access preamble indicating a size of the buffer status report; and transmitting, to the UE, the uplink grant in a second random access message of the random access procedure based at least in part on receiving the random access preamble, wherein the buffer status report and the uplink data are received from the UE according to the uplink grant in a third random access message of the random access procedure.

Aspect 53: The method of aspect 52, wherein the uplink grant comprises a cell radio network temporary identifier corresponding to the UE.

Aspect 54: The method of any of aspects 52 and 53, wherein the uplink grant comprises a plurality of transport block sizes, and the buffer status report and the uplink data are transmitted according to a transport block size of the plurality of transport block sizes.

Aspect 55: The method of any of aspects 51 to 53, wherein the one or more random access resources comprise one or more random access occasions configured for the UE to transmit the one or more random access preambles that correspond to the approximate size of the buffer status report.

Aspect 56: The method of any of aspects 38 to 55, further comprising: determining one or more common random access resources configured for the UE to transmit the buffer status information, the set of periodic uplink resources comprising the one or more common random access resources, wherein the common random access resources are common to a plurality of UEs comprising the UE.

Aspect 57: The method of aspect 56, further comprising: receiving, from the UE, the buffer status report as part of a first random access message for a four-step random access procedure using the one or more common random access resources; transmitting, to the UE, a second random access message for the four-step random access procedure, the second random access message comprising the uplink grant for the uplink data; and receiving, from the UE, the uplink data and a cell radio network temporary identifier medium access control (MAC) control element corresponding to the UE in a third random access message for the four-step random access procedure.

Aspect 58: The method of any of aspects 56 and 57, further comprising: transmitting, to the UE, an indication of the one or more common random access resources via radio resource control signaling, broadcast signaling, one or more system information blocks, remaining minimum system information, or a combination thereof.

Aspect 59: The method of any of aspects 38 to 51, 55, 56 and 58, wherein transmitting the configuration information comprises: transmitting, to the UE, a dedicated configuration for the UE to transmit a random access preamble for a first random access message of a two-step random access procedure using the uplink resources of the set of periodic uplink resources, wherein the buffer status report is received in the first random access message of the two-step random access procedure according to the dedicated configuration.

Aspect 60: The method of aspect 59, further comprising: transmitting, to the UE, a second random access message of the two-step random access procedure based at least in part on receiving the buffer status report in the first random access message, wherein the second random access message comprises an uplink grant for the uplink data, a timing advance, or a combination thereof.

Aspect 61: The method of aspect 60, wherein the second random access message comprises a fallback random access response message addressed to a cell radio network temporary identifier corresponding to the UE and the uplink grant for the uplink data, a timing advance command medium access control (MAC) control element and MAC service data unit containing the uplink grant for the uplink data, a success random access response format that includes the timing advance and the uplink grant, or a combination thereof.

Aspect 62: The method of aspect 61, further comprising: transmitting, to the UE, an indication to receive the success random access response format.

Aspect 63: The method of any of aspects 59 to 62, wherein transmitting the dedicated configuration for the random access preamble comprises: transmitting, to the UE, the dedicated configuration for the random access preamble via radio resource control signaling.

Aspect 64: The method of any of aspects 59 to 63, further comprising: determining a common configuration for transmitting a data portion of the first random access message of the two-step random access procedure, wherein the buffer status report is received in the data portion of the first random access message of the two-step random access procedure according to the common configuration and the dedicated configuration.

Aspect 65: The method of aspect 64, further comprising: transmitting, to the UE, an indication of the common configuration via radio resource control signaling.

Aspect 66: The method of any of aspects 38 to 50, further comprising: transmitting, to the UE, one or more uplink grants for the UE to transmit the buffer status information, the one or more uplink grants transmitted by the base station according to a periodic configuration, wherein the buffer status report is received based at least in part on transmitting an uplink grant of the one or more uplink grants.

Aspect 67: The method of aspect 66, further comprising: transmitting, to the UE, an indication that the one or more uplink grants for the UE to transmit the one or more buffer status reports are activated, wherein the buffer status report is received according to a transmitted uplink grant from the one or more uplink grants based at least in part on the indication.

Aspect 68: The method of aspect 67, further comprising: transmitting, to the UE, an additional indication that the one or more uplink grants for the UE to transmit the one or more buffer status reports are deactivated.

Aspect 69: A method for wireless communications at a base station, comprising: transmitting, to a user equipment (UE), a scheduling request configuration for the UE to indicate a buffer size of buffer status information that is greater than a lower threshold value, less than upper threshold value, or a combination thereof; receiving, from the UE, a scheduling request according to the scheduling request configuration; determining uplink data is available for the UE to transmit to the base station based at least in part on the scheduling request, the scheduling request indicating an approximate size of the uplink data according to the scheduling request configuration; and transmitting, to the UE, an uplink grant for the UE to transmit the uplink data based at least in part on the approximate size of the uplink data.

Aspect 70: The method of aspect 69, further comprising: receiving, from the UE, an indication of a preference for the scheduling request configuration.

Aspect 71: The method of any of aspects 69 and 70, wherein the lower threshold value, the upper threshold value, or both are negotiated by the UE and the base station.

Aspect 72: The method of any of aspects 69 to 71, wherein the scheduling request configuration is specific to a group of logical channels, a logical channel group, an enhanced mobile broadband usage, an ultra reliable low latency communications usage, a numerology, a subcarrier spacing, a transmission time interval duration, or a combination thereof.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a network device, configuration information indicating a set of periodic uplink resources dedicated to transmitting buffer status information to the network device;
   determining one or more common random access resources configured for transmitting the buffer status information, the set of periodic uplink resources comprising the one or more common random access resources, wherein the one or more common random access resources are common to a plurality of UEs comprising the UE;
   determining uplink data is available to transmit to the network device; and
   transmitting, to the network device, a buffer status report using uplink resources from the set of periodic uplink resources according to the configuration information based at least in part on the available uplink data to transmit to the network device.

2. The method of claim 1, wherein receiving the configuration information comprises:
   receiving, from the network device, an indication of the set of periodic uplink resources for transmitting one or more buffer status reports, the buffer status information comprising the one or more buffer status reports.

3. The method of claim 2, wherein receiving the indication of the set of periodic uplink resources comprises:
   receiving, via radio resource control signaling from the network device, the indication of the set of periodic uplink resources for transmitting one or more buffer status reports.

4. The method of claim 2, wherein receiving the indication of the set of periodic uplink resources comprises:
   receiving, from the network device, the indication of the set of periodic uplink resources via layer one signaling, wherein the set of periodic uplink resources are activated for transmission of the one or more buffer status reports based at least in part on the layer one signaling.

5. The method of claim 1, wherein receiving the configuration information comprises:
receiving, from the network device, an indication of one or more random access resources for transmitting one or more random access preambles that correspond to an approximate size of the buffer status report, the set of periodic uplink resources comprising the one or more random access resources and the buffer status information comprising the one or more random access preambles that correspond to the approximate size of the buffer status report.

6. The method of claim 1, wherein determining the one or more common random access resources comprises:
receiving, from the network device, an indication of the one or more common random access resources via radio resource control signaling, broadcast signaling, one or more system information blocks, remaining minimum system information, or a combination thereof.

7. The method of claim 1, wherein receiving the configuration information comprises:
receiving, from the network device, a dedicated configuration for transmitting a random access preamble for a first random access message of a two-step random access procedure using the uplink resources of the set of periodic uplink resources, wherein the buffer status report is transmitted in the first random access message of the two-step random access procedure according to the dedicated configuration or a common configuration.

8. The method of claim 7, further comprising:
receiving, from the network device, a second random access message of the two-step random access procedure based at least in part on transmitting the buffer status report in the first random access message, wherein the second random access message comprises an uplink grant for the uplink data, a timing advance, or a combination thereof.

9. The method of claim 7, further comprising:
determining a common configuration for transmitting a data portion of the first random access message of the two-step random access procedure, wherein the buffer status report is transmitted in the data portion of the first random access message of the two-step random access procedure according to the common configuration and the dedicated configuration.

10. The method of claim 1, wherein receiving the configuration information comprises:
receiving, from the network device, one or more uplink grants for transmitting the buffer status information, the one or more uplink grants transmitted by the network device according to a periodic configuration, wherein the buffer status report is transmitted based at least in part on receiving an uplink grant of the one or more uplink grants.

11. The method of claim 10, further comprising:
receiving, from the network device, an indication that the one or more uplink grants for transmitting the buffer status information are activated, wherein the buffer status report is transmitted according to a received uplink grant from the one or more uplink grants based at least in part on the indication.

12. The method of claim 11, further comprising:
receiving, from the network device, an additional indication that the one or more uplink grants for transmitting the one or more buffer status reports are deactivated.

13. The method of claim 1, wherein transmitting the buffer status report is performed regardless of an associated hybrid automatic repeat request (HARQ) status.

14. An apparatus for wireless communications at a user equipment (UE), comprising:
a processor,
memory coupled with the processor; and
instructions stored in the memory and executable by the processor to cause the apparatus to:
receive, from a network device, configuration information indicating a set of periodic uplink resources dedicated to transmitting buffer status information to the network device;
determine one or more common random access resources configured for transmitting the buffer status information, the set of periodic uplink resources comprising the one or more common random access resources, wherein the one or more common random access resources are common to a plurality of UEs comprising the UE;
determine uplink data is available to transmit to the network device; and
transmit, to the network device, a buffer status report using uplink resources from the set of periodic uplink resources according to the configuration information based at least in part on the available uplink data to transmit to the network device.

15. The apparatus of claim 14, wherein the instructions to receive the configuration information are executable by the processor to cause the apparatus to:
receive, from the network device, an indication of the set of periodic uplink resources for transmitting one or more buffer status reports, the buffer status information comprising the one or more buffer status reports.

16. The apparatus of claim 15, wherein the instructions to receive the indication of the set of periodic uplink resources are executable by the processor to cause the apparatus to:
receive, via radio resource control signaling from the network device, the indication of the set of periodic uplink resources for transmitting one or more buffer status reports.

17. The apparatus of claim 15, wherein the instructions to receive the indication of the set of periodic uplink resources are executable by the processor to cause the apparatus to:
receive, from the network device, the indication of the set of periodic uplink resources via layer one signaling, wherein the set of periodic uplink resources are activated for transmission of the one or more buffer status reports based at least in part on the layer one signaling.

18. The apparatus of claim 14, wherein the instructions to receive the configuration information are executable by the processor to cause the apparatus to:
receive, from the network device, an indication of one or more random access resources for transmitting one or more random access preambles that correspond to an approximate size of the buffer status report, the set of periodic uplink resources comprising the one or more random access resources and the buffer status information comprising the one or more random access preambles that correspond to the approximate size of the buffer status report.

19. The apparatus of claim 14, wherein the instructions to determine the one or more common random access resources are executable by the processor to cause the apparatus to:

receive, from the network device, an indication of the one or more common random access resources via radio resource control signaling, broadcast signaling, one or more system information blocks, remaining minimum system information, or a combination thereof.

20. The apparatus of claim 14, wherein the instructions to receive the configuration information are executable by the processor to cause the apparatus to:

receive, from the network device, a dedicated configuration for transmitting a random access preamble for a first random access message of a two-step random access procedure using the uplink resources of the set of periodic uplink resources, wherein the buffer status report is transmitted in the first random access message of the two-step random access procedure according to the dedicated configuration or a common configuration.

21. The apparatus of claim 20, wherein the instructions are further executable by the processor to cause the apparatus to:

receive, from the network device, a second random access message of the two-step random access procedure based at least in part on transmitting the buffer status report in the first random access message, wherein the second random access message comprises an uplink grant for the uplink data, a timing advance, or a combination thereof.

22. The apparatus of claim 20, wherein the instructions are further executable by the processor to cause the apparatus to:

determine a common configuration for transmitting a data portion of the first random access message of the two-step random access procedure, wherein the buffer status report is transmitted in the data portion of the first random access message of the two-step random access procedure according to the common configuration and the dedicated configuration.

23. The apparatus of claim 14, wherein the instructions to receive the configuration information are executable by the processor to cause the apparatus to:

receive, from the network device, one or more uplink grants for transmitting the buffer status information, the one or more uplink grants transmitted by the network device according to a periodic configuration, wherein the buffer status report is transmitted based at least in part on receiving an uplink grant of the one or more uplink grants.

24. The apparatus of claim 23, wherein the instructions are further executable by the processor to cause the apparatus to:

receive, from the network device, an indication that the one or more uplink grants for transmitting the buffer status information are activated, wherein the buffer status report is transmitted according to a received uplink grant from the one or more uplink grants based at least in part on the indication.

25. The apparatus of claim 24, wherein the instructions are further executable by the processor to cause the apparatus to:

receive, from the network device, an additional indication that the one or more uplink grants for transmitting the one or more buffer status reports are deactivated.

26. The apparatus of claim 14, wherein the instructions to transmit the buffer status report are executable by the processor to cause the apparatus to:

transmit the buffer status report regardless of an associated hybrid automatic repeat request (HARQ) status.

27. An apparatus for wireless communications at a user equipment (UE), comprising:

means for receiving, from a network device, configuration information indicating a set of periodic uplink resources dedicated to transmitting buffer status information to the network device;

means for determining one or more common random access resources configured for transmitting the buffer status information, the set of periodic uplink resources comprising the one or more common random access resources, wherein the one or more common random access resources are common to a plurality of UEs comprising the UE;

means for determining uplink data is available to transmit to the network device; and means for transmitting, to the network device, a buffer status report using uplink resources from the set of periodic uplink resources according to the configuration information based at least in part on the available uplink data to transmit to the network device.

28. A non-transitory computer-readable medium storing code for wireless communications at a user equipment (UE), the code comprising instructions executable by a processor to:

receive, from a network device, configuration information indicating a set of periodic uplink resources dedicated to transmitting buffer status information to the network device;

determine one or more common random access resources configured for transmitting the buffer status information, the set of periodic uplink resources comprising the one or more common random access resources, wherein the one or more common random access resources are common to a plurality of UEs comprising the UE;

determine uplink data is available to transmit to the network device; and transmit, to the network device, a buffer status report using uplink resources from the set of periodic uplink resources according to the configuration information based at least in part on the available uplink data to transmit to the network device.

* * * * *